US00RE44884E

(19) United States
(12) Reissued Patent
Lambarth

(10) Patent Number: US RE44,884 E
(45) Date of Reissued Patent: May 13, 2014

(54) AMBULANCE COT WITH PINCH SAFETY FEATURE

(75) Inventor: Clifford E. Lambarth, Portage, MI (US)

(73) Assignee: Stryker Corporation, Kalamazoo, MI (US)

(21) Appl. No.: 13/068,358

(22) Filed: May 9, 2011

Related U.S. Patent Documents

Reissue of:
(64) Patent No.: 7,540,047
Issued: Jun. 2, 2009
Appl. No.: 12/002,958
Filed: Dec. 19, 2007

U.S. Applications:
(62) Division of application No. 11/172,434, filed on Jun. 30, 2005, now Pat. No. 7,398,571.

(60) Provisional application No. 60/613,151, filed on Sep. 24, 2004.

(51) Int. Cl.
*A61G 1/02* (2006.01)
*A61G 15/06* (2006.01)

(52) U.S. Cl.
USPC ..... 5/611; 5/86.1

(58) Field of Classification Search
USPC ..... 5/11, 611, 118, 86.1; 108/145, 147.2, 108/147.22, 144.11, 147; 254/2 R, 8 R, 9 R
See application file for complete search history.

(56) References Cited

U.S. PATENT DOCUMENTS 1,221,327 A 4/1917 Honold
2,538,993 A 1/1951 Travis
2,632,898 A 3/1953 Pardoe
2,687,536 A 8/1954 Miller
2,833,587 A 5/1958 Saunders
2,908,916 A 10/1959 Fischer et al.
2,958,873 A 11/1960 Ferneau
3,034,341 A 5/1962 Golubovic
3,099,020 A 7/1963 Garfield et al.

(Continued)

FOREIGN PATENT DOCUMENTS

GB 2 302 672 A 1/1997
GB 2 368 317 A 5/2002

(Continued)

OTHER PUBLICATIONS

Defendant Monster Medic, Inc.'s Prior Art Disclosure dated Sep. 10, 2010 (5 pages): Case No. 1:09-cv-1142.

*Primary Examiner* — Michael Trettel
(74) *Attorney, Agent, or Firm* — Flynn, Thiel, Boutell & Tanis, P.C.

(57) ABSTRACT

An ambulance cot is disclosed and the ambulance cot has, if desired, a wheel supported base and a litter raisable and lowerable by a powered elevating mechanism oriented between the base and the litter. The ambulance cot also has wireless communication capability to facilitate communication between the ambulance cot and a loading system on an ambulance as well as facilitating wireless troubleshooting via a handheld wireless unit. The ambulance cot also has a longitudinally extendable head section. The ambulance cot also has several accessories, such as an accessory hook mounted to the underside of the fowler, and a collapsible pouch accessory fastened to the retractable head section and the litter frame as well as a pinch safety feature.

6 Claims, 61 Drawing Sheets

(56) References Cited

U.S. PATENT DOCUMENTS 3,174,722 A * 3/1965 Alm ..... 254/93 HP
3,203,670 A 8/1965 Farris
3,208,432 A 9/1965 Fisk
3,220,020 A 11/1965 Nelson
3,282,566 A 11/1966 Clarke
3,304,116 A 2/1967 Stryker
3,373,453 A 3/1968 Goodman
3,386,067 A 5/1968 Costanzo
3,393,004 A 7/1968 Williams
3,571,826 A 3/1971 Burst
3,630,565 A 12/1971 Lehmann
3,644,944 A * 2/1972 Bourgraf et al. ..... 5/610
3,673,620 A 7/1972 Saunders
3,711,876 A 1/1973 Kirkland et al.
3,742,527 A 7/1973 Johnston et al.
3,743,344 A 7/1973 Jameson
3,805,712 A 4/1974 Taylor et al.
3,814,414 A 6/1974 Chapa
3,815,164 A 6/1974 Smith
3,820,838 A 6/1974 Limpach
3,826,528 A 7/1974 East
3,831,996 A 8/1974 Layer
3,836,900 A 9/1974 Mansfield
3,917,076 A 11/1975 Campbell
3,918,554 A 11/1975 Bourgraf et al.
3,980,334 A 9/1976 Ferneau et al.
4,071,222 A 1/1978 Wright
4,078,269 A 3/1978 Weipert
4,097,941 A 7/1978 Merkel
4,125,242 A 11/1978 Meiller et al.
4,149,762 A 4/1979 Olsson et al.
4,164,355 A 8/1979 Eaton et al.
4,175,783 A 11/1979 Pioth
4,192,541 A * 3/1980 Ferneau ..... 296/20
4,222,132 A 9/1980 Crim et al.
4,227,269 A 10/1980 Johnston
4,271,545 A 6/1981 Christian, III
4,327,453 A 5/1982 Sefton
4,407,543 A 10/1983 Mashuda
4,435,862 A 3/1984 King et al.
4,449,262 A 5/1984 Jahsman et al.
4,489,449 A 12/1984 Failor et al.
4,534,077 A 8/1985 Martin
4,539,560 A 9/1985 Fleck et al.
4,556,198 A 12/1985 Tominaga
4,558,847 A 12/1985 Coates
4,559,656 A 12/1985 Foster
4,567,894 A 2/1986 Bergman
4,576,539 A 3/1986 Williams
4,613,122 A 9/1986 Manabe
4,624,437 A 11/1986 Sakamoto
4,667,354 A 5/1987 Carey, Jr. et al.
4,671,728 A 6/1987 Clark et al.
4,675,926 A 6/1987 Lindblom et al.
4,682,810 A 7/1987 Zarka
4,751,754 A 6/1988 Bailey et al.
4,767,148 A 8/1988 Ferneau et al.
4,858,482 A 8/1989 Knudsen
4,860,394 A 8/1989 Benessis et al.
4,912,787 A 4/1990 Bradcovich
4,927,127 A 5/1990 Lock
4,934,468 A 6/1990 Koerber, Sr. et al.
4,939,801 A 7/1990 Schaal et al.
4,953,244 A 9/1990 Koerber, Sr. et al.
4,959,957 A 10/1990 Schmale et al.
4,961,470 A 10/1990 Koerber, Sr.
4,967,557 A 11/1990 Izumi et al.
4,984,774 A 1/1991 Zupancic et al.
5,022,105 A 6/1991 Catoe
5,054,141 A 10/1991 Foster et al.
5,063,624 A 11/1991 Smith et al.
5,074,000 A 12/1991 Soltani et al.
5,083,331 A 1/1992 Schnelle et al.
5,083,625 A 1/1992 Bleicher
5,084,922 A 2/1992 Louit
5,135,350 A 8/1992 Eelman et al.
5,172,442 A 12/1992 Bartley et al.
5,220,698 A 6/1993 Hannant
5,249,421 A 10/1993 Lunzman
5,271,113 A 12/1993 White
5,365,622 A 11/1994 Schirmer
5,435,027 A 7/1995 Bourgraf et al.
5,490,703 A 2/1996 Hewko
5,495,914 A 3/1996 DiMucci et al.
5,520,091 A 5/1996 Chromik
5,537,700 A * 7/1996 Way et al. ..... 5/611
5,572,921 A 11/1996 Krumbeck
5,575,026 A 11/1996 Way et al.
5,586,349 A 12/1996 Hannant
5,611,096 A 3/1997 Bartlett et al.
5,613,255 A 3/1997 Bish et al.
5,666,806 A 9/1997 Dietz
5,687,655 A 11/1997 Weinschenk, Jr. et al.
5,697,471 A 12/1997 DiMucci et al.
5,701,618 A 12/1997 Brugger
5,738,306 A 4/1998 Moss et al.
5,740,884 A 4/1998 DiMucci et al.
5,779,296 A 7/1998 Hewko
5,806,111 A 9/1998 Heimbrock et al.
5,861,582 A 1/1999 Flanagan et al.
5,887,302 A 3/1999 DiMucci et al.
5,983,425 A 11/1999 DiMucci et al.
5,992,562 A 11/1999 Boeckman et al.
6,016,580 A 1/2000 Heimbrock et al.
6,024,528 A 2/2000 Taylor
6,205,601 B1 3/2001 Nessmann et al.
6,219,864 B1 4/2001 Ellis et al.
6,226,816 B1 5/2001 Webster et al.
6,230,343 B1 5/2001 Buiskool et al.
6,240,579 B1 6/2001 Hanson et al.
6,264,006 B1 7/2001 Hanson et al.
6,325,363 B1 12/2001 Sakamoto
6,332,638 B1 12/2001 Menna
6,352,240 B1 3/2002 Eckstein et al.
6,389,623 B1 5/2002 Flynn et al.
6,421,854 B1 7/2002 Heimbrock
6,526,611 B2 3/2003 Flynn et al.
6,654,973 B2 12/2003 Van Den Heuvel et al.
6,701,554 B2 3/2004 Heimbrock
6,752,224 B2 6/2004 Hopper et al.
6,772,456 B2 8/2004 Votel
6,792,633 B1 9/2004 Ito
6,862,759 B2 3/2005 Hand et al.
6,868,567 B2 3/2005 Edgerton
6,886,200 B2 5/2005 Blyshak et al.
6,902,019 B2 6/2005 Heimbrock et al.
6,908,133 B1 6/2005 Morton et al.
6,942,226 B2 9/2005 Walkingshaw
6,951,034 B2 10/2005 Shiery et al.
6,976,696 B2 12/2005 O'Krangley et al.
7,000,828 B2 2/2006 Jones
7,007,330 B2 3/2006 Kuiper et al.
7,014,000 B2 3/2006 Kummer et al.
7,017,208 B2 3/2006 Weismiller et al.
7,124,456 B2 10/2006 Palmatier et al.
7,131,151 B2 11/2006 Ferneau et al.
7,150,056 B2 12/2006 Lemire
7,191,854 B2 3/2007 Lenkman
7,389,552 B1 * 6/2008 Reed et al. ..... 5/86.1
7,398,571 B2 * 7/2008 Souke et al. ..... 5/611
7,515,059 B2 4/2009 Price et al.
7,521,891 B2 4/2009 Choy et al.
7,533,429 B2 5/2009 Menkedick et al.
7,540,047 B2 * 6/2009 Lambarth ..... 5/611
7,540,547 B2 6/2009 Lambarth et al.
7,610,637 B2 11/2009 Menkedick et al.

(56) References Cited

U.S. PATENT DOCUMENTS

| | | | |
|---|---|---|---|
| 2001/0036397 | A1 | 11/2001 | Pierrou et al. |
| 2002/0005300 | A1 | 1/2002 | Saleem |
| 2003/0079288 | A1 | 5/2003 | Cook et al. |
| 2005/0006155 | A1 | 1/2005 | Lenkman |

FOREIGN PATENT DOCUMENTS

| | | | |
|---|---|---|---|
| GB | 2 390 062 | A | 12/2003 |
| WO | WO 98/04228 | | 2/1998 |
| WO | WO 2004/064698 | A2 | 8/2004 |
| WO | WO 2005/122989 | A1 | 12/2005 |

* cited by examiner

AMBULANCE COT WITH PINCH SAFETY FEATURE

Matter enclosed in heavy brackets [ ] appears in the original patent but forms no part of this reissue specification; matter printed in italics indicates the additions made by reissue.

*This application is a reissue application of U.S. Ser. No. 12/002,958, filed Dec. 19, 2007, now U.S. Pat. No. 7,540,047, issued on Jun. 2, 2009.*

CROSS REFERENCE TO RELATED APPLICATIONS

This application is a division of U.S. application Ser. No. 11/172,434, filed Jun. 30, 2005, now U.S. Pat. No. 7,398,571, and claims the benefit of U.S. Provisional Application No. 60/613,151, filed Sep. 24, 2004.

FIELD OF THE INVENTION

This invention relates to an ambulance cot and accessories. This invention also relates to an ambulance cot having a wheel supported base and a litter raisable and lowerable by a powered elevating mechanism oriented between the base and the litter. This invention also relates to an ambulance cot having a wireless communication capability to facilitate communication between the ambulance cot and a loading system on an ambulance as well as facilitating wireless troubleshooting via a handheld wireless unit. This invention also relates to an ambulance cot having a longitudinally extendable head section with a latching mechanism to fix it in selected locations.

BACKGROUND OF THE INVENTION

Emergency Medical Service (EMS) personnel are required to handle the combined weight of a patient and the ambulance cot during various stages of maneuvering of the ambulance cot while separated from the ambulance. This cot manipulation often requires that the patient supported on the litter be lifted to various elevated heights above the floor. In some instances, the weight factor can cause EMS personnel injury that requires medical treatment.

As the inclusion of more and more sophisticated technology onto ambulance cots continues to occur, there is an increasing need to be able to quickly and accurately diagnose the complex equipment without requiring the ambulance cot to be removed from service.

Accordingly, it is advantageous to provide an ambulance cot equipped with an elevating mechanism to facilitate a lifting and lowering of the litter as well as an ability of the ambulance cot to communicate diagnostic issues in a convenient way without requiring removal of the ambulance cot from a field of use for a prolonged period of time.

SUMMARY OF THE INVENTION

This invention relates to an ambulance cot and accessories. This invention also relates to an ambulance cot having a wheel supported base and a litter raisable and lowerable by a powered elevating mechanism oriented between the base and the litter. This invention also relates to an ambulance cot having a wireless communication capability to facilitate communication between the ambulance cot and a loading system on an ambulance as well as facilitating wireless troubleshooting via a handheld wireless unit. This invention also relates to an ambulance cot having a longitudinally extendable head section with a latching mechanism to fix it in selected locations.

BRIEF DESCRIPTION OF THE DRAWINGS

Various objects and purposes of the invention will become apparent based upon a review of the following specification and upon a review of the several drawings, in which.

DETAILED DESCRIPTION

Ambulance Cot

Figure 1:
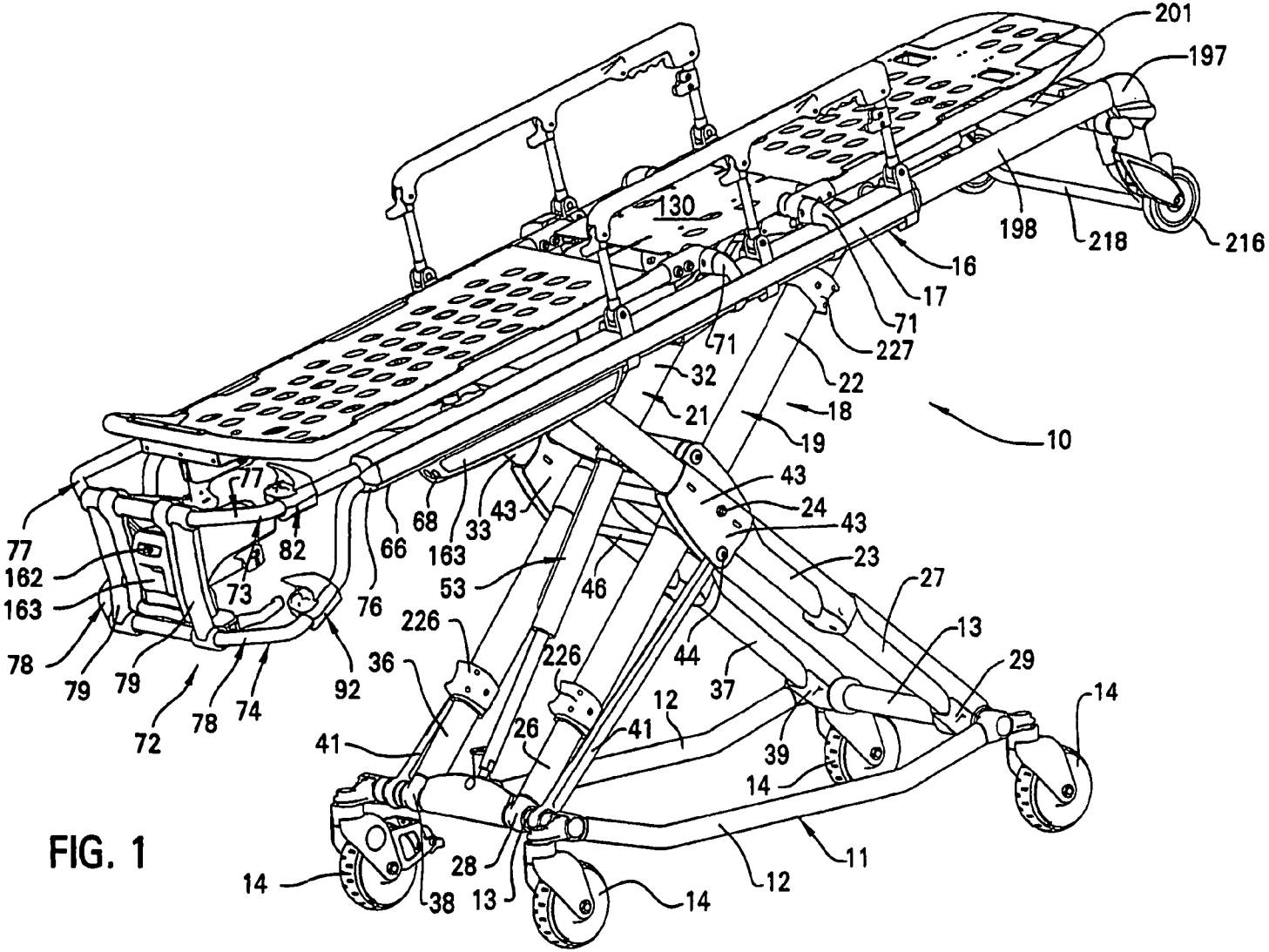
FIG. 1 is an isometric view of an ambulance cot embodying the invention, which ambulance cot is in the fully raised position.

An ambulance cot 10 embodying the invention is illustrated in the drawings. The ambulance cot 10 is similar to the ambulance cots disclosed in U.S. Pat. No. 5,537,700 and WO 2004/064698, the subject matters thereof being incorporated herein by reference. The ambulance cot 10 includes a base frame 11 composed of longitudinally extending side rails 12 and crosswise extending rails 13 interconnected at the ends thereof to the side rails 12 to form a rectangle. Castered wheels 14 are operatively connected to each corner of the rectangle base frame formed by the rails 12 and 13.

The ambulance cot 10 includes a litter 16 comprising a litter frame 17. An elevating mechanism 18 is provided between the base frame 11 and the litter frame 17 in order to facilitate a lifting and lowering of the litter 16 relative to the ground. More specifically, the elevating mechanism 18 includes a pair of side-by-side oriented "X" frames 19 and 21. The X frame 19 includes a pair of X frame members 22 and 23 connected together adjacent their midlength portions by means of a pivot axle 24. Each of the X frame members 22 and 23 is hollow and telescopingly receives therein a further X frame member 26 and an X frame member 27, respectively. The further X frame members 26 and 27 are supported for movement into and out of the respective X frame members 22 and 23. The distal end of the further X frame member 26 is secured via a connection 28 to the cross rail 13 at the left end (foot end) of the base frame illustrated in FIG. 1 whereas the distal end of the further X frame member 27 is connected via a connection 29 to the cross rail 13 at the right end of the base frame 11.

Figure 50:
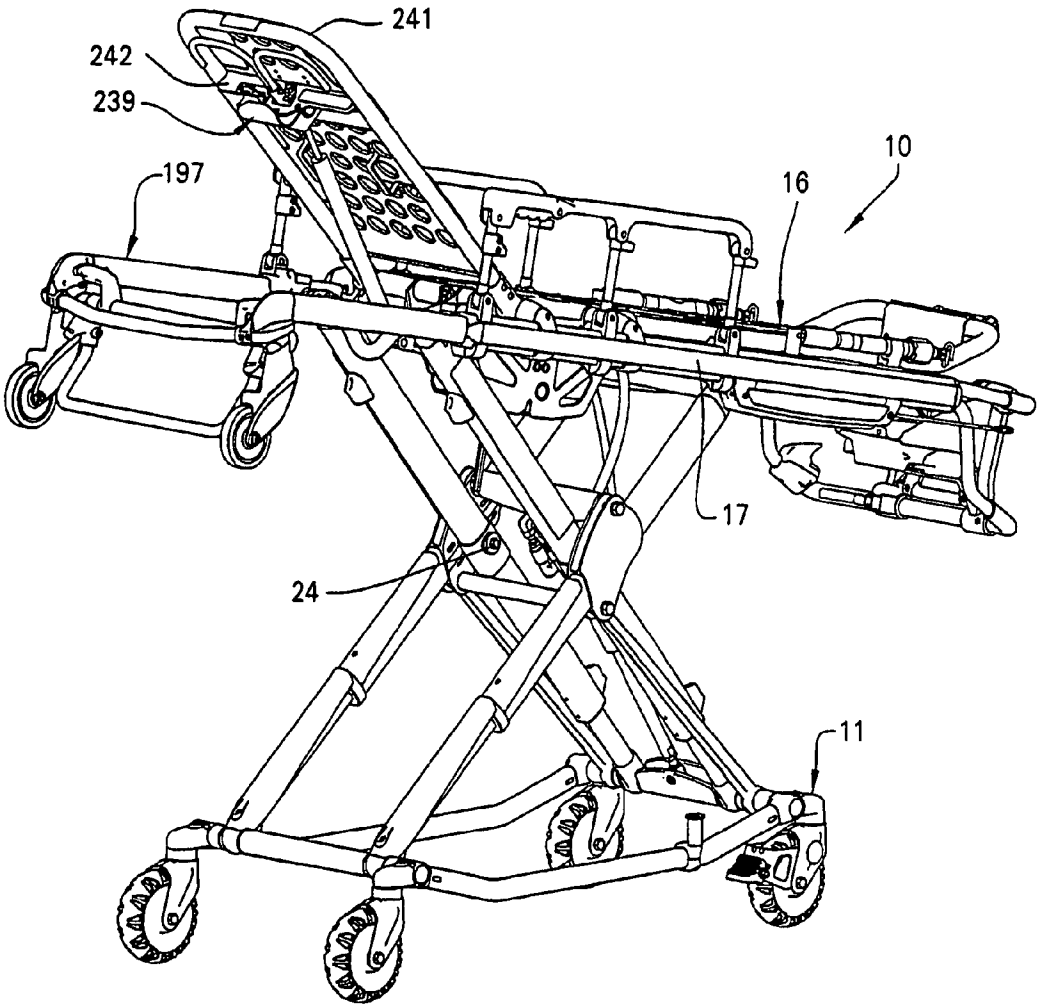
FIG. 50 is an isometric view of the head end of the cot and showing on the underside of the fowler an accessory hook.

The X frame 21 is similarly constructed and includes a pair of X frame members 32 and 33 which are connected together at about their midlength portions by the aforesaid axle 24. While the axle 24 is illustrated to extend laterally between the X frames 19 and 21, it is to be understood that separate axles 24 can, if desired, be employed (as shown in FIG. 50). The X frame members 32 and 33 are hollow and telescopingly receive therein a further X frame member 36 telescopingly received in the X frame member 32 whereas a further X frame member 37 is telescopingly received in the X frame member 33. The distal end of the further X frame member 36 is connected via a connector 38 to the cross rail 13 at the foot end of the base frame 11 and the distal end of the further X frame member 37 is connected via a connector 39 to the cross rail 13 at the head end of the base frame 11. The X frame members 22, 26 extend parallel to the X frame members 32, 36 whereas the X frame members 23, 27 extend parallel to the X frame members 33, 37.

Figure 4:
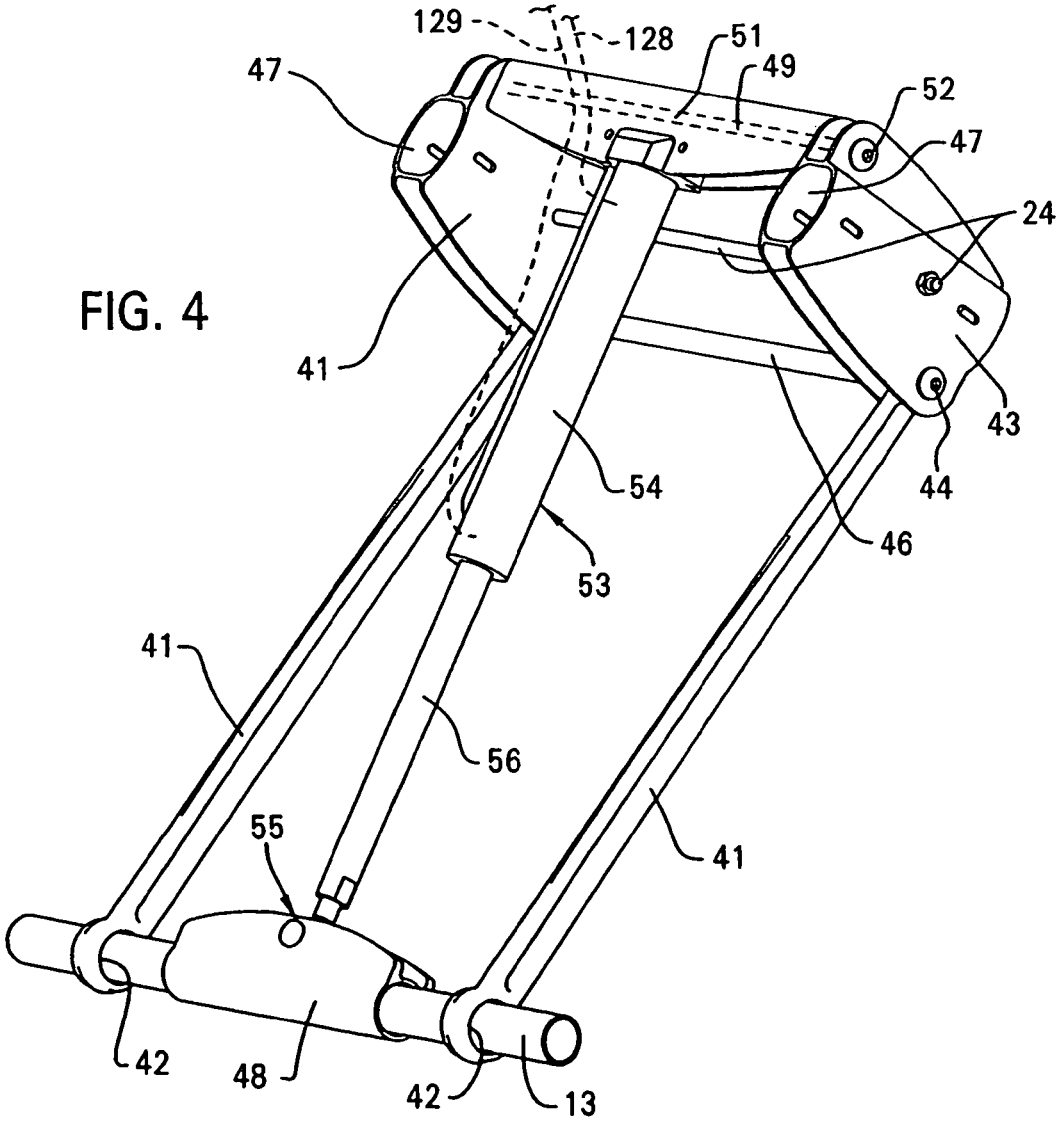
FIG. 4 is an isometric view of a fragment of the hydraulic elevating mechanism on the ambulance cot.

Referring to FIG. 4, the cross rail 13 at the foot end of the base frame 11 is illustrated. To the cross rail 13 there is pivotally connected a pair of laterally spaced linkage members 41. In this particular embodiment, each of the linkage members 41 includes at the end thereof adjacent the cross rail 13 a bore 42 which encircles the cross rail 13 to facilitate the pivotal connection of each of the linkages 41 about the longitudinal axis of the cross rail 13. The ends of each of the linkages 41 remote from the cross rail 13 are connected to respective laterally spaced brackets 43 by means of a fastener 44. In this particular embodiment, a sleeve 46 extends between the respective brackets 43 and receives therein the respective fastener 44 to facilitate the connection of the linkages 41 to the brackets 43. The axle 24 also facilitates a connection of the respective brackets 43. Each of the brackets 43 includes a receptacle 47 into which is received a respective X frame member 23 and 33 as illustrated in FIG. 1. In this particular embodiment, the axle 24 passes through an opening provided in each of the respective X frame members 23 and 33.

A first bracket 48 (FIG. 4) is fixedly secured to the cross rail 13. A second bracket 49 is secured to a rod 51 that is connected to and extends between the respective brackets 43. In this particular embodiment, the rod 51 is connected to each bracket by a respective fastener 52. It is to be noted that there is a spacing between the axle 24 and the respective rods 46 and 51. The purpose of this spacing will become apparent below.

At least one linear actuator 53 (two, if desired to provide improved stability) is connected to and extends between the respective brackets 48 and 49. In this particular embodiment, the linear actuator 53 includes a hydraulic cylinder housing 54 fastened to the bracket 49, which cylinder housing 54 includes a reciprocal rod 56 having a piston (not illustrated) at one end thereof located within the cylinder housing 54. The distal end of the reciprocal rod 56 is connected in a conventional manner by a universal-like joint 55 to the bracket 48. That is, the universal joint allows pivotal movement about two orthogonally related axes. As will be evident from FIG. 4, extension and retraction of the reciprocal rod 56 will facilitate movement of the brackets 43 about the axis of the rod 46. The end of the rod is lengthwise adjustable to accommodate tolerances encountered during production.

Figure 5:
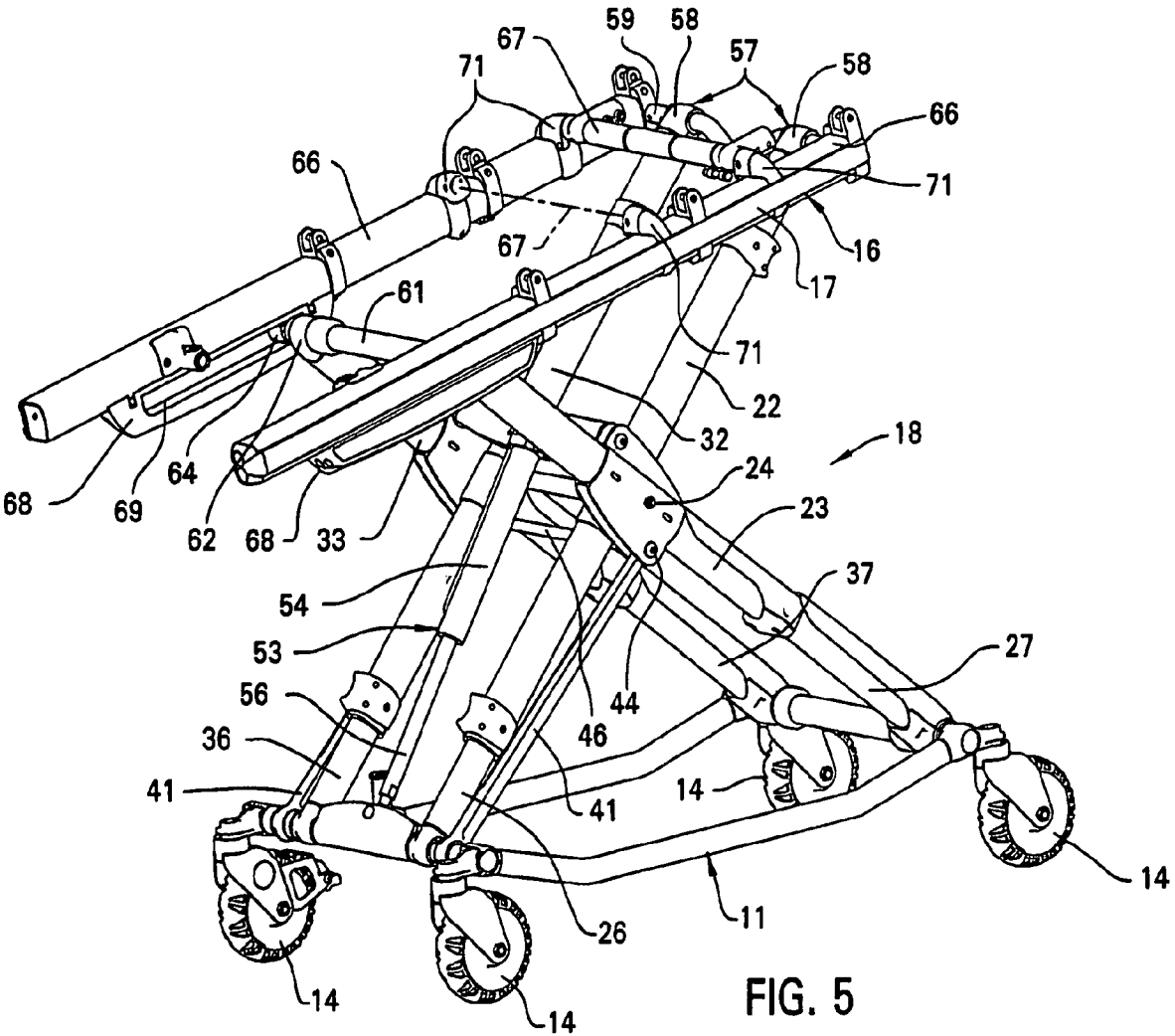
FIG. 5 is a fragmentary isometric view of the base, elevating mechanism and a fragment of the litter on the ambulance cot.
Figure 6:
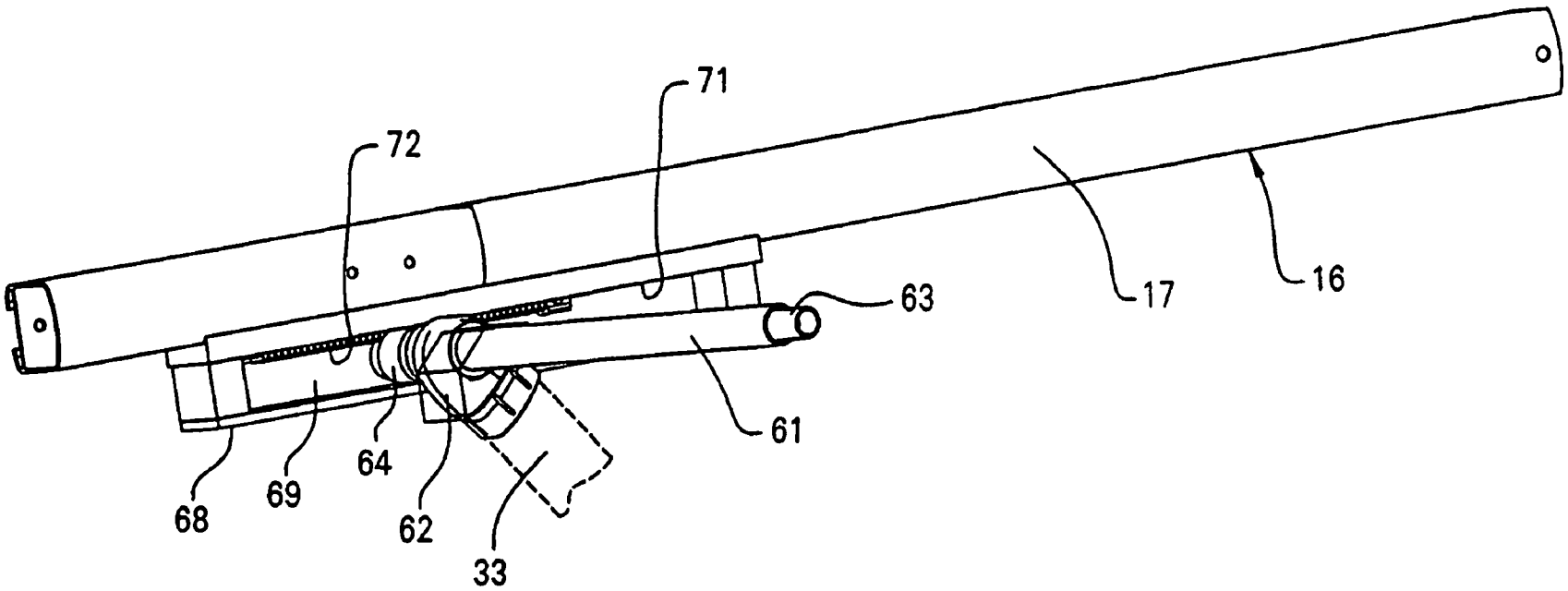
FIG. 6 is an isometric view of a fragment of the litter frame.

As is illustrated in FIG. 5, the ends of the X frame members 22 and 32 remote from the base frame 11 are each pivotally secured to a cross rail 59 adjacent the head end of the litter frame 17 as at 57 and by respective connectors 58. The connectors 58 are each relatively movable with respect to the cross rail 59. In one embodiment (FIG. 6), on the other hand, the ends of the X frame members 23 and 33 remote from the base frame 11 are connected by a hollow pivot tube 61 via connectors 62. Only one of the connectors 62 is illustrated in FIG. 6, it being understood that the end of the X frame member 23 remote from the base frame 11 also has a connector 62 thereon. A slide bearing (not shown) can, if desired, be provided to allow longitudinal movement of the X frame member 33 along the litter rail 66. Alternatively, a timing rod 63 can be relatively rotatably received inside the pivot tube 61. Opposite ends of the timing rod 63 have a pinion gear 64 fastened thereto and rotatable therewith. The purpose of the timing rod and the pinion gear 64 oriented at the opposite ends thereof will become apparent below. If desired, the X frame members 23, 33 and the pivot tube 61 can be welded together to enhance the overall strength and resistance to twisting characteristics.

As is shown in FIG. 5, the litter 16 comprises a litter frame 17 which consists of a pair of lengthwise extending side rails that are laterally spaced from one another, which side rails 66 are connected at the head end by the aforesaid cross rail 59, further cross rails 67 and other cross rails not illustrated. A housing 68 (see also FIG. 6) is secured to the underside of each of the side rails 66 at a location spaced from the head ends thereof. Each housing 68 has an inwardly opening recess 69 therein, the openings in each of the housings 68 opposing one another. In one embodiment, the openings 69 each have a downwardly facing upper wall 71 to which is secured a toothed rack 72 extending lengthwise of each of the respective side rails 66. The teeth of each of the pinion gears 64 are configured to mesh with the teeth of the toothed rack 72. Since the pinion gears 64 are fixedly secured to the timing rod 63, the mating teeth on the pinion gear 64 and the rack 72 will prevent twisting of the elevating mechanism 18 as it raises and lowers the litter 16 relative to the base frame 11.

In this particular embodiment, the longitudinally extending side rails 66 of the litter frame 17 are hollow. Thus, the cross rails 59 and 67 as well as others not specifically described are secured by brackets to the exterior surface of each of the side rails 66. Several of the brackets 71 are illustrated in FIG. 5.

Figure 8:
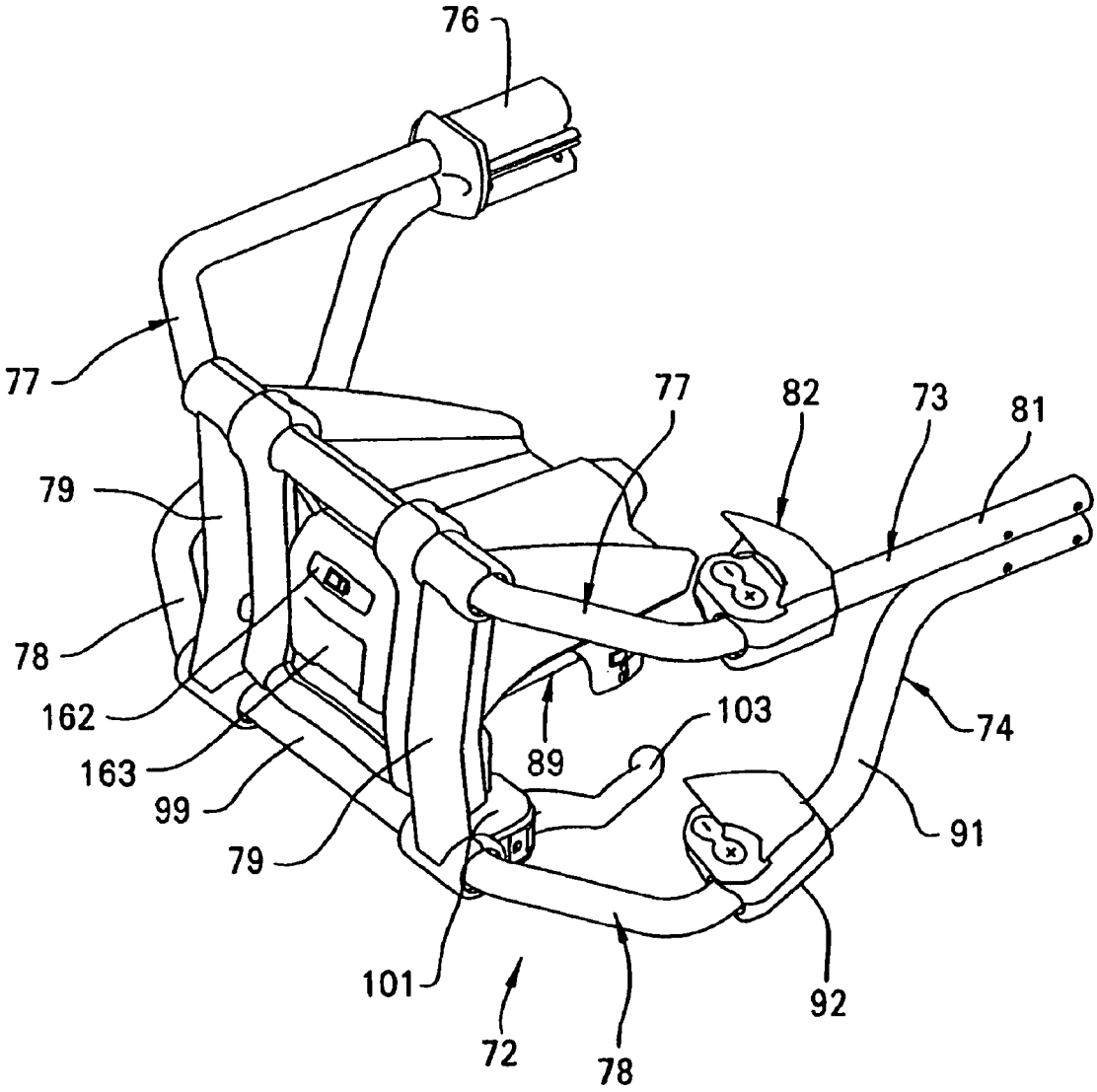
FIG. 8 is an isometric view of a foot end lift handle assembly on the ambulance cot.

A foot end lift handle mechanism 72 is illustrated in FIG. 8 and consists of a pair of vertically spaced U shaped frame members 73 and 74. The legs of each of the U shaped frame members 73 and 74 are joined together by a bracket 76 (only one bracket being illustrated in FIG. 8), which bracket 76 is fastened to the respective legs by fasteners not illustrated. Each bracket 76 is telescoped inside of the foot end of the respective side rail 66 as illustrated in FIG. 1. Further, the legs of the lower frame member 74 diverge away from the legs of the frame member 73 so that there is provided pairs of vertically spaced hand grip areas as at 77 and 78 on the respective frame members 73 and 74, respectively. Plural spacer brackets 79 are connected to the bight portions of each of the frame members 73 and 74 to maintain the vertical spacing between the grip areas 77 and 78. Fasteners (not illustrated) facilitate a connection of the brackets 76 to the interior of each of the respective side rails 66.

Figure 24:
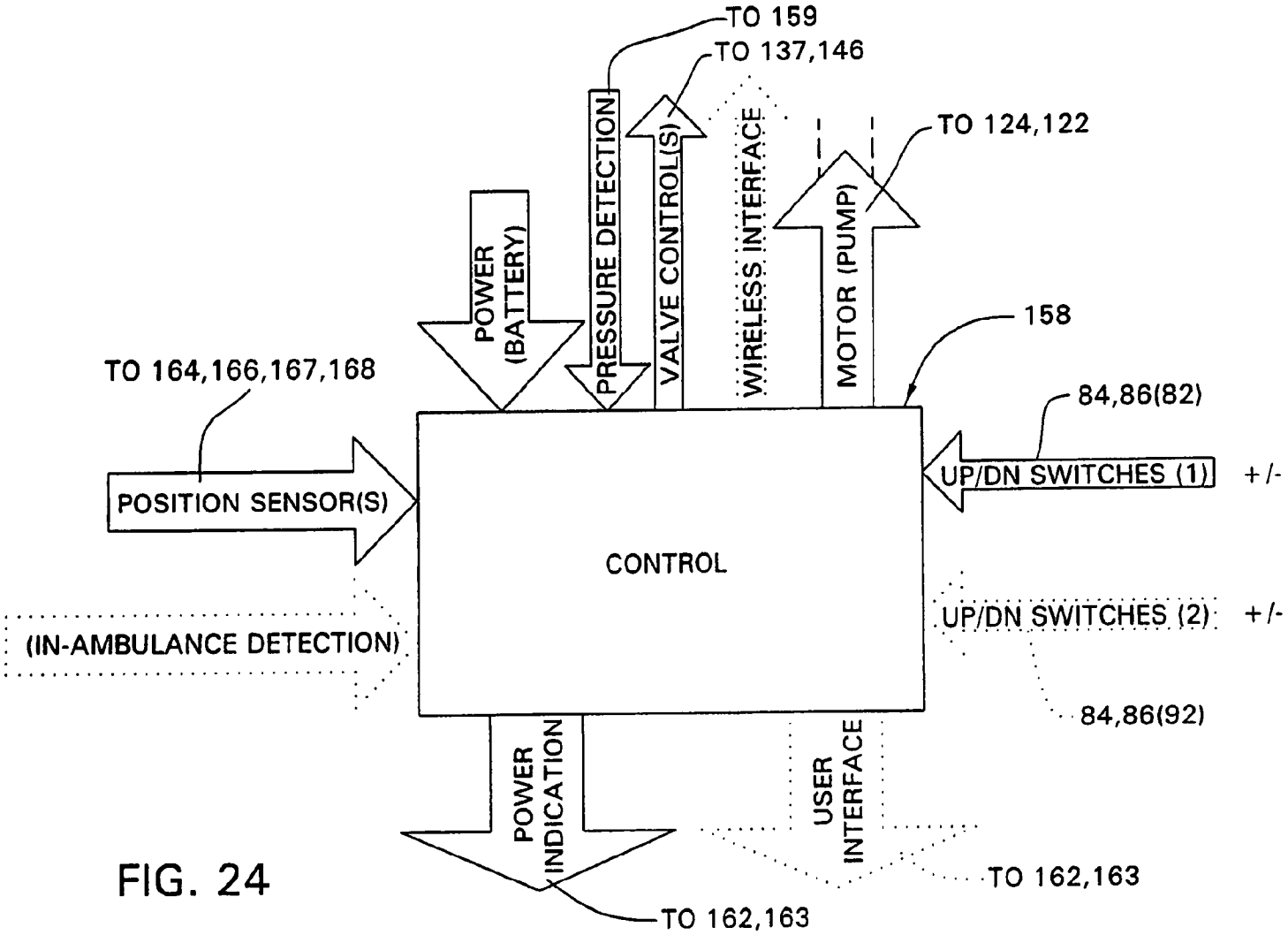
FIG. 24 is a schematic representation of a control for the hydraulic circuit.
Figure 47:
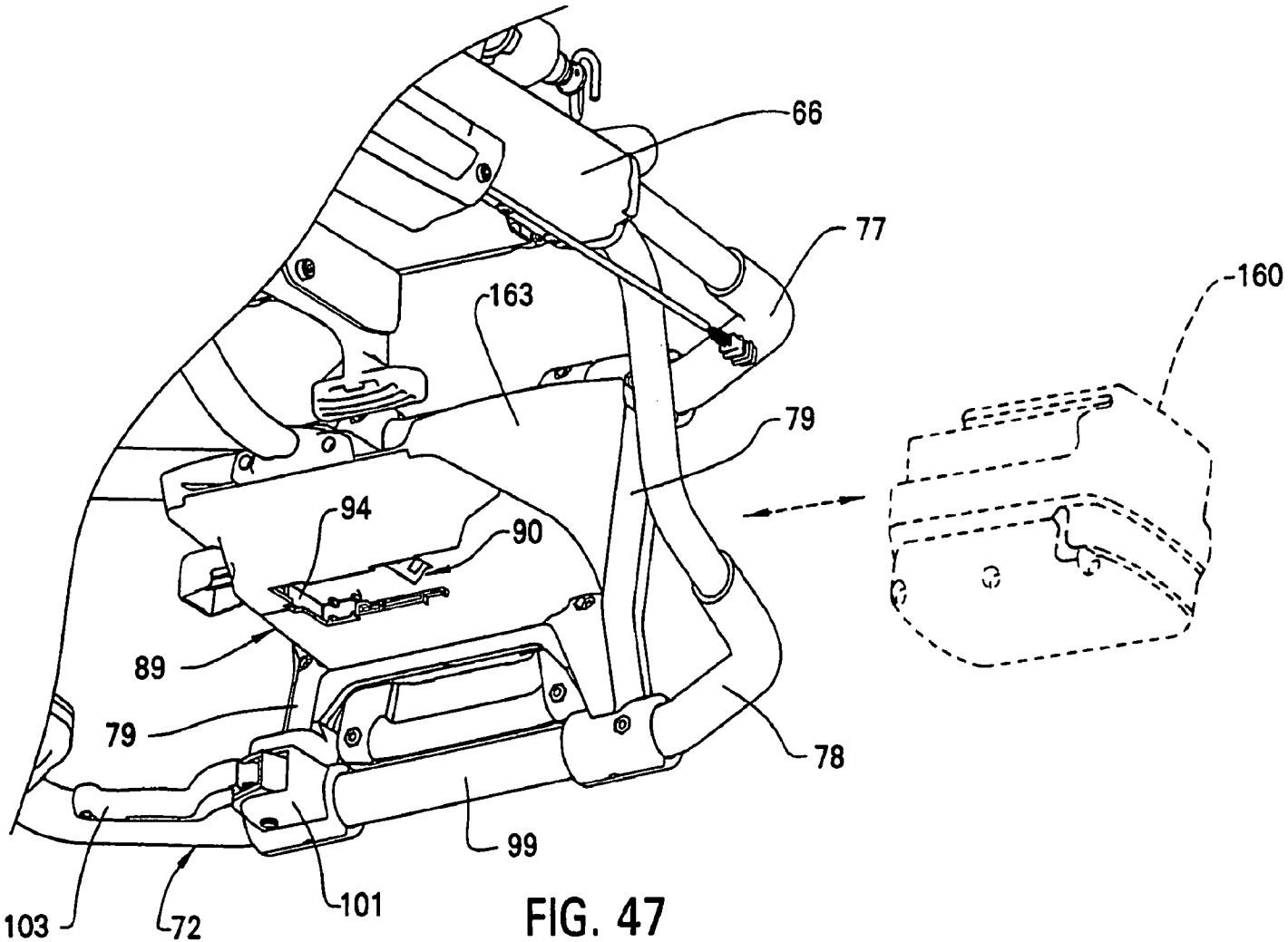
FIG. 47 is a bottom isometric view of the foot end lift handle assembly with a battery locked into an operating position.
Figure 48:
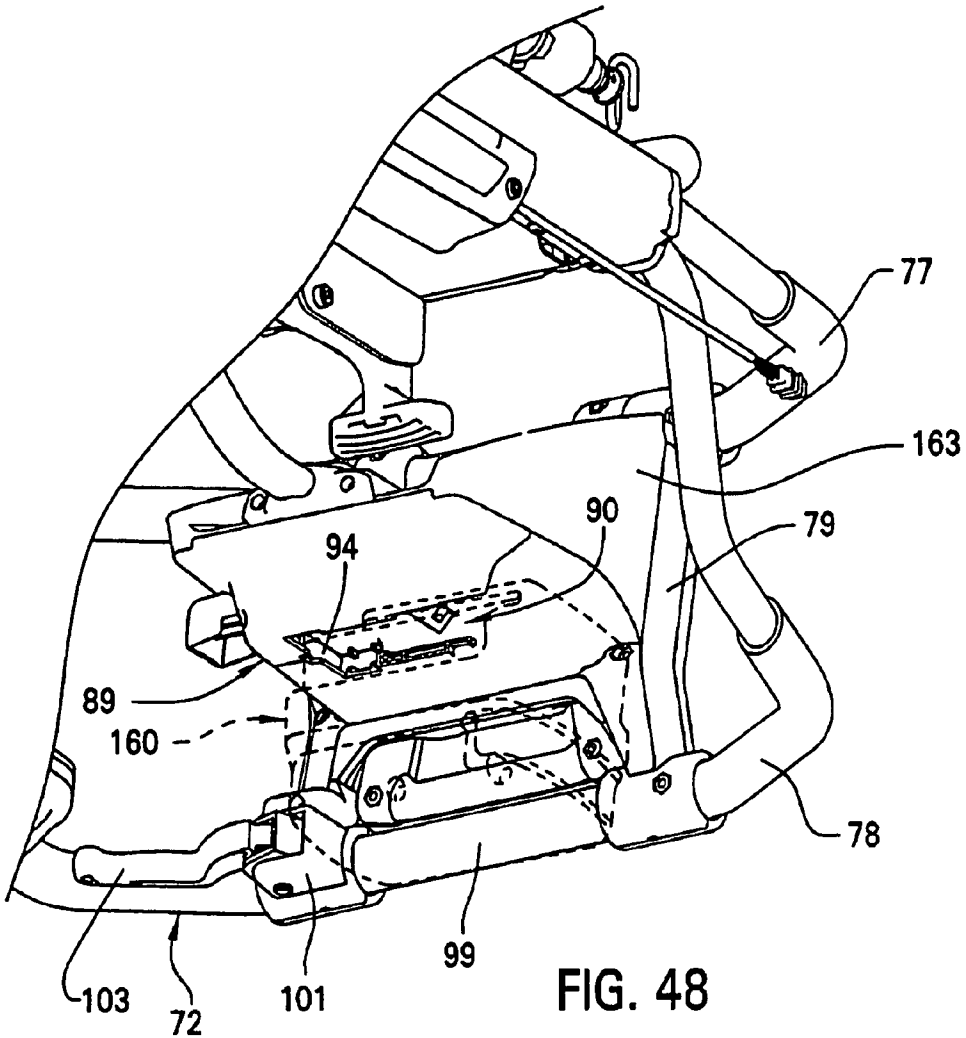
FIG. 48 is a view similar to FIG. 47 except that the battery has been moved to an inoperative position.

A battery mount 89 is secured to the foot end lift handle assembly 72, preferably to the underside of the assembly as show in FIGS. 47 and 48. The battery mount 89 includes a downwardly opening bayonet socket 90 having electrical contacts 94 exposed therein for connection to a properly configured battery 160 shown in broken lines. The manner in which the battery 160 connects to the electrical contacts 94 when the battery is in the broken line position shown in FIG. 48 is conventional and, therefore, further discussion about this connection is believed unnecessary. The electrical contacts 94 on the battery mount 89 are connected to the control 158 as schematically shown in FIG. 24. In order to connect the battery 160 into place in the battery mount 89, the battery is moved leftwardly from the FIG. 47 disconnected inactive position to the FIG. 48 connected and active position. The battery 160 in the installed position of FIG. 48 is releasably locked in place and is capable of withstanding excessive acceleration forces that will occur during an accident to remain locked in place in the FIG. 48 position.

Figure 9:
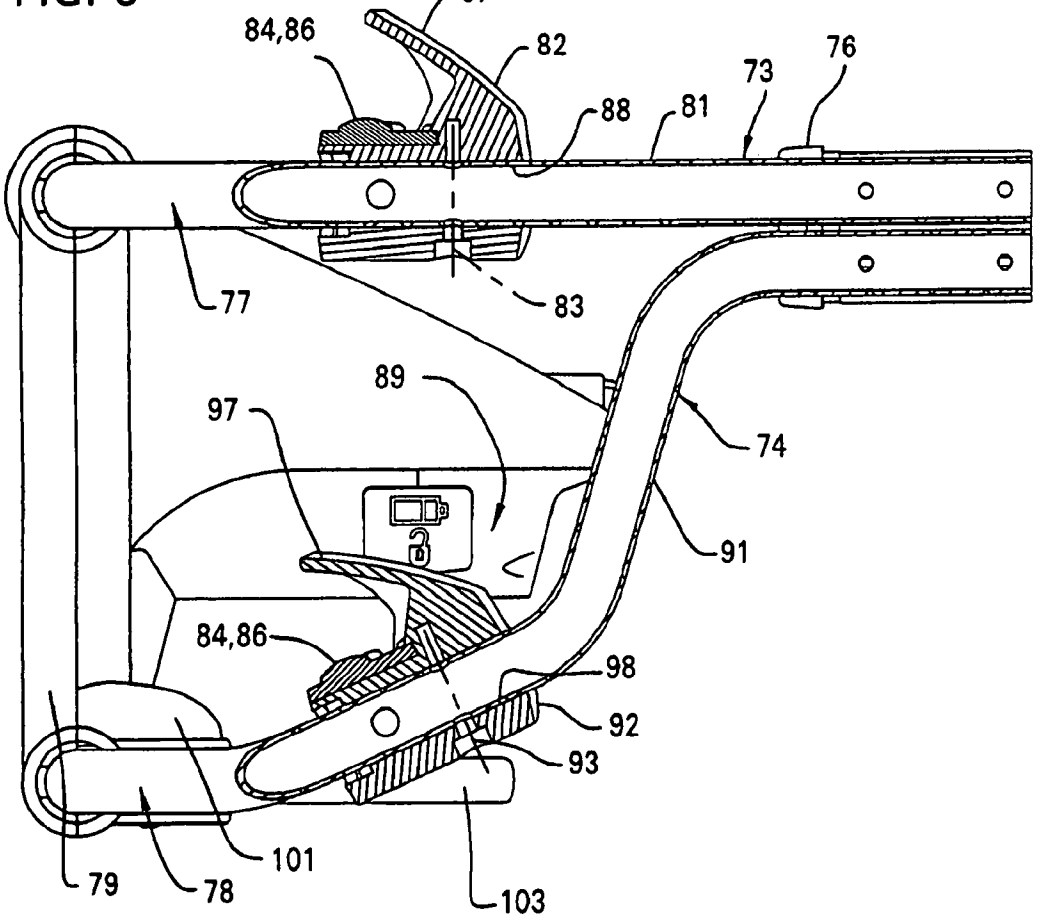
FIG. 9 is a side elevational sectional view of the foot end lift handle assembly sectioned through the switches.
Figure 10:
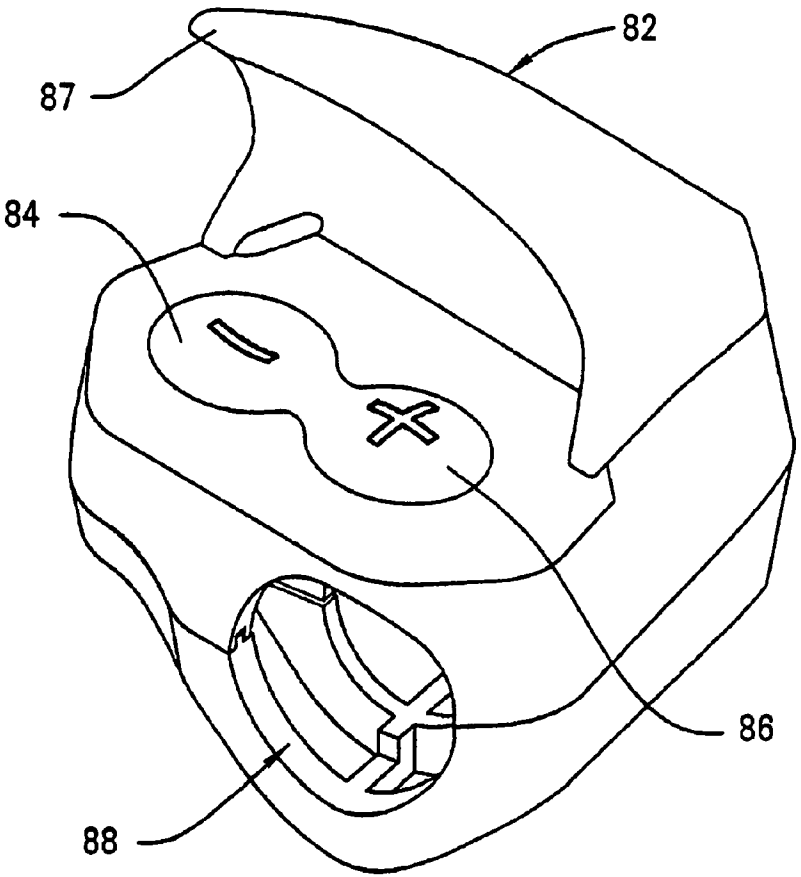
FIG. 10 is an isometric view of a switch housing that is mounted on the foot end lift handle assembly.

One leg 81 of the frame member 73 includes a switch housing 82 fastened thereto by at least one fastener 83 (FIG. 9). The switch housing 82 is located in an ergonomically advantageous position to the obvious grasping point of the user. An enlarged isometric view of the switch housing 82 is illustrated in FIG. 10. The switch housing has a pair of manually engageable buttons 84 and 86 thereon. The manually engageable buttons 84 and 86 are shielded from above by a shroud 87 and are of a low profile membrane design so as to prevent inadvertent actuation of the buttons 84 and 86 by a patient lying on the upper surface of the litter 16. That is, the shroud 87 is oriented at the head end of the switch housing 82. The switch housing 82 includes an opening 88 extending therethrough and through which the leg 81 of the frame 73 extends. The fastener 83 extends through a hole in the leg 81 to facilitate a connection of the housing 82 to the leg 81 extending through the opening 88.

Similarly, the leg 91 of the frame member 74 includes a further switch housing 92, located in an ergonomically advantageous position to the obvious grasping point for the user, having an opening 98 extending therethrough and through which the leg 91 extends. A fastener 93 facilitates a connection of the switch housing 92 to the leg 91 that extends through the opening 98. The switch housing 92 includes a construction identical to the switch housing 82 illustrated in FIG. 10 and it includes a pair of manually engageable buttons 84 and 86 which, as will be explained in more detail below, provide a redundant operation with respect to the buttons in the switch housing 82. The switch housing 92 also includes a shroud 97 similar to the shroud 87 and it is provided for the same purpose, namely, to shield the buttons 84, 86 from inadvertent actuation by a patient lying on the litter 16. In addition to the safety shrouds 87 and 97 preventing inadvertent actuation of the push buttons 84 and 86, each of the push button switches 84, 86 have a dual switch closing feature requiring both switch contacts to be closed (see FIG. 11) in order to effect the desired operation as will be explained in more detail below.

Figure 12:
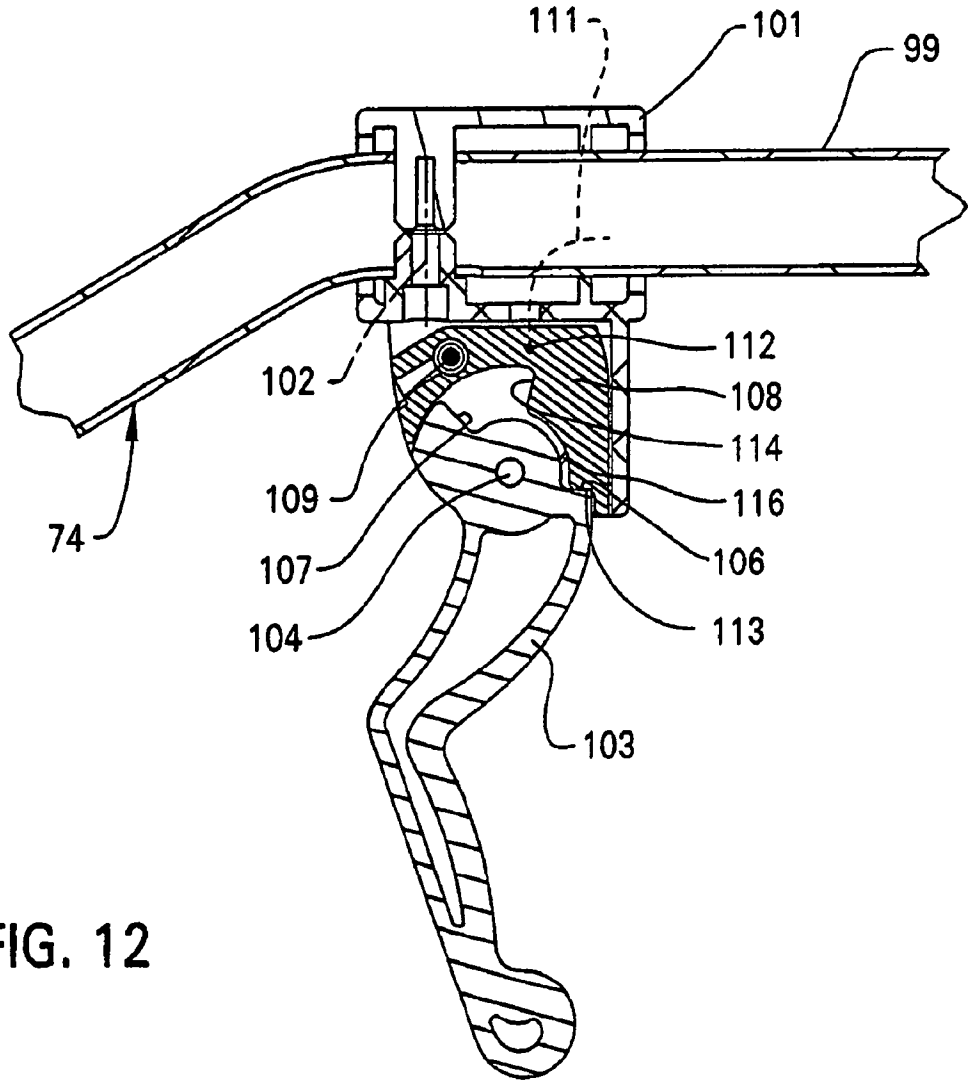
FIG. 12 is a bottom view of a release handle mechanism mounted on the foot end lift handle assembly, which handle is in the stowed position.
Figure 13:
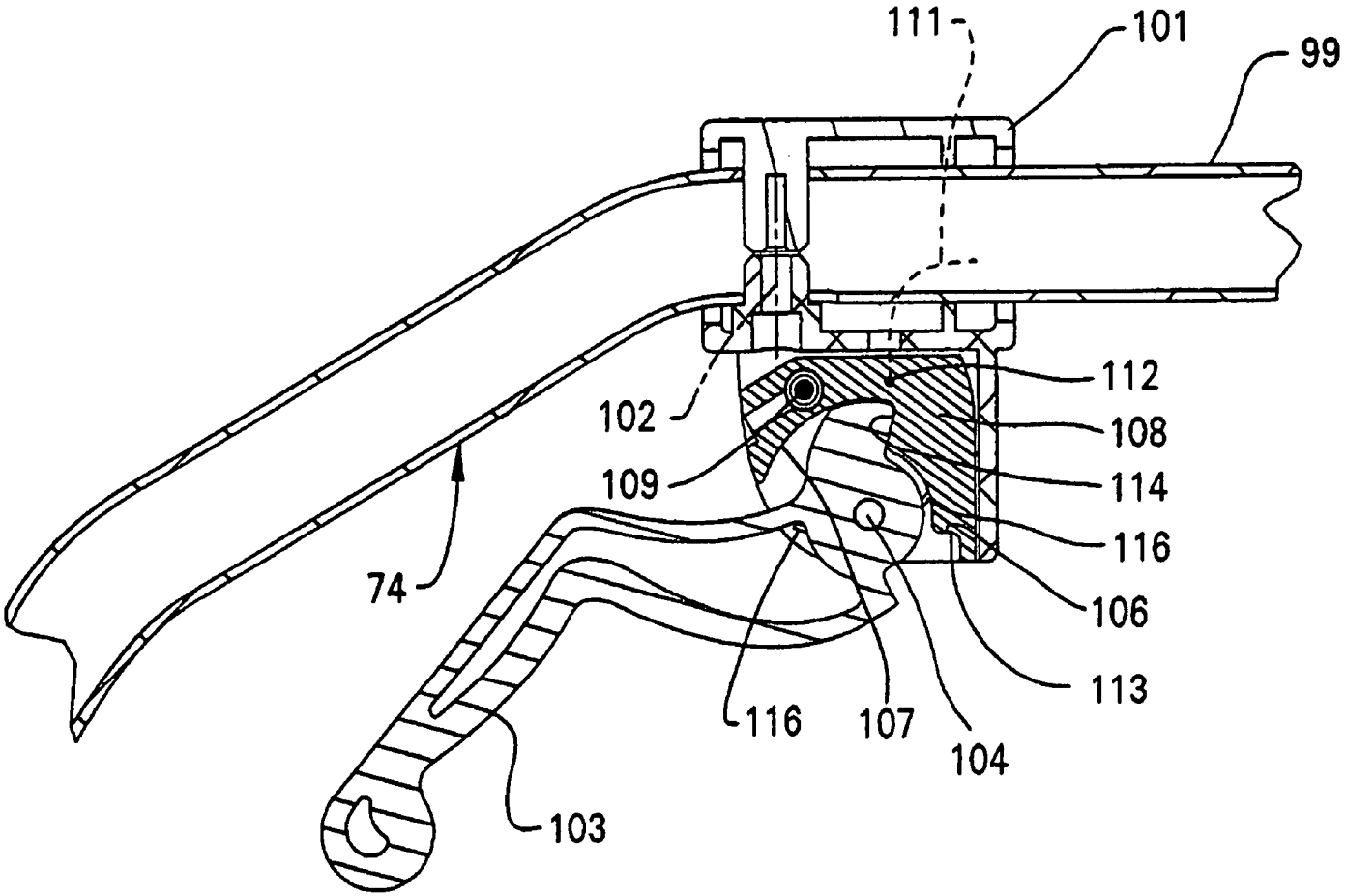
FIG. 13 is a view similar to FIG. 12, except that the handle has been shifted to an operative position.
Figure 14:
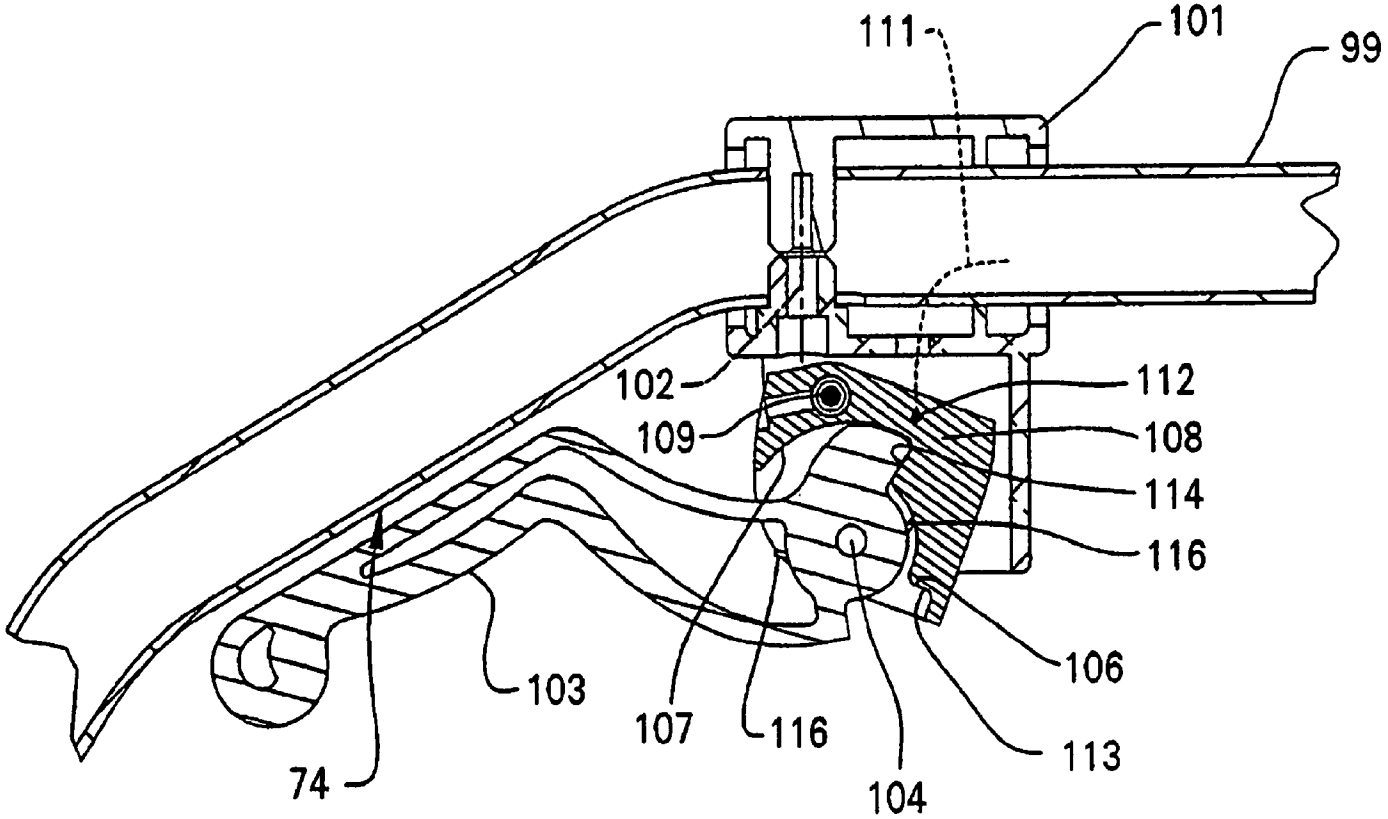
FIG. 14 is a view similar to FIG. 13, except that the handle has been moved to an operated position.

The bight section 99 of the frame member 74, particularly at the base of one of the spacers 79, there is provided a bracket 101 secured to the bight section by a fastener 102 (FIG. 12). A manually engageable handle 103 is pivotally secured to the bracket 102 by a pivot axle 104. The handle includes a pair of arcuately spaced shoulders 106 and 107. A cable support member 108 is pivotally secured to the bracket 101 by a pivot axle 109. A cable, here a Bowden cable 111, is fastened as at 112 to the cable support 108 (at one end) while the other end is fastened to a valve actuation device which will be explained in more detail below. The cable 111 extends into and through the hollow interior of the frame member 74. The cable support member 108 has a pair of arcuately spaced shoulders 113 and 114 that operatively cooperate with the arcuate shoulders 106 and 107, respectively, as will be explained in more detail below. The handle 103 as illustrated in FIG. 12, is in a stowed out of the way position. When it is desired to move the handle and use it for operation of the ambulance cot, it is shifted clockwise in its position from the position illustrated in FIG. 12 to the position illustrated in FIG. 13 at which time the shoulder 107 engages the shoulder 114 on the cable support member 108. When the handle 103 is further pivoted clockwise about the axle 104 to the position illustrated in FIG. 14, the cable support member 108 will pivot about the axle 109 to effect a pulling of the cable 111 to effect actuation of a valve structure that will be described in more detail below. A torsional spring 116 (only the ends of which are illustrated in FIGS. 12-14) serves to continually urge the handle 103 counterclockwise to the stowed position so that the shoulders 106 and 113 will engage one another.

Figure 15:
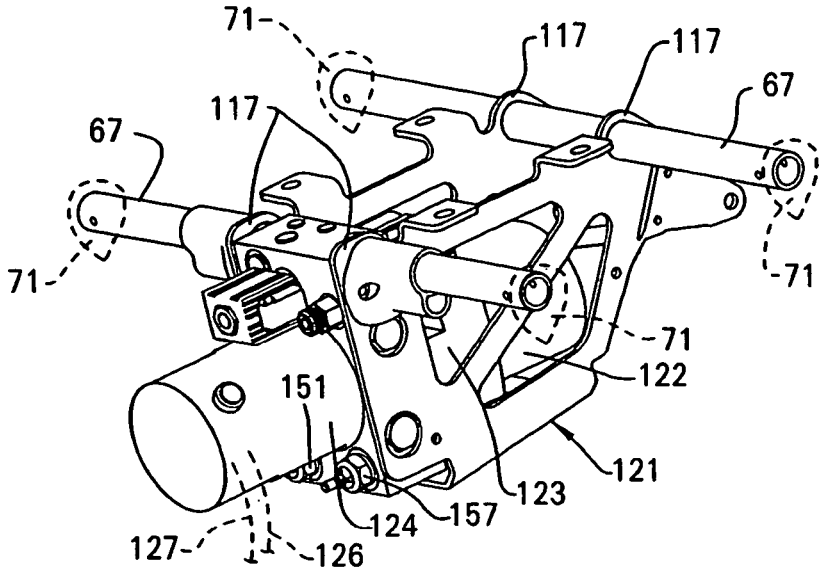
FIG. 15 is an isometric view of a mounting assembly on the ambulance cot for the hydraulic circuit.

Referring to FIG. 5, and as stated above, there is provided a pair of longitudinally spaced brackets 71 on each of the side rails 66. Between laterally spaced ones of the brackets 71, there extends a respective cross rail 67. Referring to FIG. 15, these cross rails 67 support a hydraulic assembly bracket 121. More specifically, the hydraulic assembly bracket 121 includes several ears 117 which operatively engage the respective cross rails 67 and from which ears is suspended the hydraulic assembly bracket 121. The hydraulic assembly bracket 121 is generally U shaped with the bight section forming a base upon which is mounted a variable speed electric motor 122, a hydraulic manifold plate 123 and a hydraulic pump 124. The hydraulic pump 124 has two outlets 126 and 127. The hydraulic outlets 126 and 127 are connected through hydraulic conduits 128, 129, respectively (FIG. 4), to respective opposite ends of the hydraulic cylinder housing 54. In this particular embodiment, the cross rails 67 also provide a support for a seat section 130 (FIG. 1) on the litter 16.

Figure 16:
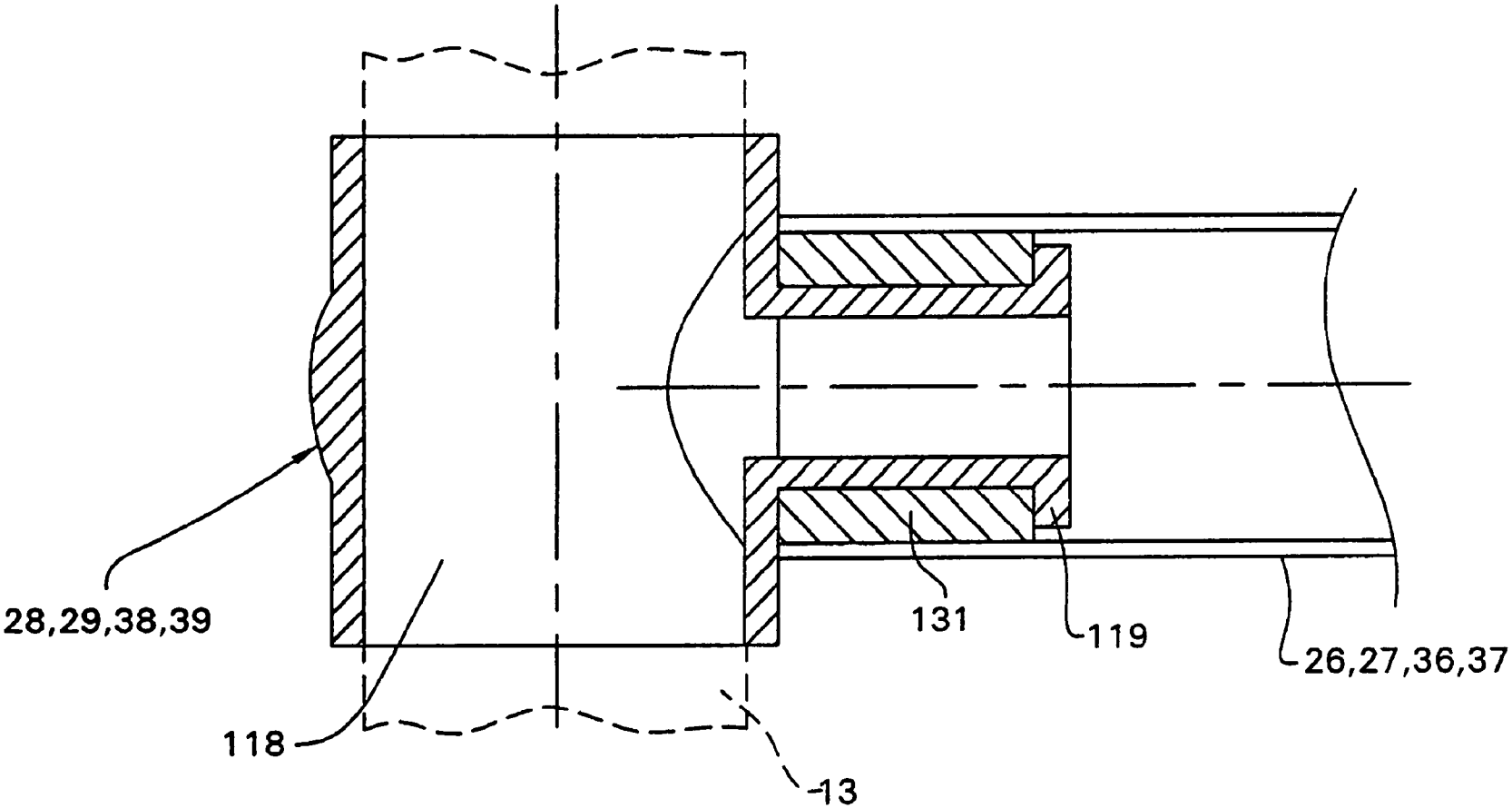
FIG. 16 is a fragmentary sectional view of a portion of the base whereat the base connects to an X frame member.
Figure 17:
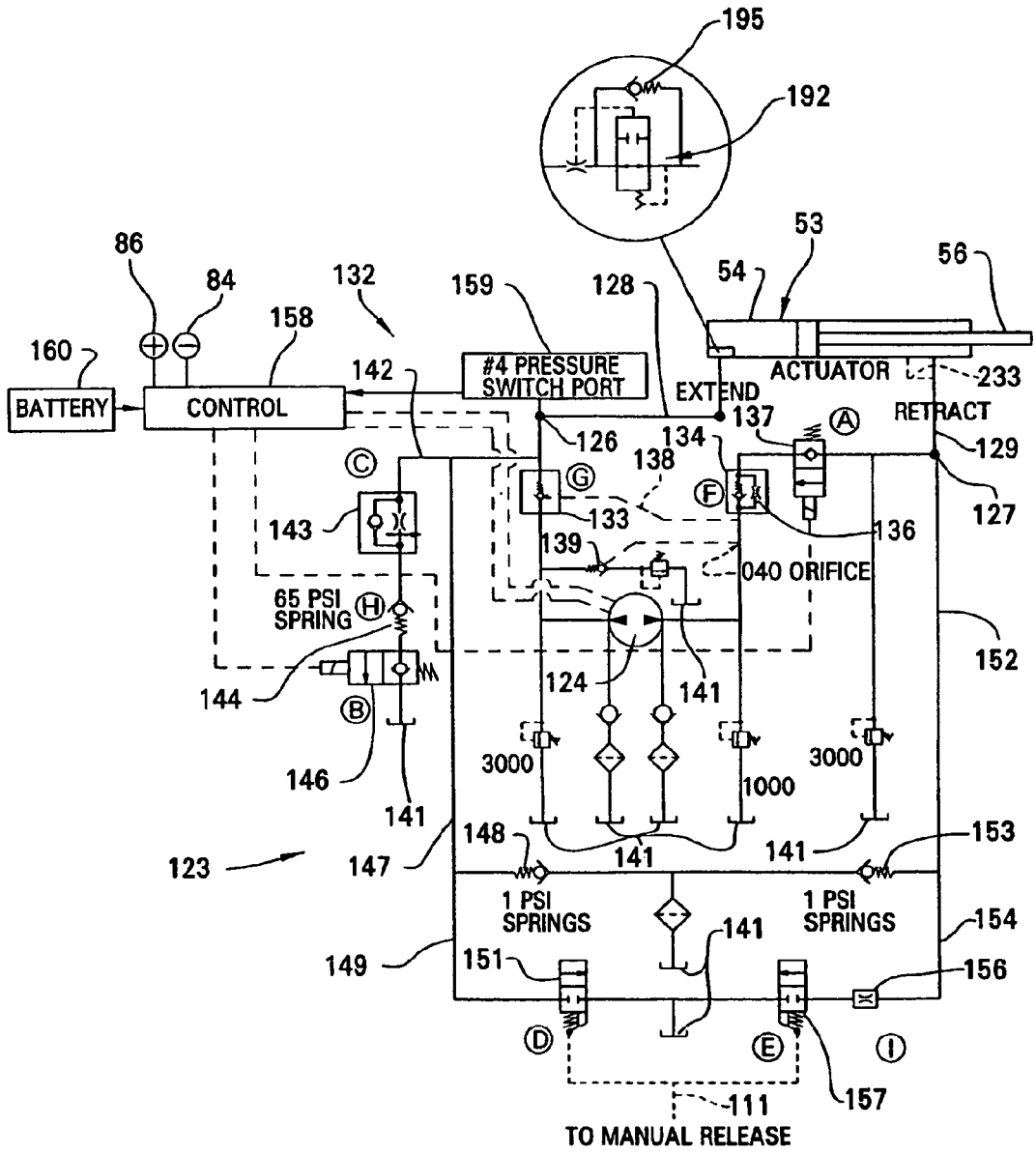
FIG. 17 is a hydraulic circuit diagram embodied on the ambulance cot.
Figure 49:
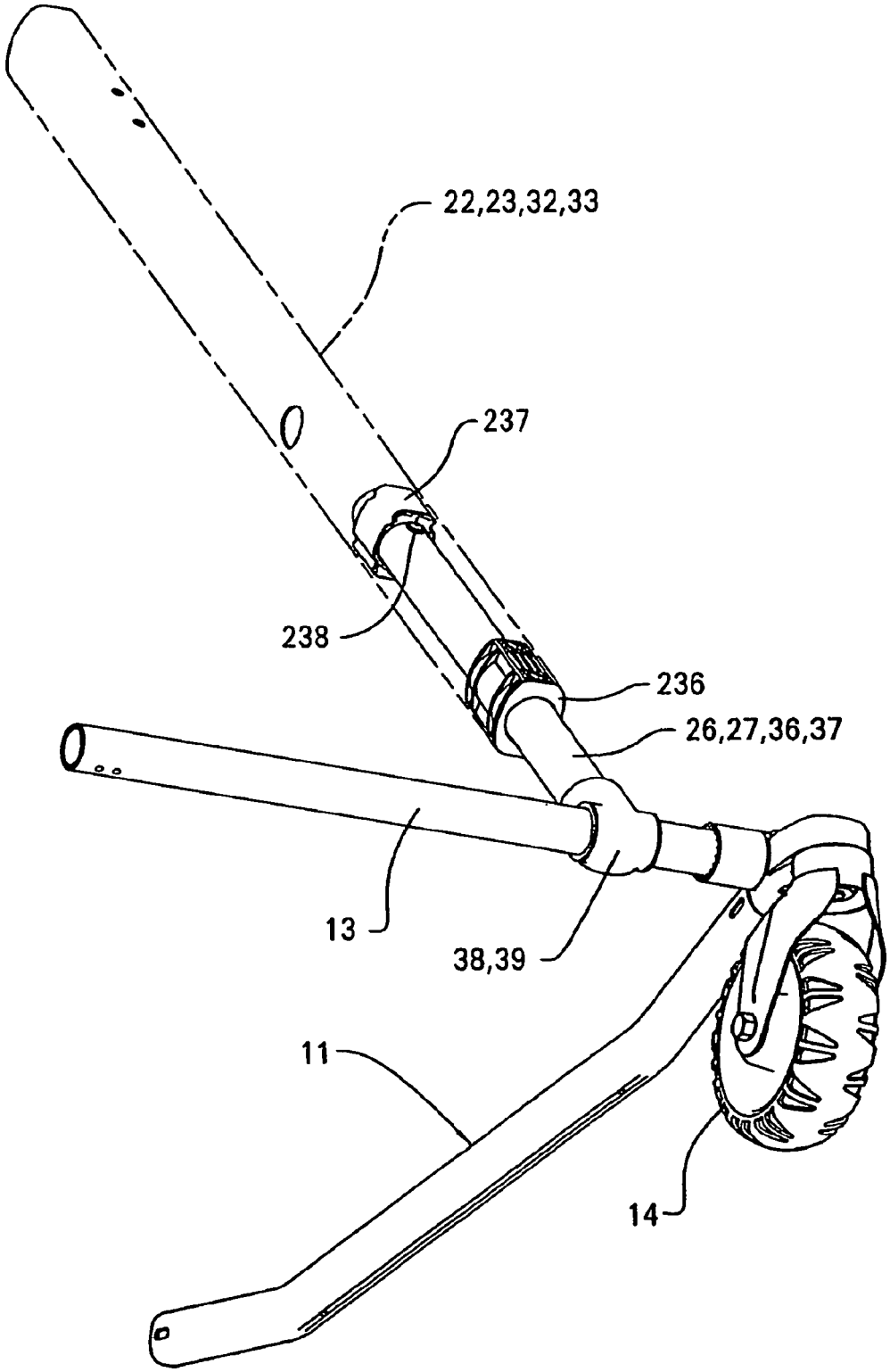
FIG. 49 is a fragmentary isometric view of a non-circular X frame member receiving therein a circular further X frame member.

Referring to FIGS. 1 and 16, the further X frame members 26, 27, 36 and 37 are all connected through respective connectors 28, 29, 38 and 39 to a cross rail 13. FIG. 16 illustrates a representative example of the connectors 28, 29, 38 and 39. That is, each connector includes a sleeve 118 that encircles the cross rail 13 and includes a stem 119 that is telescoped inside the interior of each of the respective further X frame members 26, 27, 36, 37. A bearing assembly 131 is provided between the stem 119 and the interior surface of the further X frame members 26, 27, 36, 37. Thus during normal use, off center loads and flex in the aluminum frame members may cause some twisting in the geometry of the frame members which will cause a binding of the mechanism. In order to accommodate this twist, the bearing assembly 131 will facilitate a relative rotation between the sleeve 118 and the further X frame members 26, 27, 36, 37. The bearing assembly 131 becomes particularly important when the X frame members 22, 23, 32, 33 are not circular in cross section and the further X frame members 26, 27, 36, 37 are circular in cross section (as depicted in FIG. 49). That is, a bushing 236 is fixedly positioned inside the non-circular X frame members 22, 23, 32, 33, which bushing 236 has a circular opening therethrough through which the further X frame members 26, 27, 36, 37 slidably extend. The end of the further X frame members 26, 27, 36, 37 remote from the base 11 have a further bushing 237 longitudinally slidably disposed in the X frame members 22, 23, 32, 33. The bushing 237 is relatively moveably secured to the respective further X frame members 26, 27, 36, 37, such as through the use of a rivet and washer mechanism 238 being secured to the further X frame members 26, 27, 36, 37 on opposite sides of the bushing 237 so as to prevent a relative longitudinal movement of the bushing 237 along the length of the further X frame members and so that the further X frame members can rotate about their respective longitudinal axes relative to the bushing 237.

Hydraulic Circuit

A hydraulic circuit 132, illustrated in FIGS. 17-23, is included in the manifold plate 123 (FIG. 15). It is to be understood that the pump 124 and the linear actuator 53 and the conduits carrying hydraulic fluid to the linear actuator 53 are preferably always filled with hydraulic fluid. Further, the pump 124 is reversible and the electric motor 122 driving same is also reversible. As a result, there will be no delay in actuation of the linear actuator in response to an operation of the pump 124 by the electric motor 122. The output of the pump 124, in one direction of operation, will supply hydraulic fluid through a pilot operated check valve 133 to the outlet 126 connected through the hydraulic conduit 128 to the end of the cylinder housing 54 remote from the reciprocal rod 56. Operation of the pump 124 in the opposite direction will direct fluid through a poppet valve 134 having in parallel therewith an orifice or fluid throttle 136 and a two way poppet valve 137 to the outlet 127 which in turn is connected through a conduit 129 to the end of the cylinder housing 54 adjacent the reciprocal rod 56. The fluid controlling the pilot operated check valve 133 is delivered to it through a conduit 138 connected to the fluid path intermediate the poppet valve 134 and the pump 124. There is also provided a pressure relief operated check valve 139 connected at one end between the pilot operated check valve 133 and the pump 124 and, at the other end, to a tank or reservoir for the hydraulic fluid. Intermediate the pilot operated check valve 133 and the outlet 126, there is provided a fluid passageway 142 extending to a series connected pressure compensated flow controller 143, a spring controlled check valve 144 and a two way poppet valve 146 connected to the tank 141. The spring is sized in this check valve so as to provide a dampening against a surge of fluid when passively lowering. This prevents a lurch in the lowering action providing increased comfort to the patient during lowering. The passageway 142 includes a further passageway 147 connected through a spring biased check valve 148 to tank 141, on the one hand and through a passageway 149 to a manual release valve 151 also connected to tank 141. The outlet 127 is connected through a passageway 152 to a spring biased check valve 153 connected to the tank 141, on the one hand, and through a passageway 154 to a series connected fluid throttle 156 and thence to a further manual release valve 157 connected to the tank 141.

Figure 25:
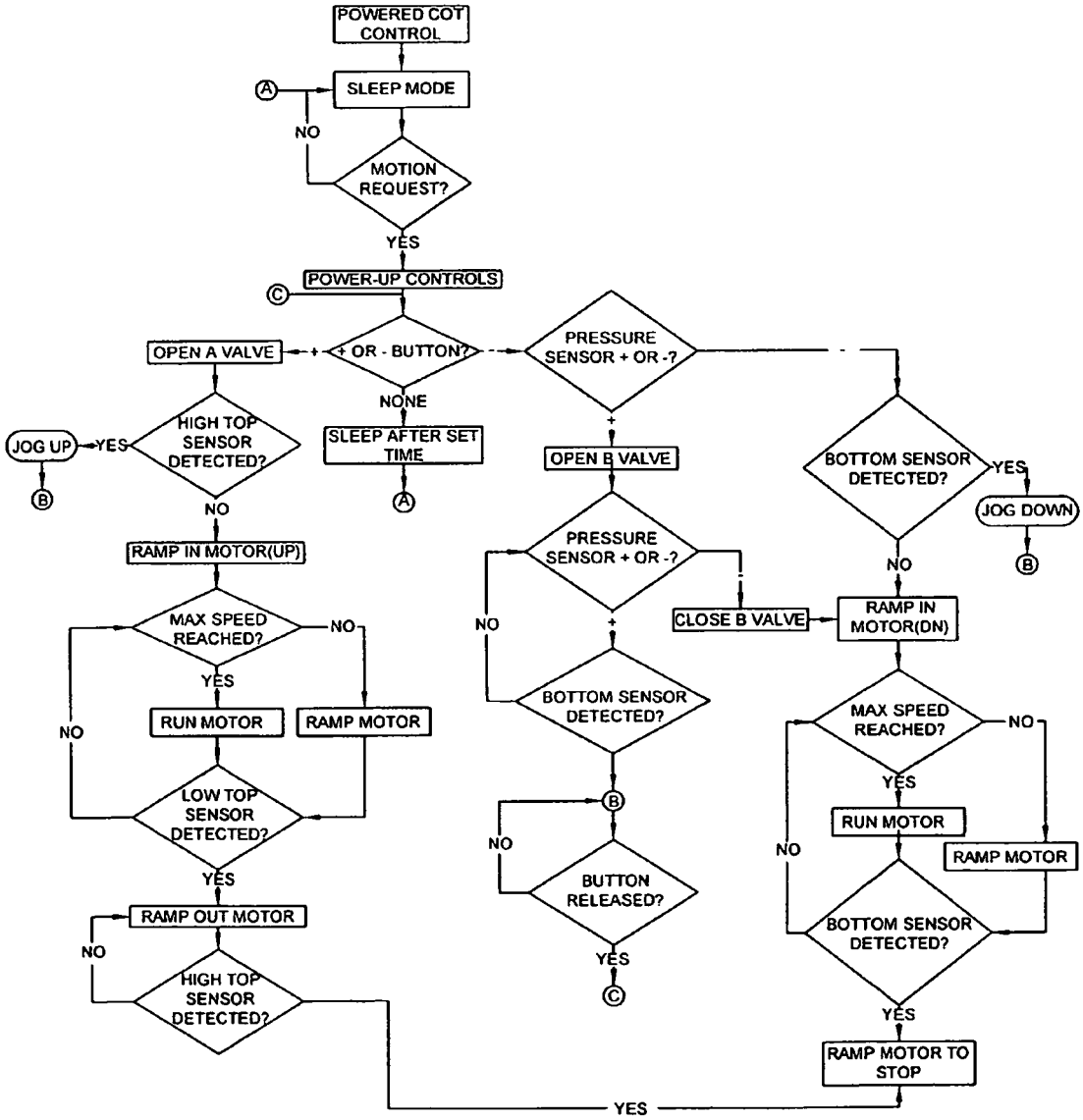
FIG. 25 is a decision tree diagram representative of the operational characteristics of the control illustrated in FIG. 24 and the hydraulic circuit of FIGS. 17-23.

The hydraulic circuit 132 is controlled by a control mechanism 158, which control mechanism is also schematically represented in FIGS. 24 and 25. A hydraulic fluid pressure monitoring mechanism 159 is connected to the outlet 126 and provides a signal indicative of the magnitude of the fluid pressure to the control mechanism 158. The battery 160 (FIGS. 47 and 48) on board the ambulance cot provides power to the control mechanism 158. The charged status of the battery 160 is linked to a display 161 on a user interface 162 mounted on the foot end lift handle assembly 72 near the battery mount 89, particularly between the spacer members 79. The user interface 162 also includes a mode switch (not illustrated) for allowing the user interface to display a multitude of different functions, one of which can be an hour meter indicative of the total elapsed time that the electrical motor 122 has been operated, such as "HH:MM", where H is hour and M is minute or in tenths of an hour such as "HH.H hours". Any other indication of total elapsed time from a set point is contemplated. In addition, it is also possible for the user interface to display the elapsed amount of time that the control 158 has been on, the elapsed amount of time a certain switch is activated, the elapsed amount of time certain valves have been actuated or the elapsed amount of time a certain pressure has been maintained on the system. These values may be combined to a suitable display to accurately determine the amount of wear that can be expected on the system. As a result, ambulance attendants can more accurately determine what preventative maintenance is required based upon the aforesaid displays. Additionally, a symbol (preferably iconic) can be provided at pre-programmed interval(s) to indicate when service may be necessary.

Figure 26:
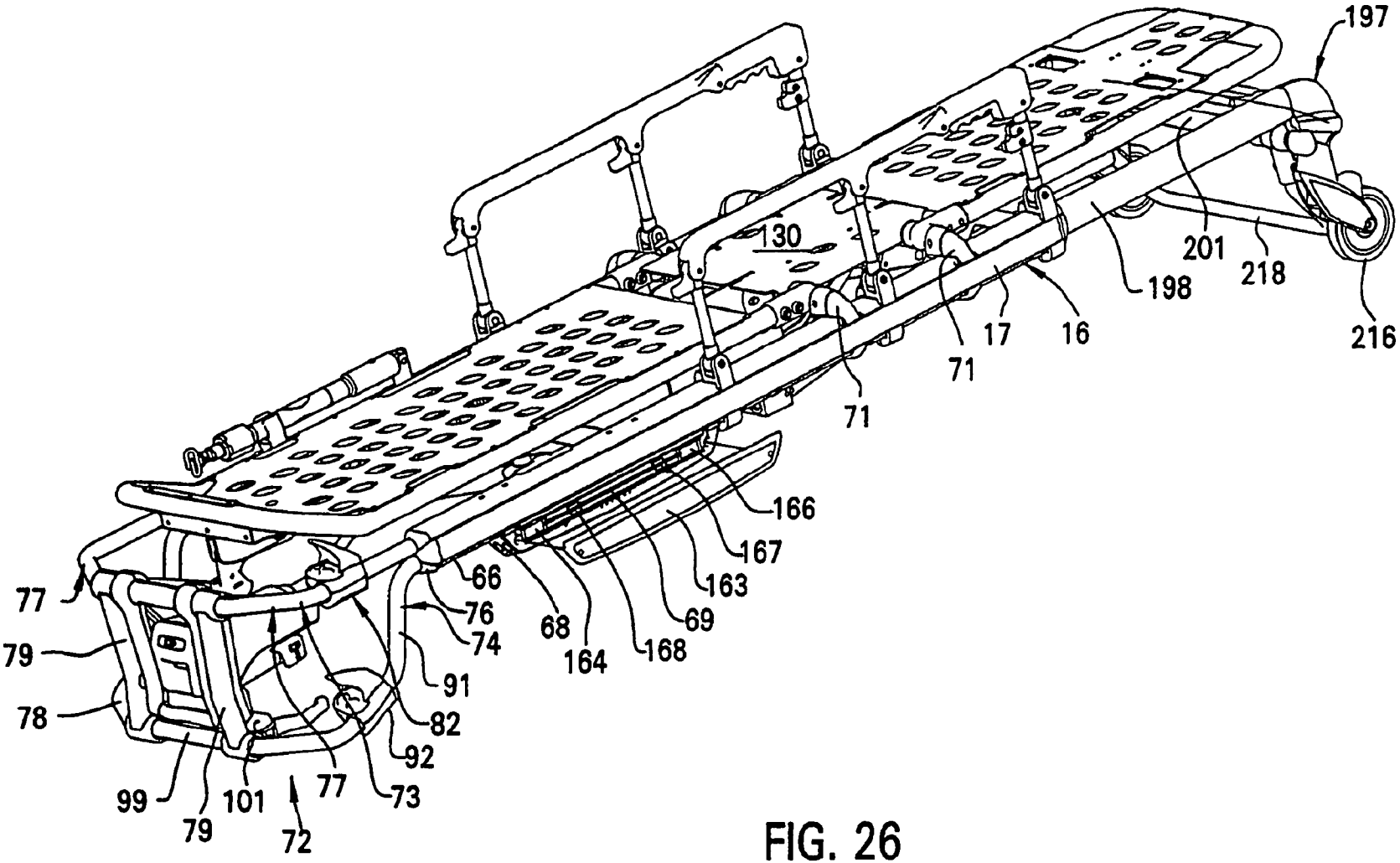
FIG. 26 is an isometric view of the litter and similar to the illustration in FIG. 1.

The control mechanism 158 also receives signals from position sensors provided on the ambulance cot. More specifically, and referring to FIG. 26, a cover 163 has been removed from the housing 68 to reveal the opening 69 inside the housing. A first transducer 164 is provided inside the opening 69, particularly at the foot end of the opening 69 whereas a second transducer 166 is oriented at the head end of the opening 69. These transducers 164 and 166 are, in this embodiment, Hall effect sensors which are used to indicate the low and high heights of the ambulance cot. Alternatively, proximity sensors or reed switches can be employed in place of the Hall effect sensors. These transducers are adjustably positioned in the opening 69 such that they detect a magnetic field of a magnet mounted, for example, on one end of the pivot tube 61 (FIG. 5) or on the slide bearing thereat (not shown) and oriented on the outboard side of the pinion gear 64 or slide bearing located thereat. Thus, as the pinion gear 64 approaches either one of the transducers 164 or 166, the magnetic field of the magnet will saturate the respective transducer to create an appropriate signal to the control mechanism 158 that is indicative of the height position of the cot. The position of the transducers 164, 166 are variable lengthwise of the opening 69 so as to provide an ability to effect a height adjustment for the ambulance cot in both its collapsed and its uppermost position. A specific advantage of having a movable second transducer 166 is that the high height of the ambulance cot can be adjusted to provide a stopping point custom adjusted to a specific ambulance for ease of loading the cot into the ambulance. A further transducer 167 is provided adjacent the second transducer 166 so as to cause an additional signal to be sent to the control mechanism 158. This additional signal is supplied as feedback to the control mechanism 158 to subsequently control motor speed to effect a smooth stop of the litter 16 in the uppermost position. Similarly, a further transducer 168 can be provided adjacent the first transducer 164 so as to cause a further signal in the form of feedback to be sent to the control mechanism 158 to effect a subsequent controlling of motor speed to effect a smooth stop of the litter 16 in the lowered position. This smooth stopping operation is provided for patient comfort.

Figure 27:
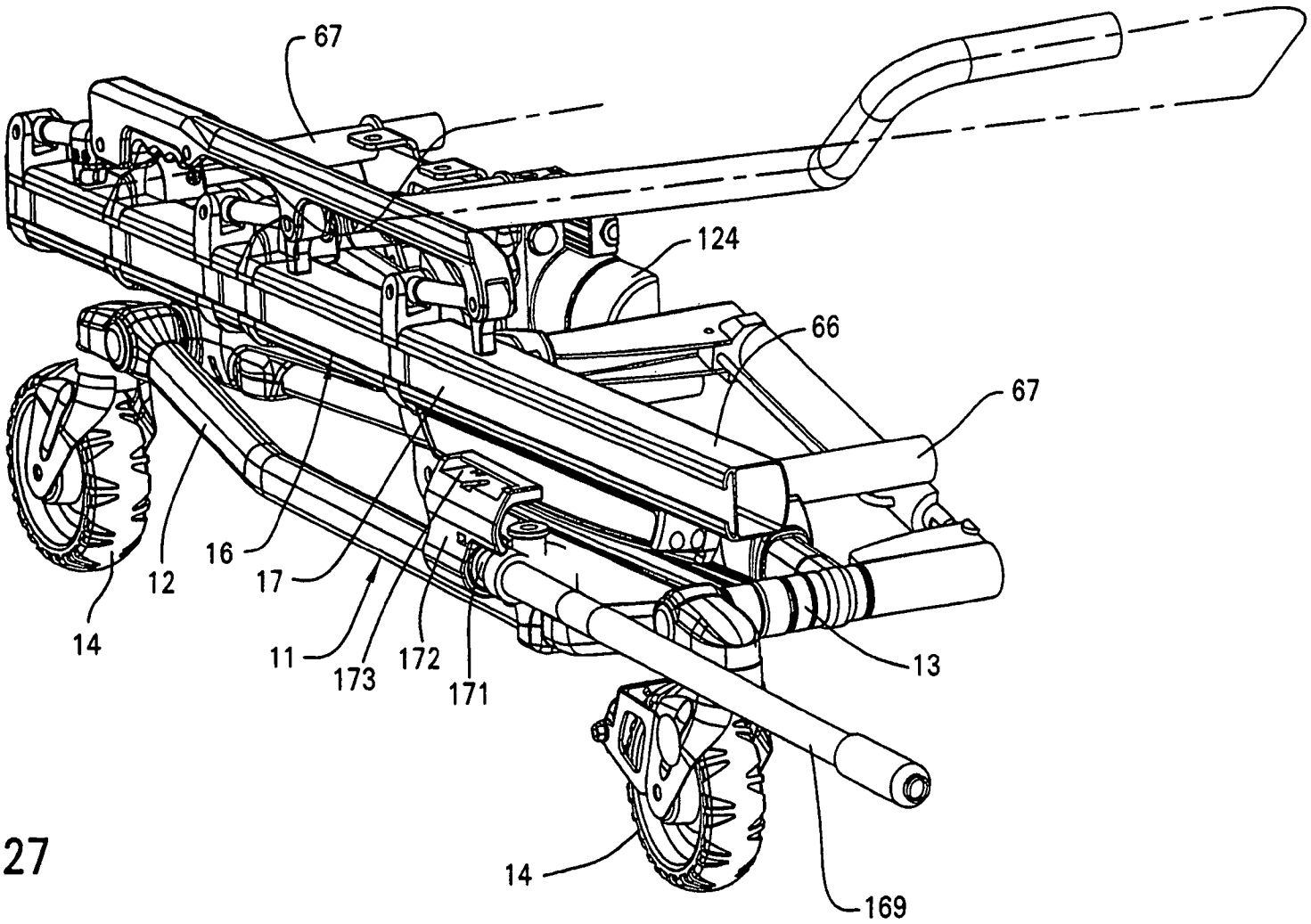
FIG. 27 is an isometric view of a fragment of the ambulance cot in the collapsed and lowered position inside a cargo area of an ambulance.

The control mechanism 158 also receives signals indicative of the presence of the ambulance cot inside the ambulance. In the preferred embodiment and referring to FIG. 27, an ambulance cot latching mechanism inside the ambulance includes a rod 169 that extends along one side of the ambulance cot and has adjacent its distal end 171 a bracket 172 which has a magnet 173 provided thereon. The magnet 173 becomes positioned adjacent a transducer (not shown) to send a signal to the control mechanism 158 to effect a total and complete deactivation of the hydraulic lift or lower operation capabilities of the hydraulic circuit. This transducer may optionally be the position transducer 164.

Figure 28:
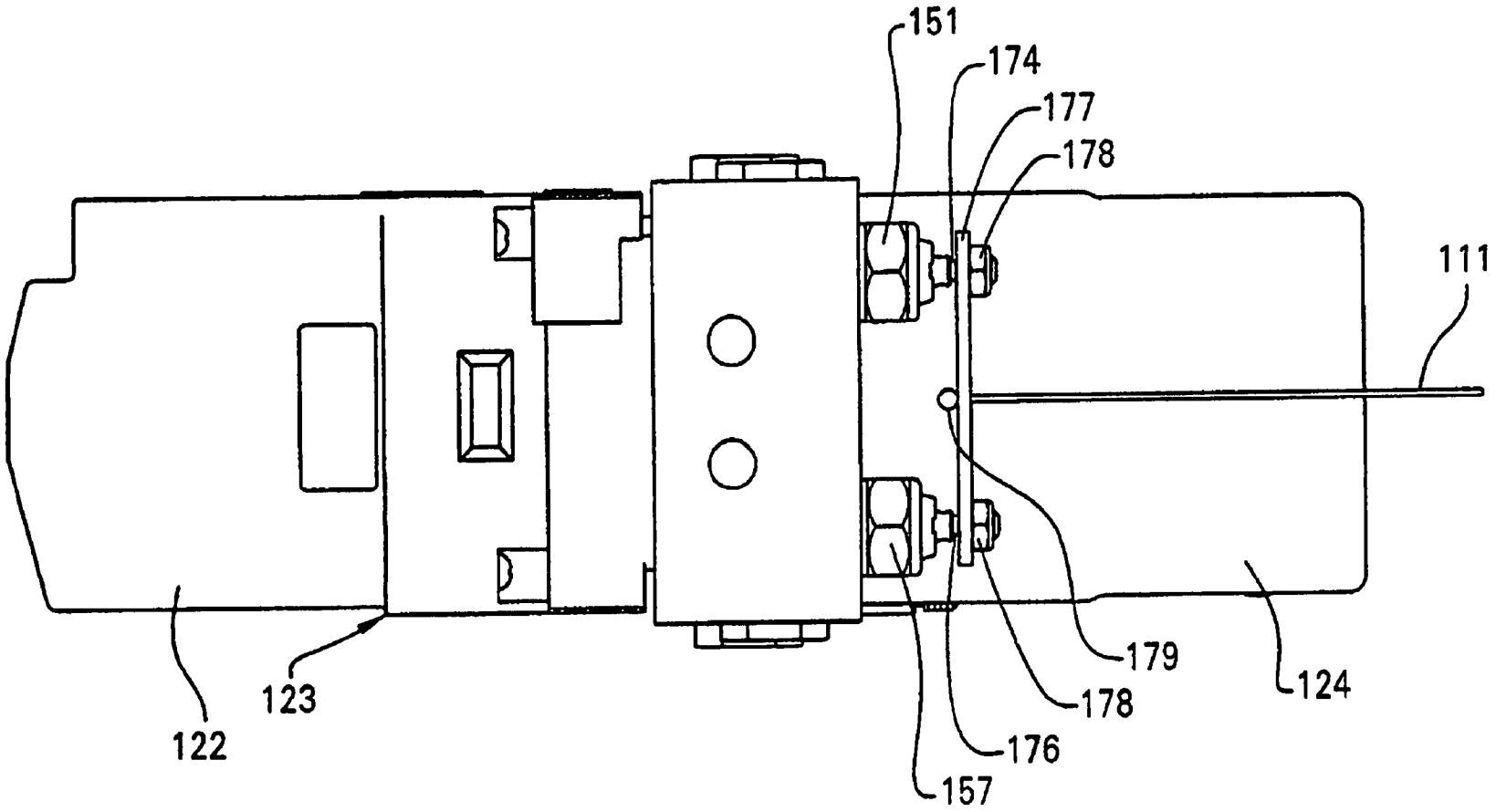
FIG. 28 is a bottom view of the hydraulic assembly illustrated in FIG. 15 (minus the mounting assembly)
Figure 29:
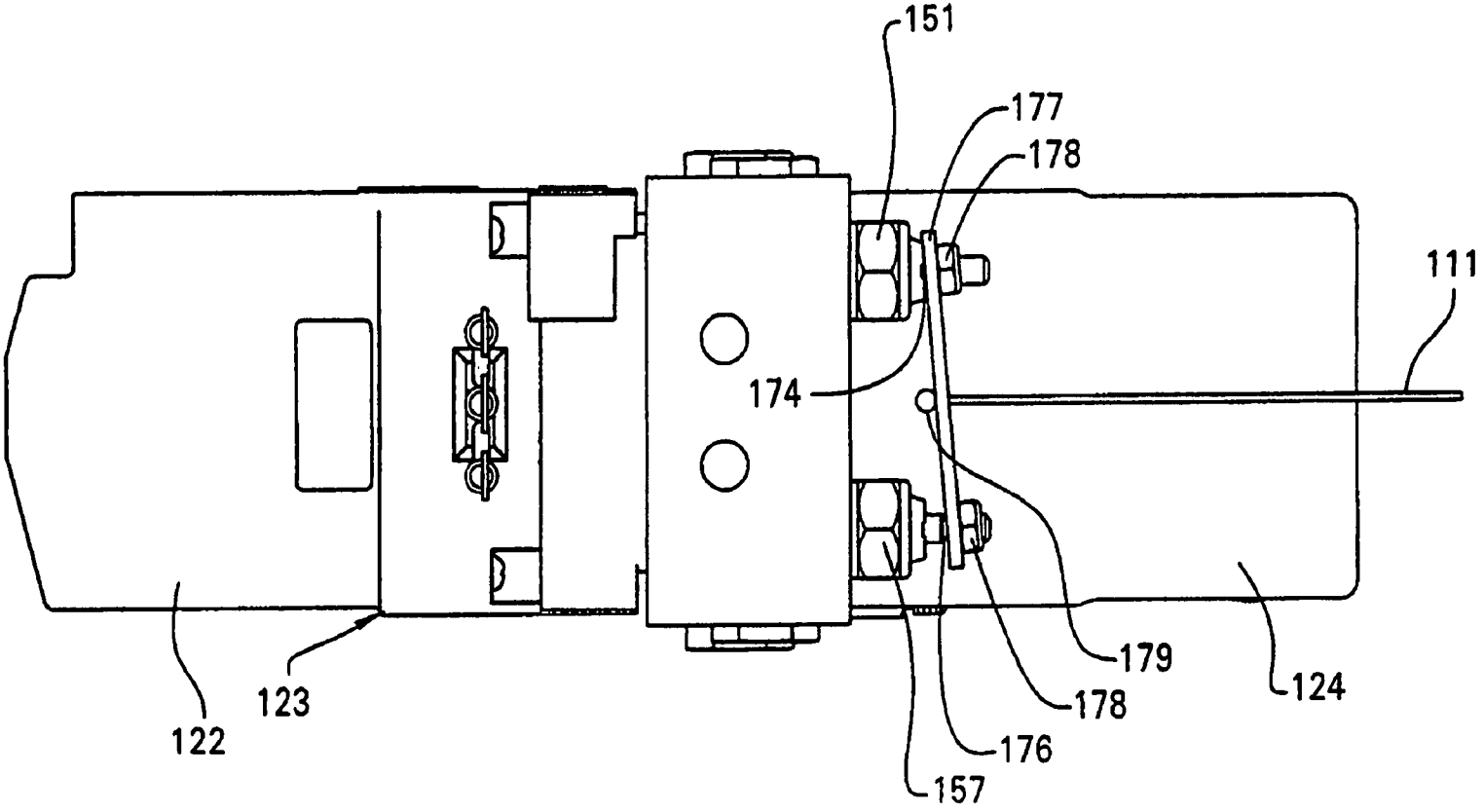
FIG. 29 is a view similar to FIG. 28, except that one of the valves has been actuated.
Figure 30:
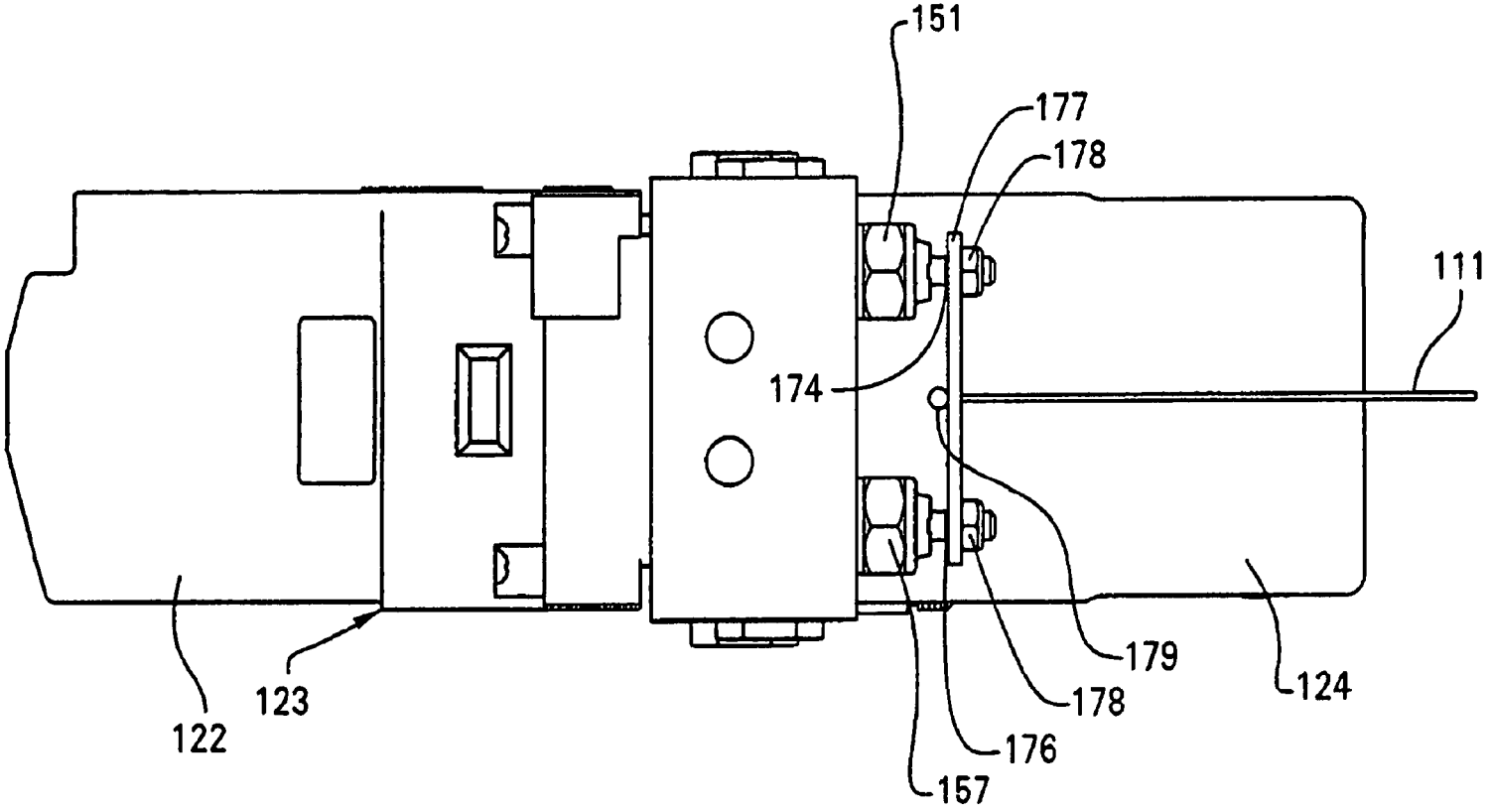
FIG. 30 is a view similar to FIG. 29, except that both of the valves have been actuated.

FIGS. 28-30 are a bottom view of the manifold plate 123 having mounted thereon the reversible electric motor 122 and the reversible pump 124. If desired, the motor 122 could be driven in one direction and a transmission utilized to effect a reverse operation of the pump 124. The release valves 151 and 157 are mounted on the manifold plate 123. The release valve 151 includes a reciprocal stem 174 which, when moved to the right in the aforesaid figures, effects an opening of the valve to allow fluid flow to pass therethrough. Similarly, the release valve 157 has a stein 176 which, when moved to the right in the aforesaid drawing figures, also effects an opening of the valve 157 to allow hydraulic fluid to pass therethrough. Incrementally opening the valve will effect a variable flow through the valve, allowing variable drop rates of the litter. Additionally, the orifice 156 may be sized to control the drop rate of the base 11 when the litter 16 is supported by an attendant or plural attendants. A plate 177 is provided and has holes therethrough which receive the respective stems 174 and 176 therethrough so that an appropriate fastener 178 can effect a fastening of the respective stems 174 and 176 to the plate 177. The cable 111 is connected to the plate as at 179. The opposite end of the cable 111 is connected to the release handle mechanism illustrated in FIGS. 12-14.

Figure 31:
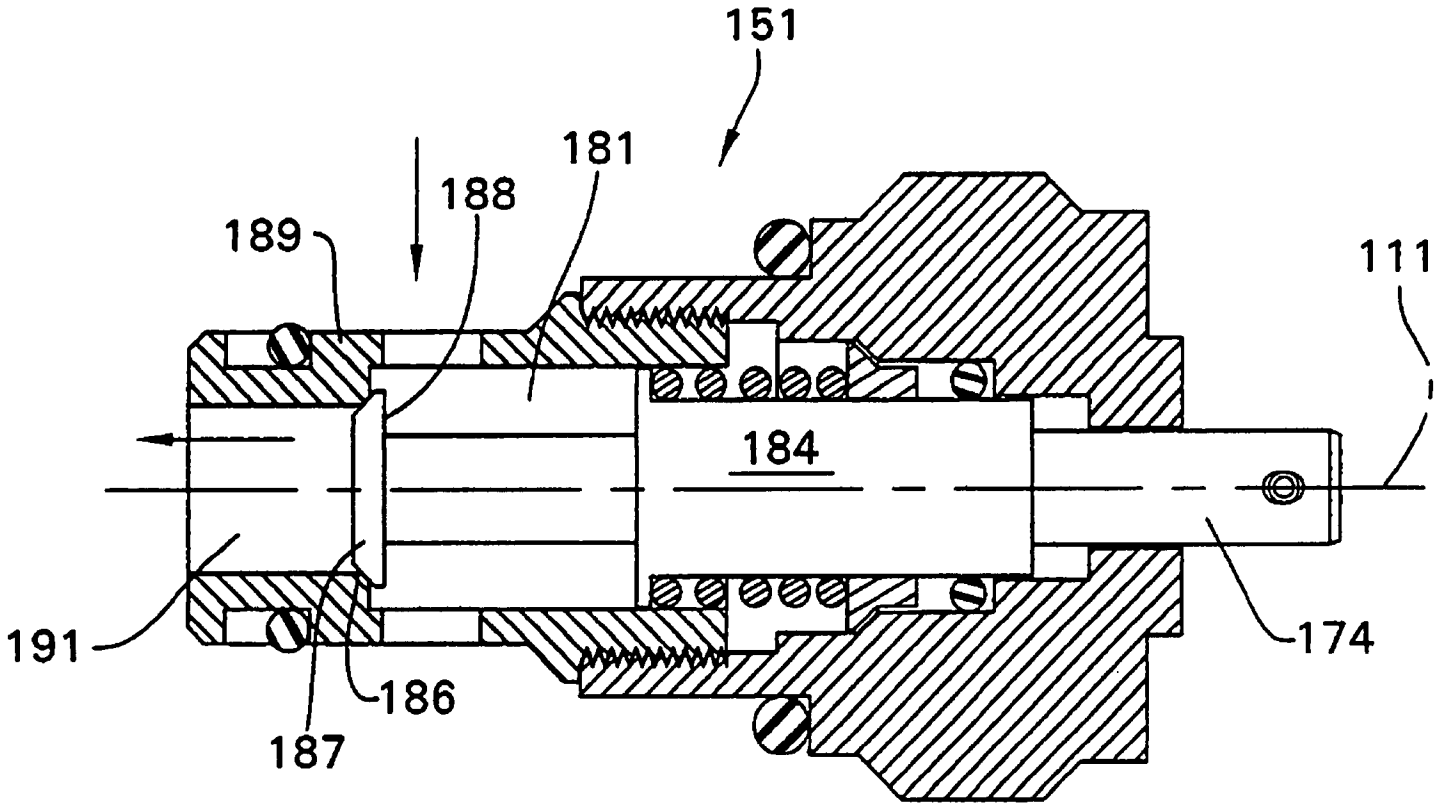
FIG. 31 is a sectional view of one of the valves illustrated in FIGS. 28-30.

In this particular embodiment, and referring to FIG. 31, the release valves 151 and 157 each have a fluid chamber 181 therein into which hydraulic fluid directly from the outlet port 126 is fed through an inlet port 183. The valves 151 and 157 each have a reciprocal spool 184 therein, the movement of which is controlled by the tension applied to the stems 174, 176 by the cable 111. The spool 184 includes a land 186 having a valve seat surface 187 thereon which mates with a valve seat surface 188 provided on the body 189 of the release valve 151. A spring (not illustrated) serves to urge the valve seat surface 187 against the valve seat surface 188, especially when no fluid pressure is applied to the chamber 181. Once the fluid pressure inside the chamber 181 has been reduced to a desired level, tension applied to the cable 111 urging the spool 184 to the right (FIG. 31) against the urging of the return spring, the seat surface 187 will be separated from the seat surface 188 to allow fluid to flow from the inlet port 183 to an outlet port 191 and thence to tank 141. The purpose of the aforesaid construction of the valves 151 and 157 will facilitate it being necessary that the ambulance cot attendants lift the cot prior to activation of the manual release valves 151 and 157 so that the fluid pressure in the chamber 181 will be reduced to facilitate a rightward movement of the spool 184.

A conventional velocity fuse 192 (FIG. 17) is provided in the inlet port to the end of the cylinder housing 54 of the linear actuator 53, particularly at the end thereof remote from the reciprocal rod 56. The velocity fuse can also be an integral component of the cylinder housing 54. This conventional velocity fuse is Model No. 8506 available from Vonberg Valve, Inc. of Rolling Meadows, Ill. The purpose of the velocity fuse is to prevent a rapid lowering of the cot when there is a sudden loss of hydraulic pressure as in the case of a severed hydraulic hose, or accidental manual release with a patient on the cot. A check-valve 195 is provided in parallel to the velocity fuse in order to affect an increased speed of extending of the base. This allows the same or similar speed in powered, and manual mode such that the manual mode may be used in normal use to extend the base when unloading the cot from the ambulance.

Wireless Diagnosis

The ambulance cot and load system electronics for facilitating a loading of the cot into an ambulance (see also WO 2004/064698, the subject matter of which is to be incorporated herein) contain the capability to interact with a handheld diagnostics tool over a wireless communication link. This tool allows manufacturing and maintenance personnel to perform basic configuration, troubleshooting and complex diagnostic operations on both the cot and load system, while remaining free from physical cable attachment to either unit. An example of the functional descriptions for each of the elements involved in wireless diagnostics are set forth below.

Wireless Diagnostic Tool

The handheld device or tool 300 (FIG. 34) is self contained, and includes an antenna 301, a wireless transmitter and receiver that operate under the same basic protocol as the wireless link connecting the cot and load system during normal operation. Operations such as collecting and configuring control parameters and initiating simple or complex diagnostics tests are supported through this interface. By design, this handheld device is capable of four main modes of operation:

- Two-way active communication mode: The handheld device interacts with one other wireless-capable unit;
- Multi-way active communication mode: The handheld device interacts with two or more wireless-capable units;
- Passive "listen only" mode: The handheld device observes the communication activity which exists near one or more wireless-capable units without disrupting it; and
- Power and at least one of read from and write to an RFID tag described below (can also be included in two-way communication).

Two-way active communication allows the handheld device to interact directly and exclusively with one cot (or one load system) in order to provide streamlined communication during programming or troubleshooting phases. Multi-way communication allows the handheld device to participate in communications with multiple other parties, and allows for more complex troubleshooting and diagnostics operations. For example, when a cot is docked in the load system and a handheld device is brought into proximity of the wireless communication field, it will be able to interact with both units to gather information or allow the user to invoke special tests to verify operation of the loading algorithm. For two-way and multi-way modes, the wireless diagnostic tool is capable of auto-detecting the proper mode in which to operate, which is based on the number of active participants it senses in the wireless communication field. The "listen only" mode is entered at the prompting of the user of the handheld device. This mode is passive in nature, and can be used to analyze communications coming from one unit (cot or load system), or multiple units which are in dialog with one another.

Cot

The ambulance cot's electronic controller contains software components to support wireless diagnostics capabilities. This software functionality is capable of detecting the difference between a load system that is trying to communicate and a wireless handheld device that is trying to initiate a diagnostic session. As this determination is made, the cot is able to enter into either a normal session with the load system, a dedicated session with the handheld device (if no load system is present), or a three-way session that involves both the handheld device and the load system. In the latter case, the cot software allows normal operation of the loading sequence, while simultaneously supporting a specific set of diagnostics that are useful in troubleshooting the overall system.

Load System

The load system's electronic controller is also capable of distinguishing between a basic communication session for loading and unloading, and a session which involves diagnostics operations. Using similar software components, the load system will participate in dedicated two-way communication with a handheld device, or allow the device to coexist during a load or unload operation with the cot being present. It is capable of detecting the difference between these various modes of operation, and react accordingly to provide the necessary functional behavior.

Figure 32:
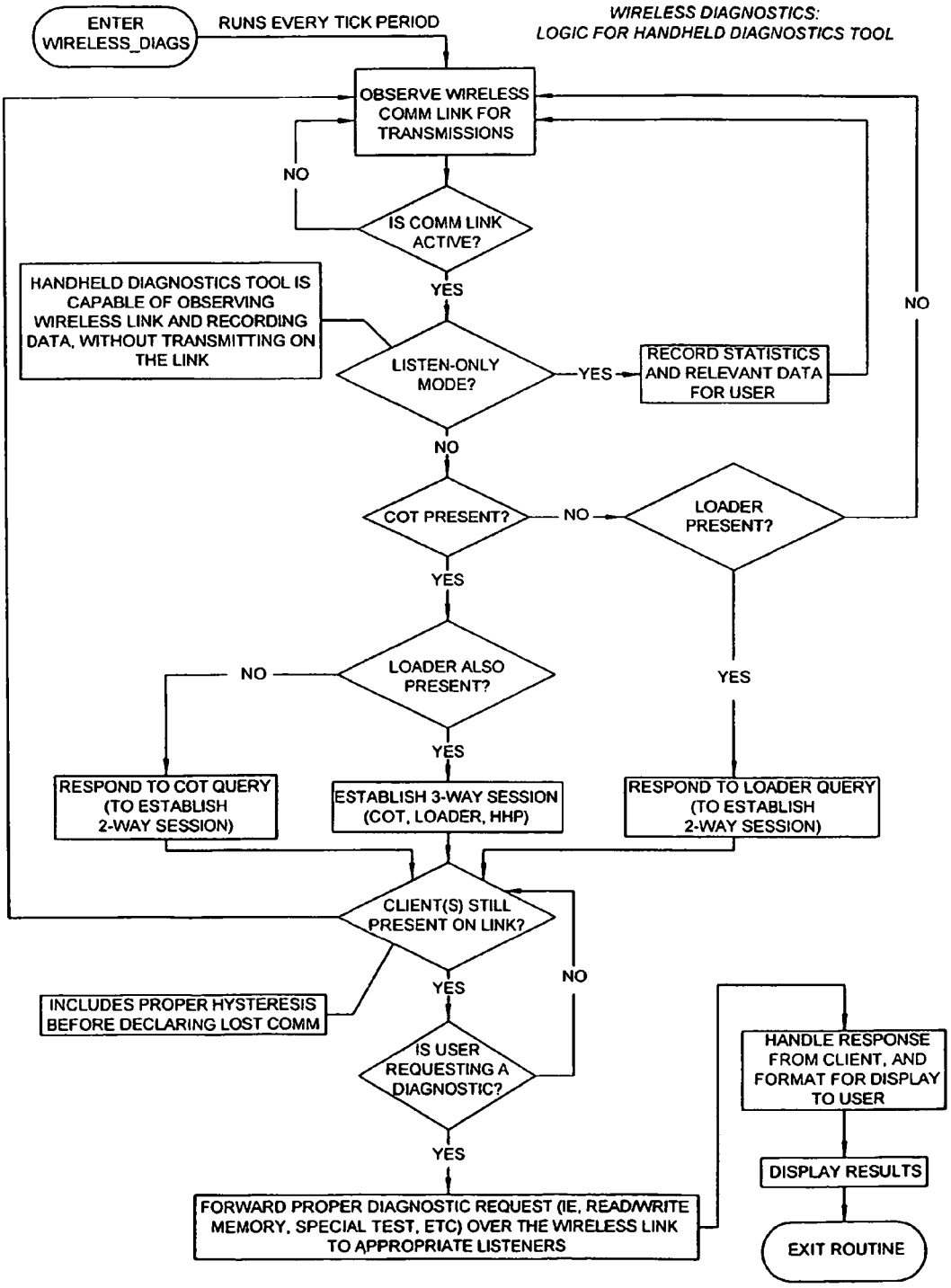
FIG. 32 is a decision tree diagram for the logic employed on a handheld diagnostics tool.
Figure 33:
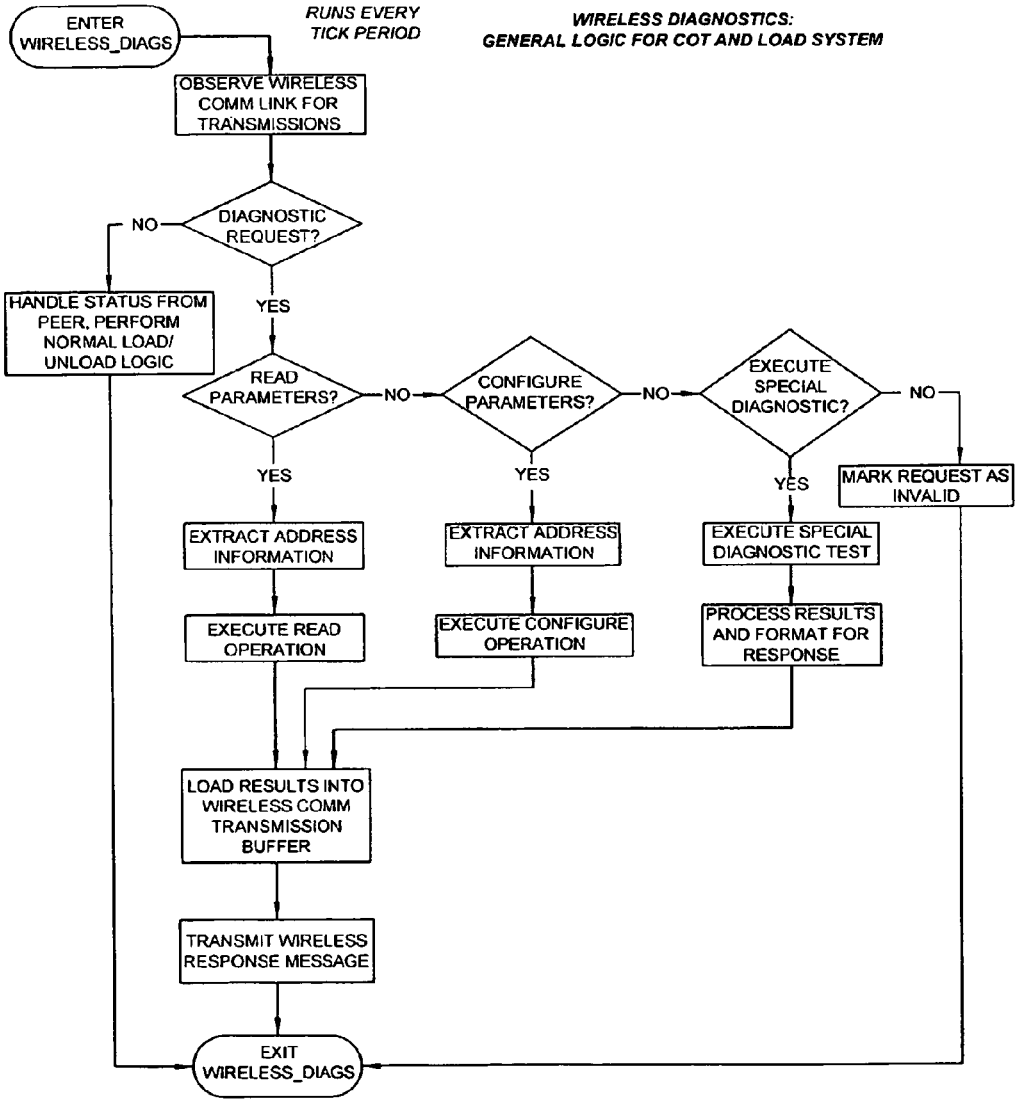
FIG. 33 is a decision tree diagram for the general logic employed on the cot and load system in an ambulance to facilitate wireless diagnostics.
Figure 33A:
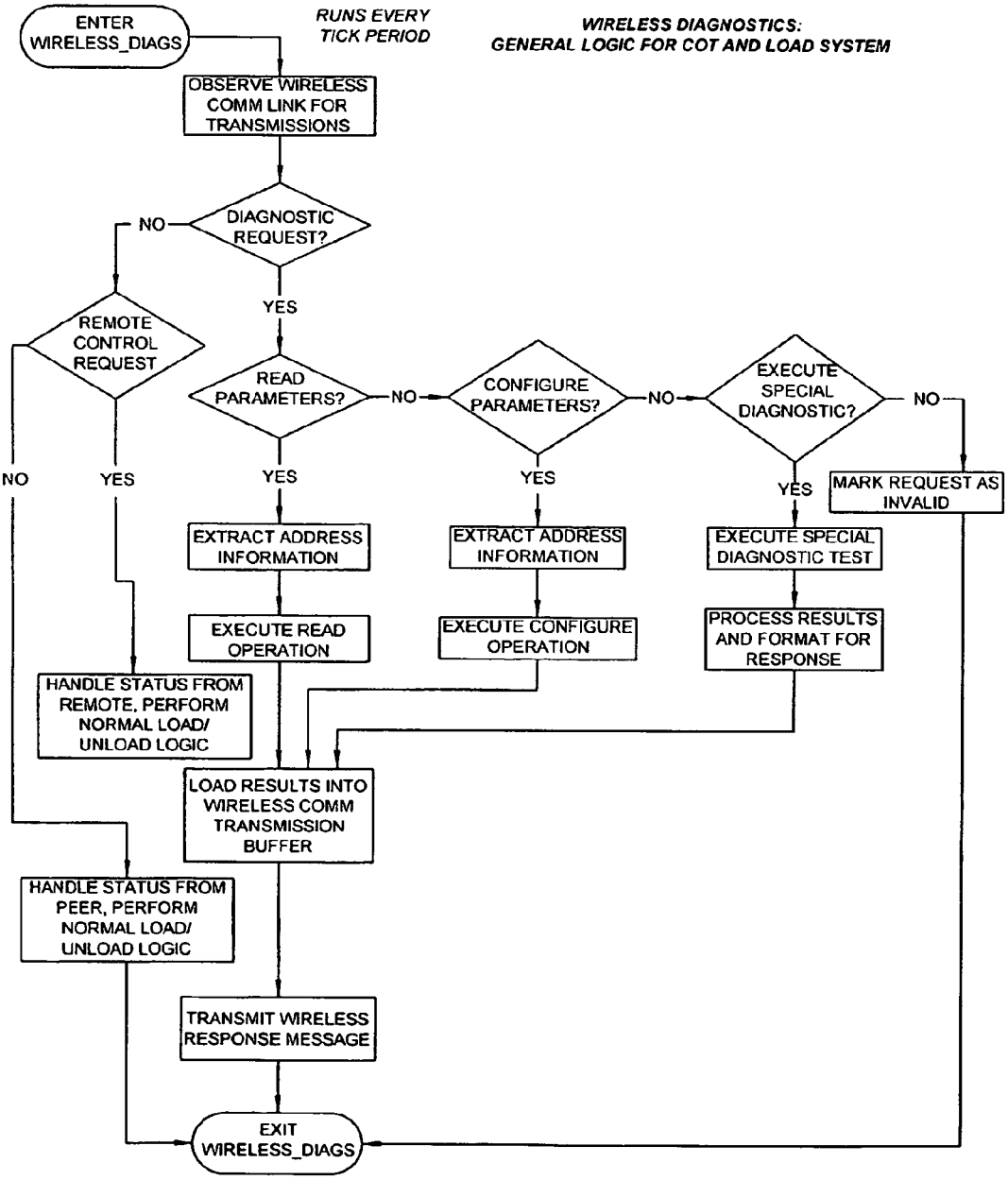
FIG. 33A is a modified decision tree diagram for the logic employed on a handheld tool used for wireless programming, remote control and diagnostics.

FIGS. 32 and 33 provide a further description of the software functionality used in the wireless control and diagnostics features. In FIG. 33, the blocks entitled "Execute Configure Option" and "Transmit Wireless Response Message" include a read/write command to the RFID tag 302 (described below) when applicable in order to change the user statistics which may be coded on the RFID tag (Count of times programmer accessed, revision of software (if updated) etc).

Figure 34:
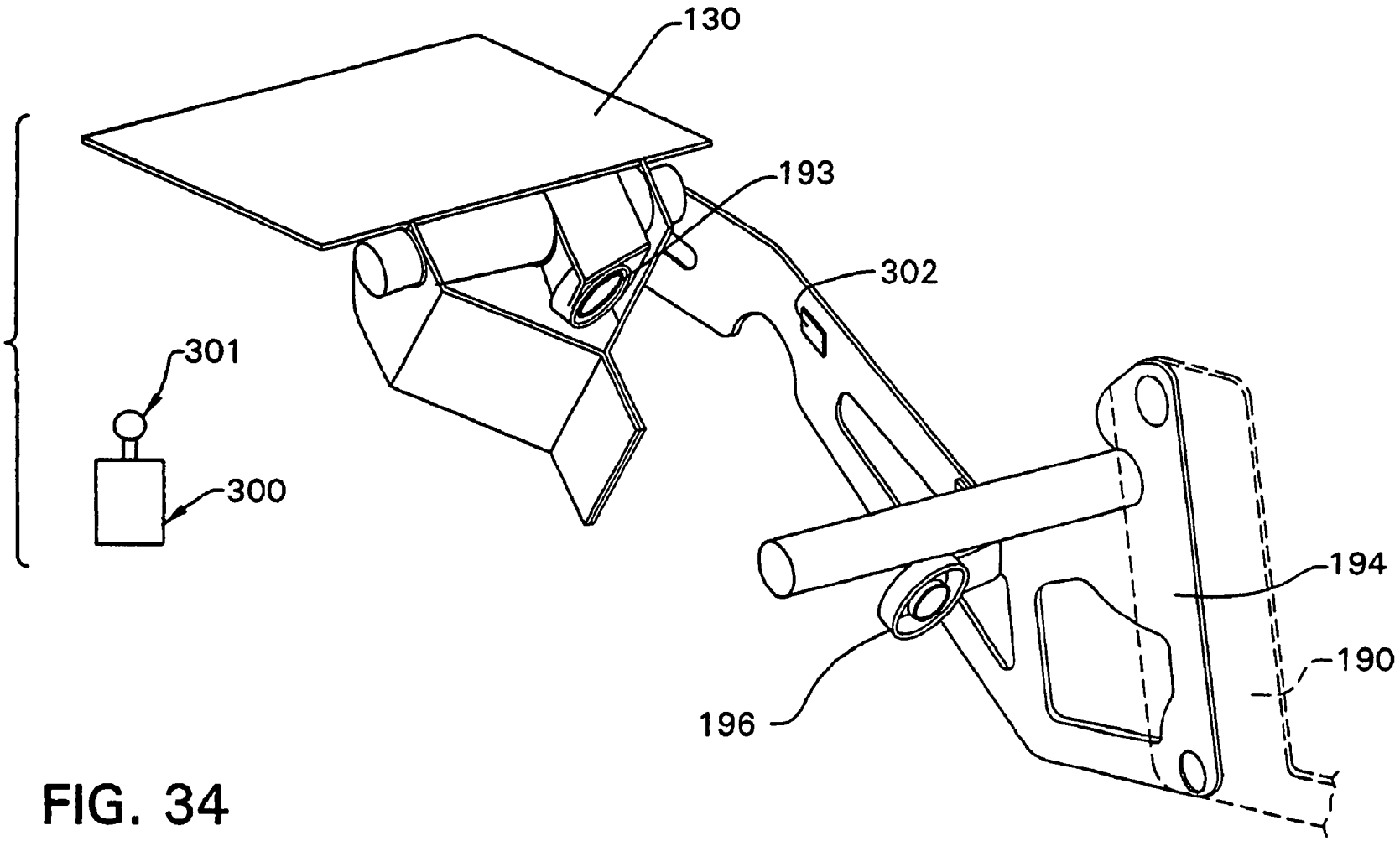
FIG. 34 is a fragmentary isometric view of an antenna system on the ambulance cot as well as an antenna system on a load arm provided on the ambulance.

Referring to FIG. 34, beneath the seat section 130 there is provided a cot antenna 193. The load arm on the ambulance (see WO 2004/064698, here in FIG. 34 the load arm 194) includes a load arm antenna 196. The two antennas 193 and 196 provide communication between the cot and the load system as well as communication with the handheld unit. The antennas also provide a controlled communication envelope to allow any cot to communicate with any load system or handheld trouble shooting device while not interfering with other load systems/cots in the area. In the preferred embodiment, the cot antenna 193 (FIG. 34) consists of a loop of wire, as does the load antenna 196, and the tool antenna 301. It has been demonstrated that by passing a modulated current through a loop of wire, an electro-magnetic field is produced that can be received by other loops of wire in the environment. It is further known that this modulated "carrier" can be added to a digital signal, allowing the transmission of the digital signal on the modulated carrier. This type of communication is commonly referred to as an active inductive link.

The cot antenna 193, when configured as described, can additionally be used to remotely power and read a Radio Frequency Identification, or RFID tag 302 (FIG. 34) mounted on the load arm 194 or a trolley 190 to which the load arm 194 is mounted. Thus, the cot can be configured to selectively communicate with one of the load system and the tool through an active, inductive link; and power and one of read from and write to the RFID tag 302. The RFID tag 302 is useful in implementing the in-ambulance/in fastener shut-off feature (shown and described in more detail below) as well as for identifying the device for use with other specific RFID readers specifically as follows:

| code (1 byte) | product code (2 bytes) | CRC (1 byte) | Product specific RFID tag . . . |
|---|---|---|---|

More specifically:

| Product name | Group name | Group (1 byte) | Product (2 bytes) | CRC |
|---|---|---|---|---|
| EMS_COT_LOADING_SYS | Medical_Beds | 2 | 1 | 0x11 |

This information may be used to configure the hand-held tool, or provide contact information for service.

Additionally, other information may be at least one of written to and read from the RFID tag 302 including at least one of the following: Model, Serial number of the unit, Software revision, and Usage statistics (which may include at least one of a count of different powered cots used with the system, and a count of times diagnostic tools accessed or changed the cot or load system(s)).

One exemplary way of establishing communication between the cot and the fastener system or between the cot or load system and the troubleshooting handheld device, as well as communication therebetween, is set forth below.

| Preamble | P0 | P1 | D0 | P2 | D1 | D2 | P3 | D3 | D4 | D5 | D6 | D7 | P |
|---|---|---|---|---|---|---|---|---|---|---|---|---|---|

| | |
|---|---|
| | Preamble for signal detection |
| Px | Parity bits for error detection (Hamming Code) |
| P | Parity bit for extra check of data integrity |
| Dx | Data bits |

Preamble

The preamble is a special sequence to separate real data from the random noise. The preamble will contain special characters that are of 'illegal' length. This will cue the processor for a start of packet.

Error Correction Bits

The packet uses four bits for error correction (P0, P1, P2, P3). The error correction technique employs a Hamming code algorithm that will allow the processor to correct one bit that has been misinterpreted. Assuming a moderate bit error rate, the odds of a single bit being corrupted are relatively high while the odds of multiple bits being corrupted is relatively very low. Allowing for 1 bit to be corrected will result in an overall greater throughput at a relatively low cost of extra bits.

Parity Bit

The parity bit is an extra check to ensure data integrity. The parity bit is calculated using basic even parity checking; the parity bit is set so that the number of is in the packet will always be an even number. The parity bit will allow detection of a second bit error; however, it will not be able to correct it.

Data Bits

There are 8 data bits. The data bits communicate information about the cot status, an action request or diagnostic information. The most significant bit (D7) indicates whether the data is in diagnostic mode or not. If in diagnostic mode, remaining 7 bits indicate a diagnostic code or response. Otherwise each bit acts as an independent flag for a certain condition. If the transmission gets a response, the value is passed to the master controller; if no response is found, a value of '0'.

TABLE 1

Example of possible Ambulance to Cot Data Bits

| Bit | Name | Value = 1 | Value = 0 |
|---|---|---|---|
| 7 | Normal/Diagnostic | In Normal Mode | In Diagnostic Mode |
| 6 | Arm Load | Detect load on arm | No load detected |
| 5 | Arm Up | Load arm is fully up | Load arm not fully up |
| 4 | Arm Down | Load arm is fully down | Load arm not fully down |
| 3 | Proximity Switch | Prox switch closed | Prox switch open |
| 2 | TBD | | |
| 1 | TBD | | |
| 0 | Comm present | Comm is active | No Comm |

TABLE 2

Example of possible Cot to Ambulance Data Bits

| Bit | Name | Value = 1 | Value = 0 |
|---|---|---|---|
| 7 | Normal/Diagnostic | In Normal Mode | In Diagnostic Mode |
| 6 | Cot load | Detect load on cot legs | No load detected |
| 5 | Cot legs up | Cot legs are fully up/not extended | legs not fully up |
| 4 | Cot legs down | Cot legs are fully down/extended | legs not fully down |
| 3 | Plus button | "+" button is pressed | "+" button not pressed |
| 2 | Minus button | "−" button is pressed | "−" button is not pressed |
| 1 | TBD | | |
| 0 | Comm present | Comm is active | No Comm |

TABLE 3

Example

| Event | A → C | C → A | Comment |
|---|---|---|---|
| Cot "−" button pressed, turns on | — | 111001xx | Patient on Cot, Ambulance not yet in range No response from Ambulance, a value of zero is passed to the cot controller |
| Cot moved within range of Ambulance | 10010xxx | 111001xx | "−" button is still pressed Prox switch is not set, Arm not bearing load |

TABLE 3-continued

| Event | Example A → C | C → A | Comment |
|---|---|---|---|
| Cot docked to prox switch | 10011xxx | 111001xx | "–" button is still pressed Prox switch is set, Arm not bearing load |
| Cot legs folding up, Cot drop slightly | 11011xxx | 110001xx | Arm starts to take weight, still down |
| Cot legs continue folding up | 11001xxx | 100001xx | Arm starts lifting up |
| Cot legs completely up | 11001xxx | 101001xx | Arm still lifting |
| Arm is all the Way up | 11101xxx | 101001xx | |
| Button is released Arm still up | 11101xxx | 101000xx | Waiting for cot to be pushed on |

Further software may be provided for the in-ambulance/in-ambulance shut-off feature when used with an RFID tag 302. When used with the load system (to detect the RFID tag), the upper-level software diagram may look like that illustrated in FIG. 59.

Figure 59:
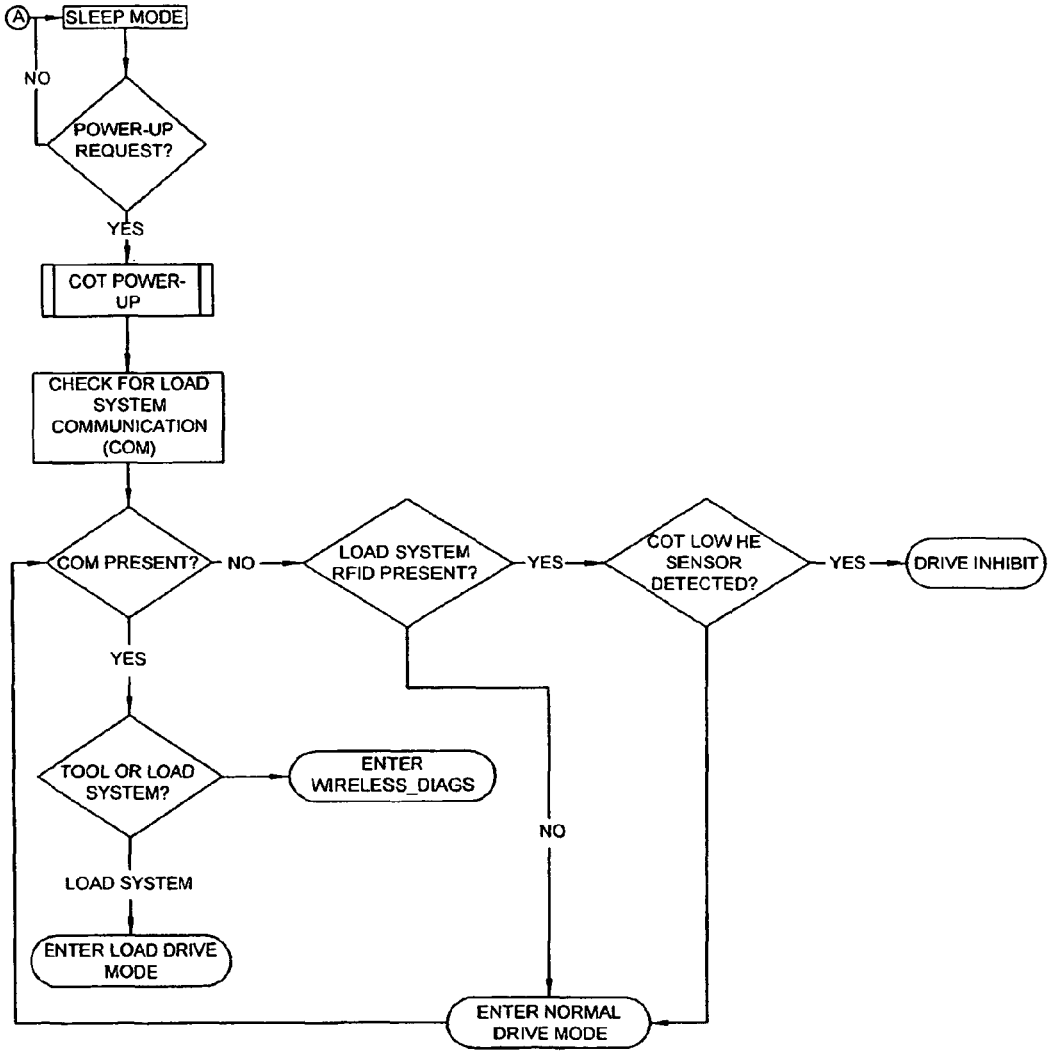
FIG. 59 is a decision tree diagram for the logic employed in environments utilizing a Radio Frequency Identification tag.

In operation, and referring to FIG. 59, upon power-up, the cot attempts communication with the load system in order to detect if it is present. If communication (com) is present, it executes function according to a specific and separate load protocol. If not, the cot communication will switch to check for the RFID tag. If it is not present, the cot drives according to the normal cot protocol. If the cot sees the RFID tag, it will then check for the low Hall Effect (HE) sensor (to determine if the cot legs are retracted). Once fully retracted, the cot inhibits driving (up), and thus activates the in-ambulance/in fastener shut-off feature. The advantages of looking for the Low HE sensor is allowing function of the cot while docked, but not fully loaded. It is reasonably assumed that once the cot is fully retracted, it is locked into the load system, and will be pushed into the ambulance. A further advantage is that normal drive function is returned by simply manually dropping the base such that the low HE sensor is no longer activated, thus allowing normal driving of the cot in the specific instance of a loss of load communication.

Figure 60:
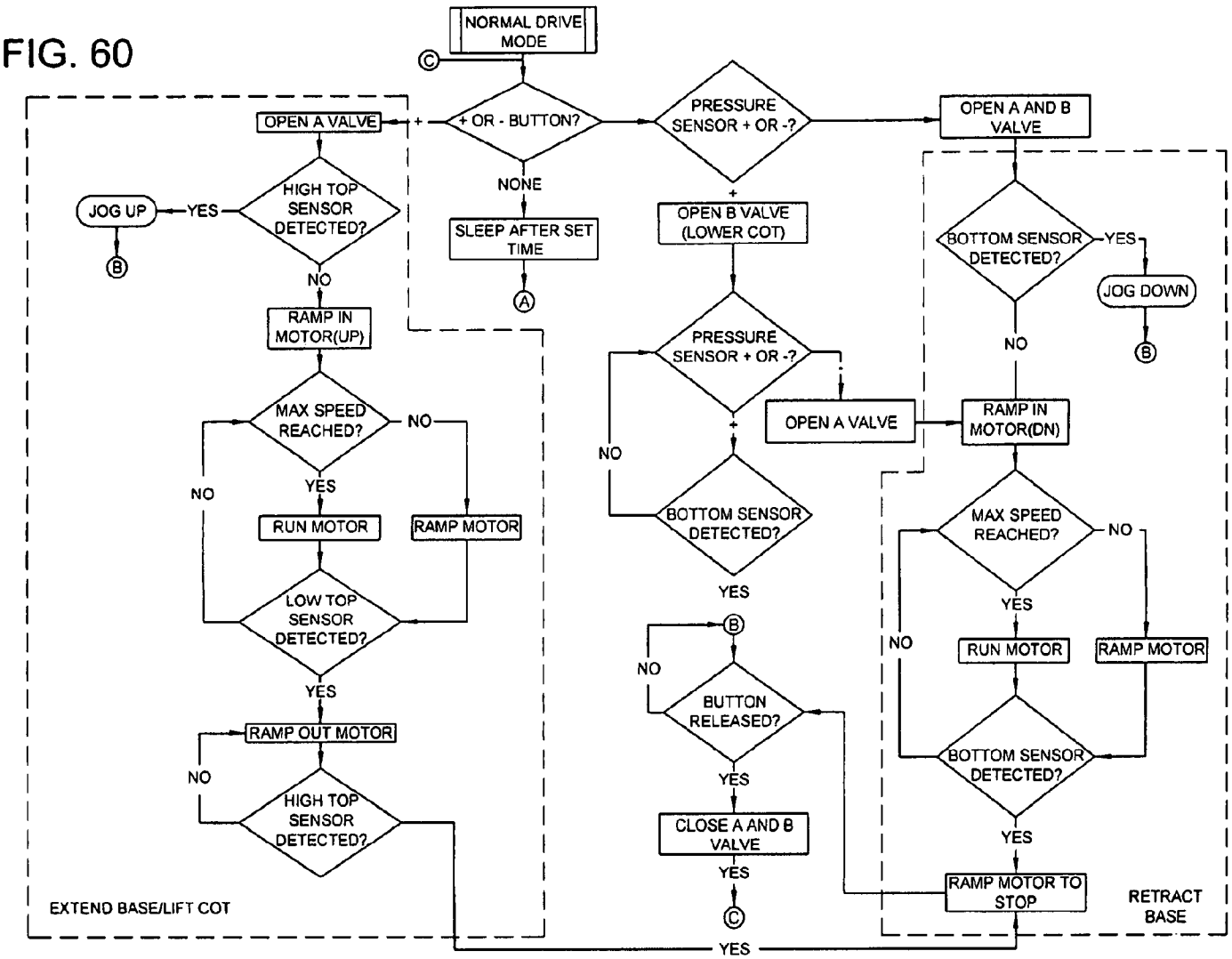
FIG. 60 is an enhanced decision tree diagram for FIG. 59 presenting the general logic employed during a normal drive mode.
Figure 61:
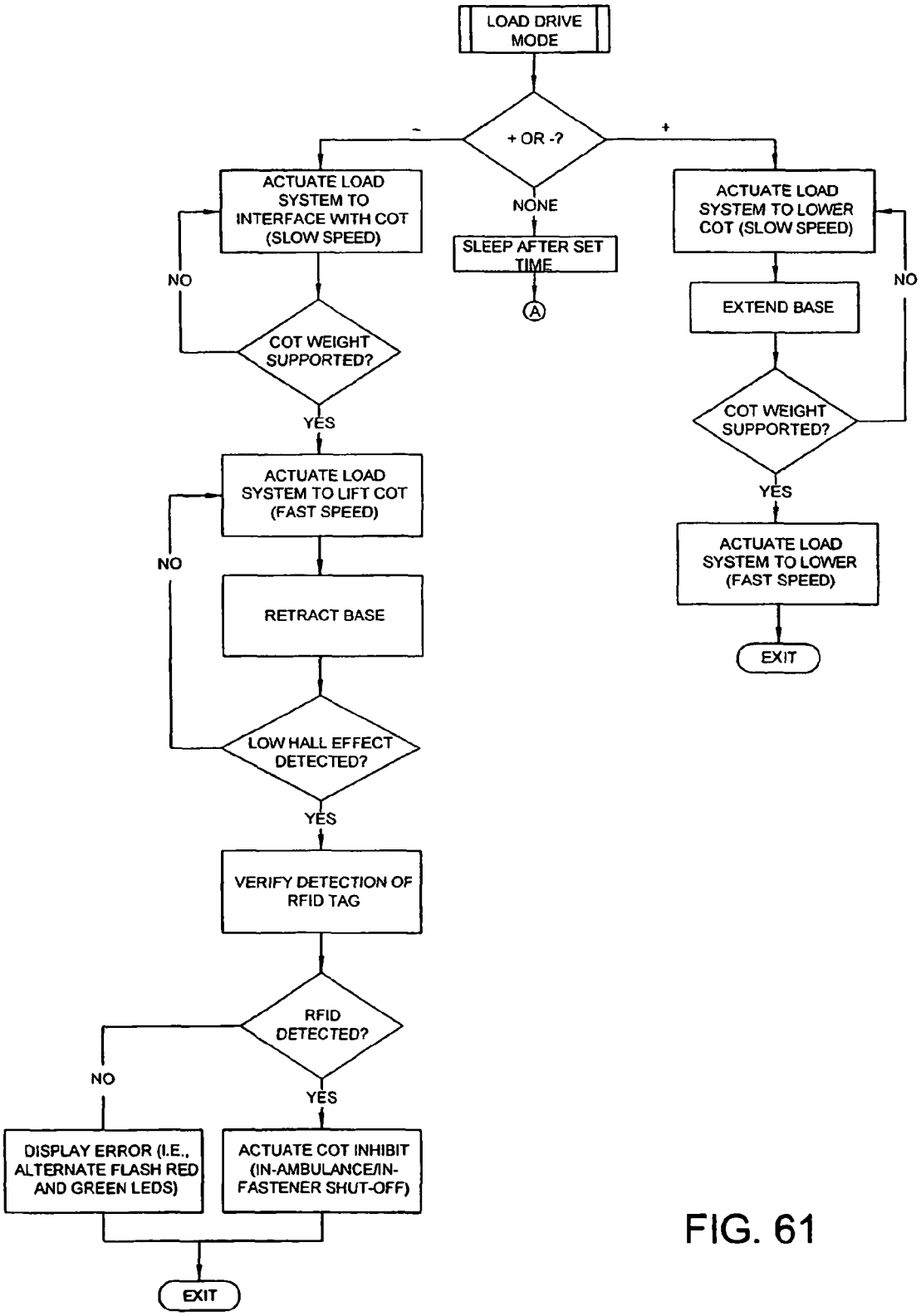
FIG. 61 is a decision tree diagram for the logic employed in the FIG. 59 environment, particularly during a loading of the ambulance cot onto the load mechanism on the ambulance.

Driving normally is described in FIG. 25, but FIGS. 60 and 61 illustrate the decision tree for the software when the RFID tag 302 is present in the overall system.

Retractable Head Section and Latch

Figure 35:
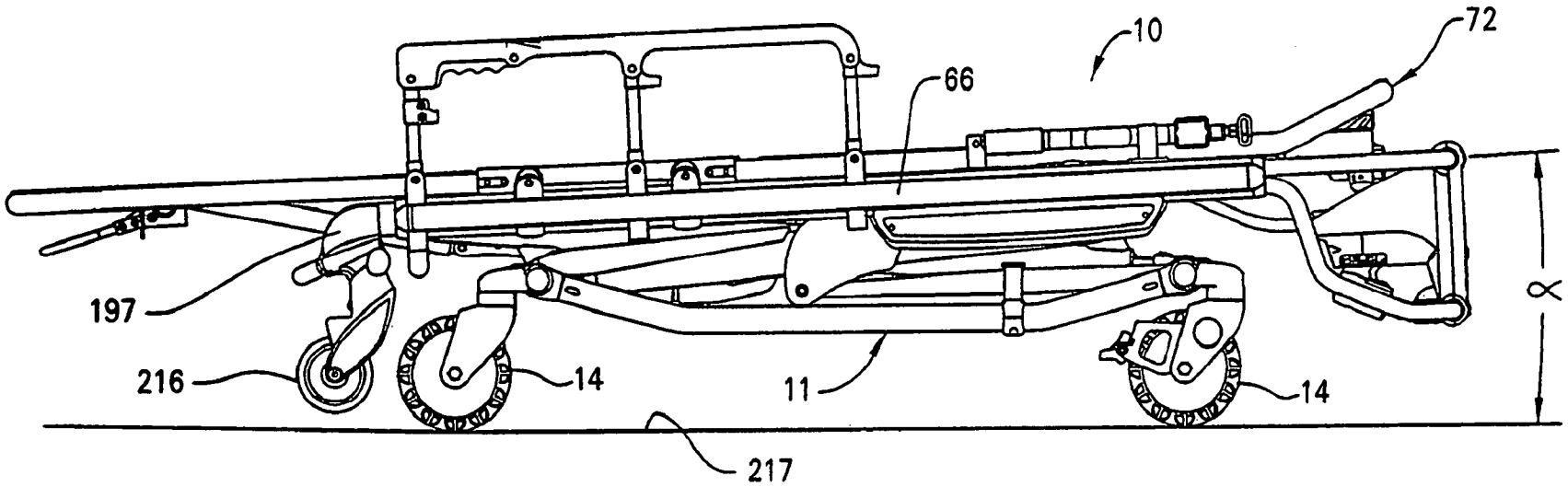
FIG. 35 is a side elevational view of the ambulance cot in the fully collapsed position with the head section retracted.
Figure 36:
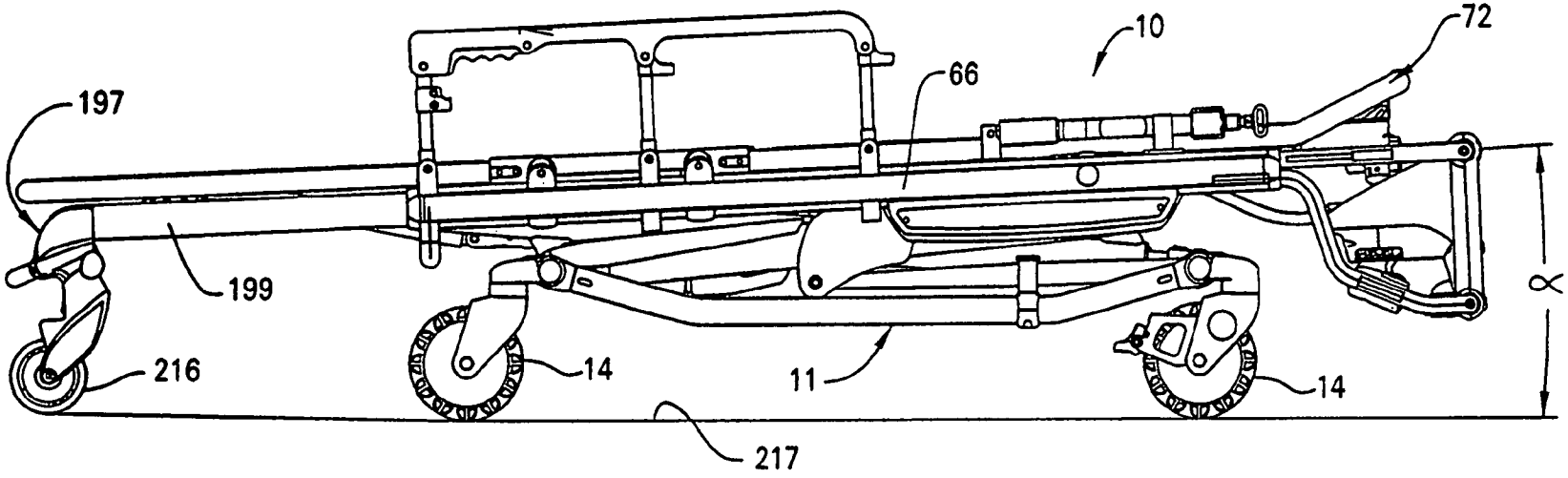
FIG. 36 is a view similar to FIG. 35, except that the head section on the ambulance cot has been moved to the fully deployed position.
Figure 37:
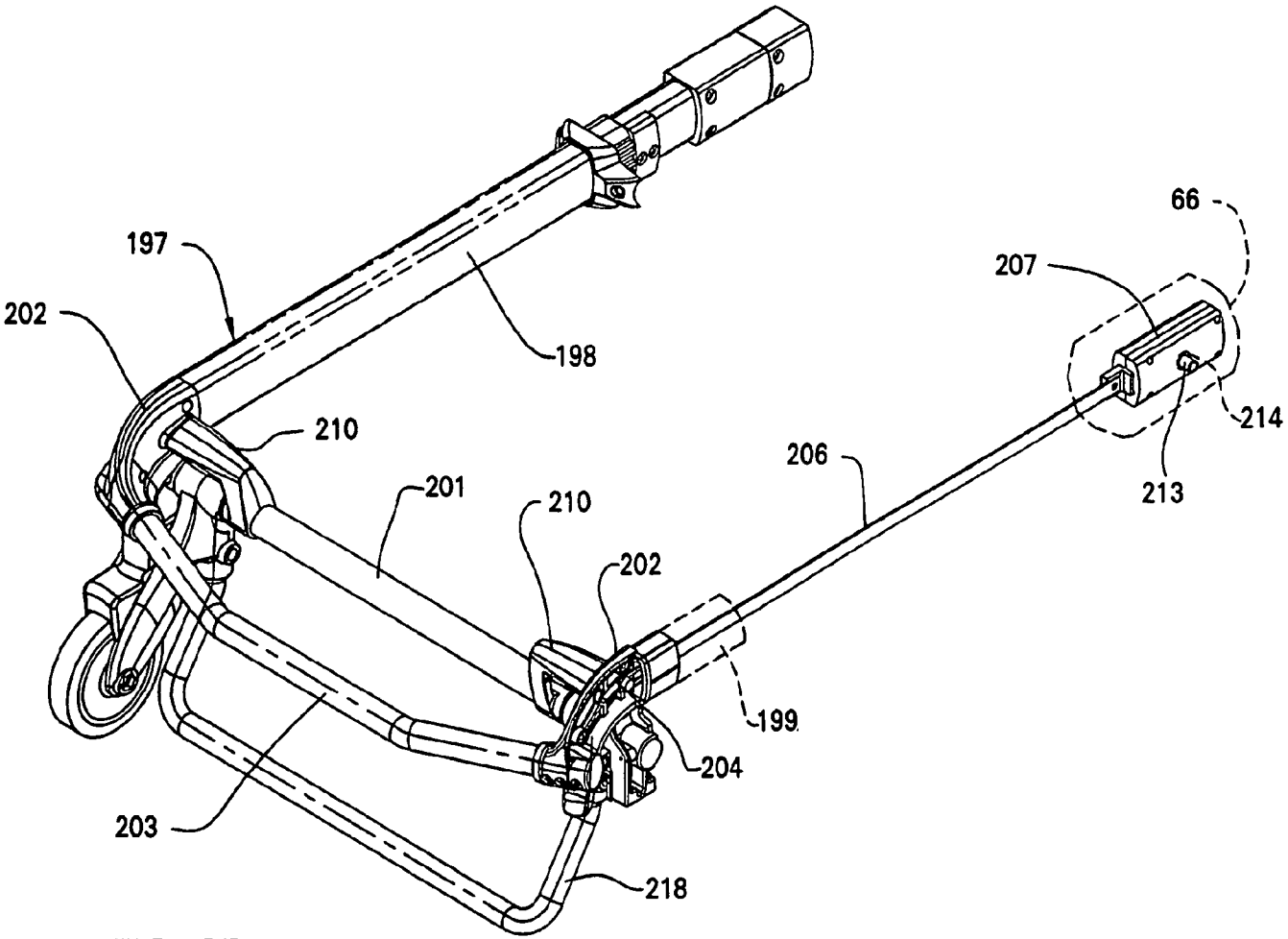
FIG. 37 is a fragmentary isometric view of the head section on the ambulance cot.
Figure 38:
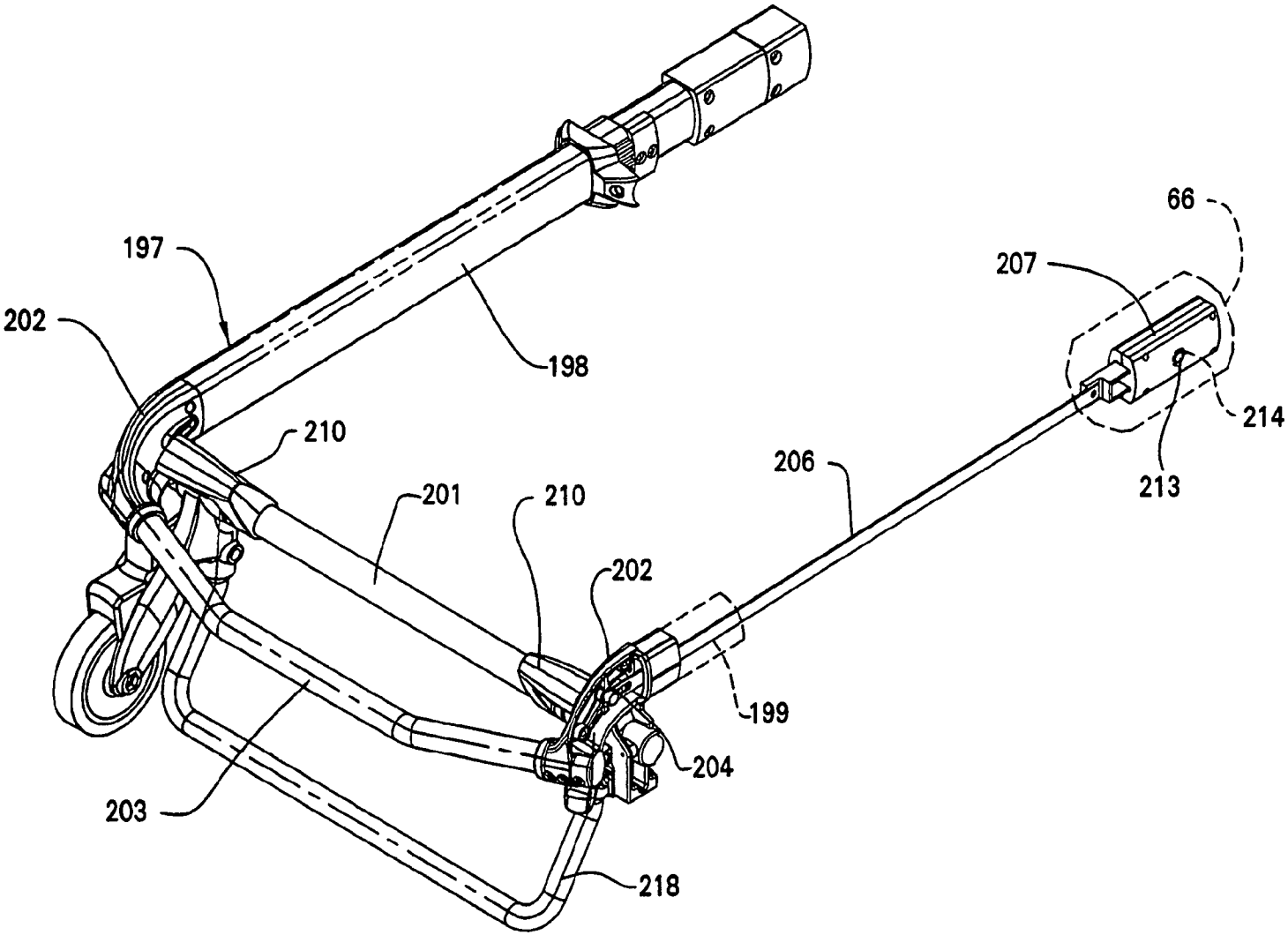
FIG. 38 is a view similar to FIG. 37, except that a handle has been shifted to a fully operated position.
Figure 39:
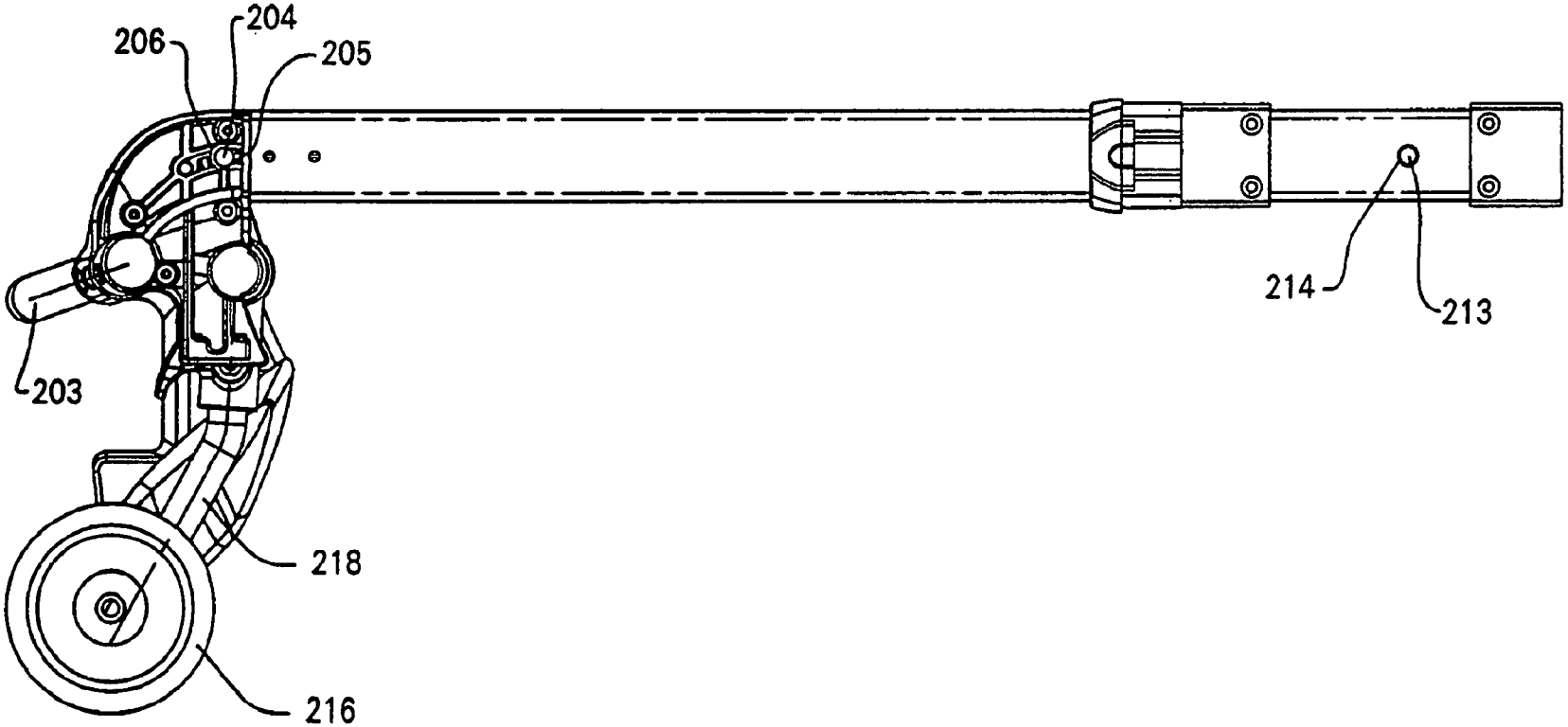
FIG. 39 is a side view of the head section with the handle in a first position.
Figure 40:
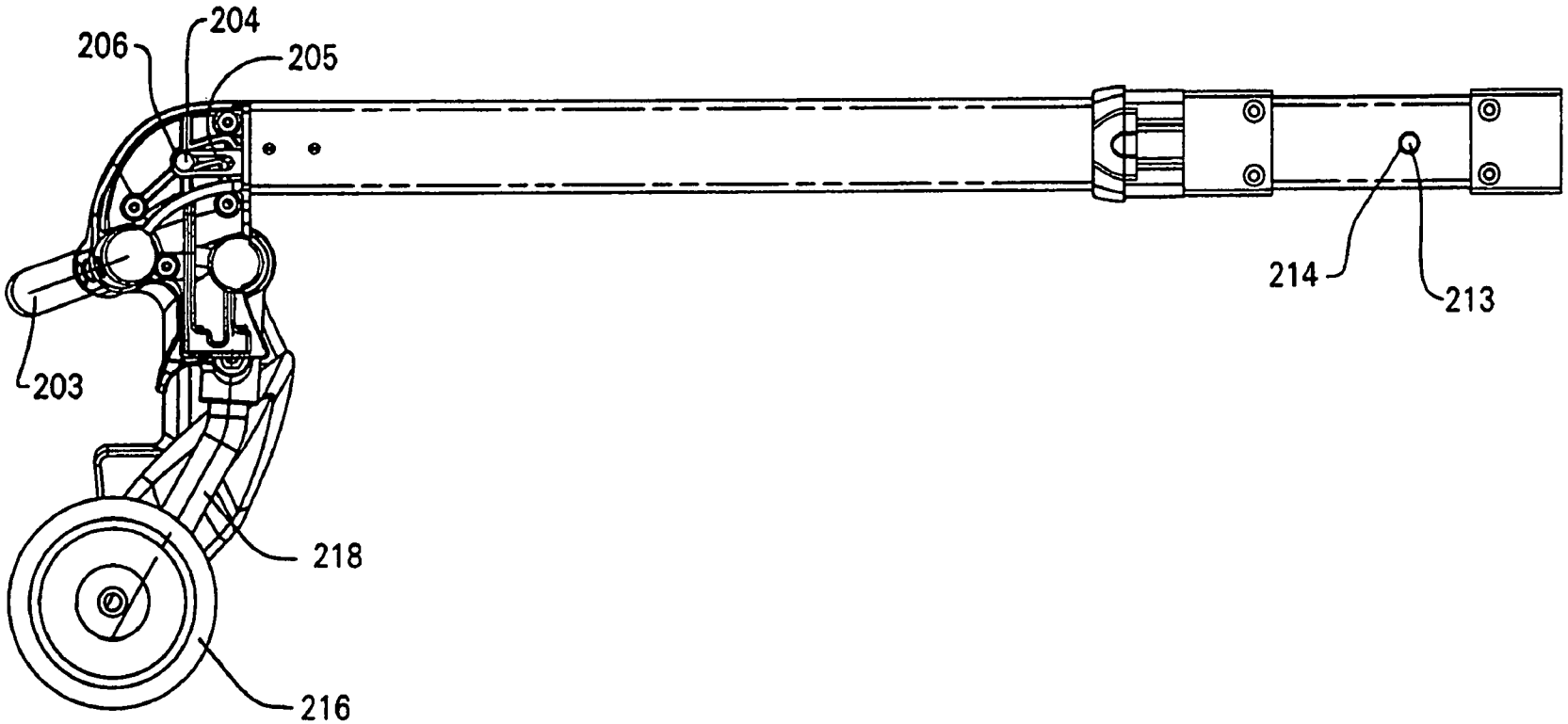
FIG. 40 is a view similar to FIG. 39, except that the handle has been moved to the fully operated second position.
Figure 41:
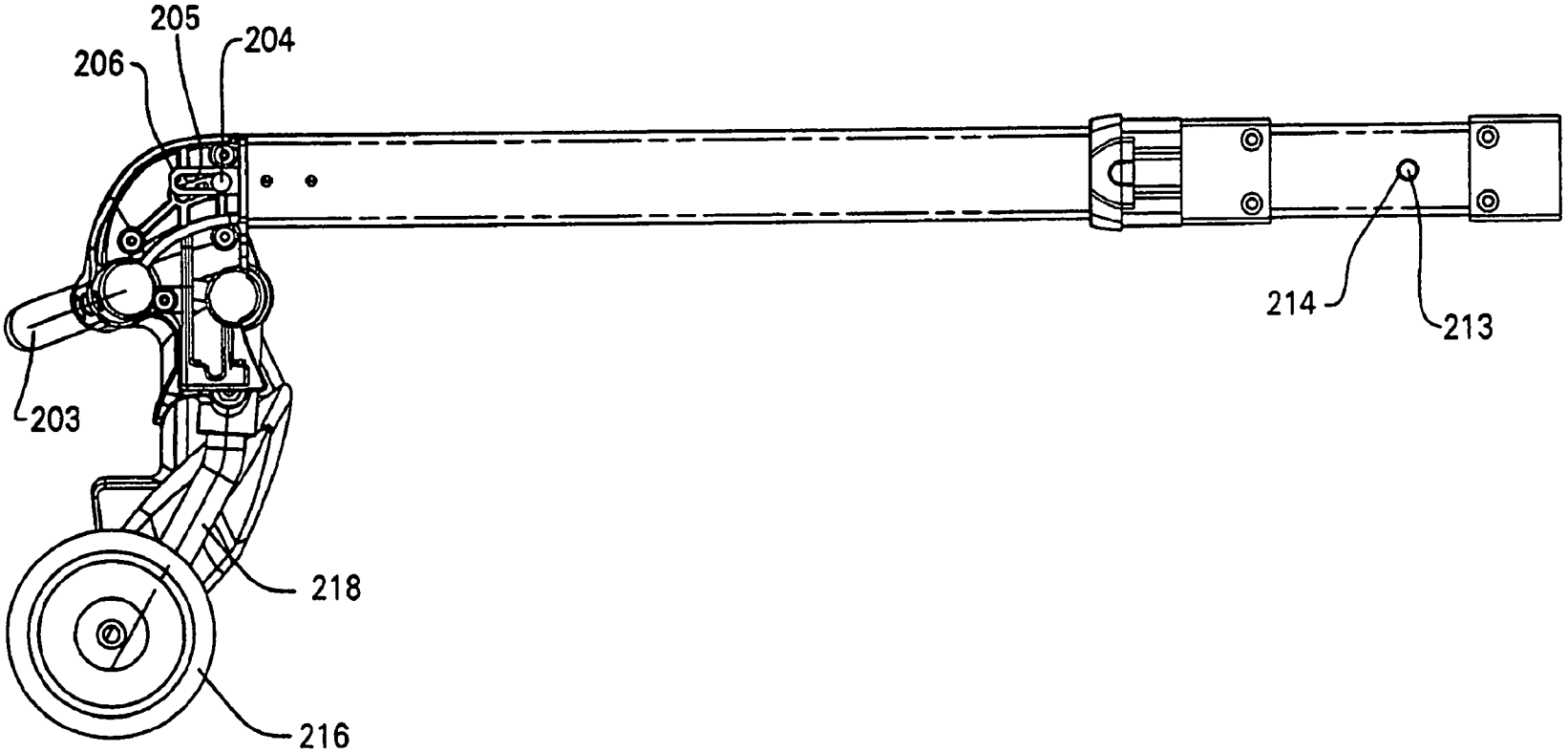
FIG. 41 is a view similar to FIG. 40, except that the handle has been shifted back to its first position illustrated in FIG. 39.
Figure 42:
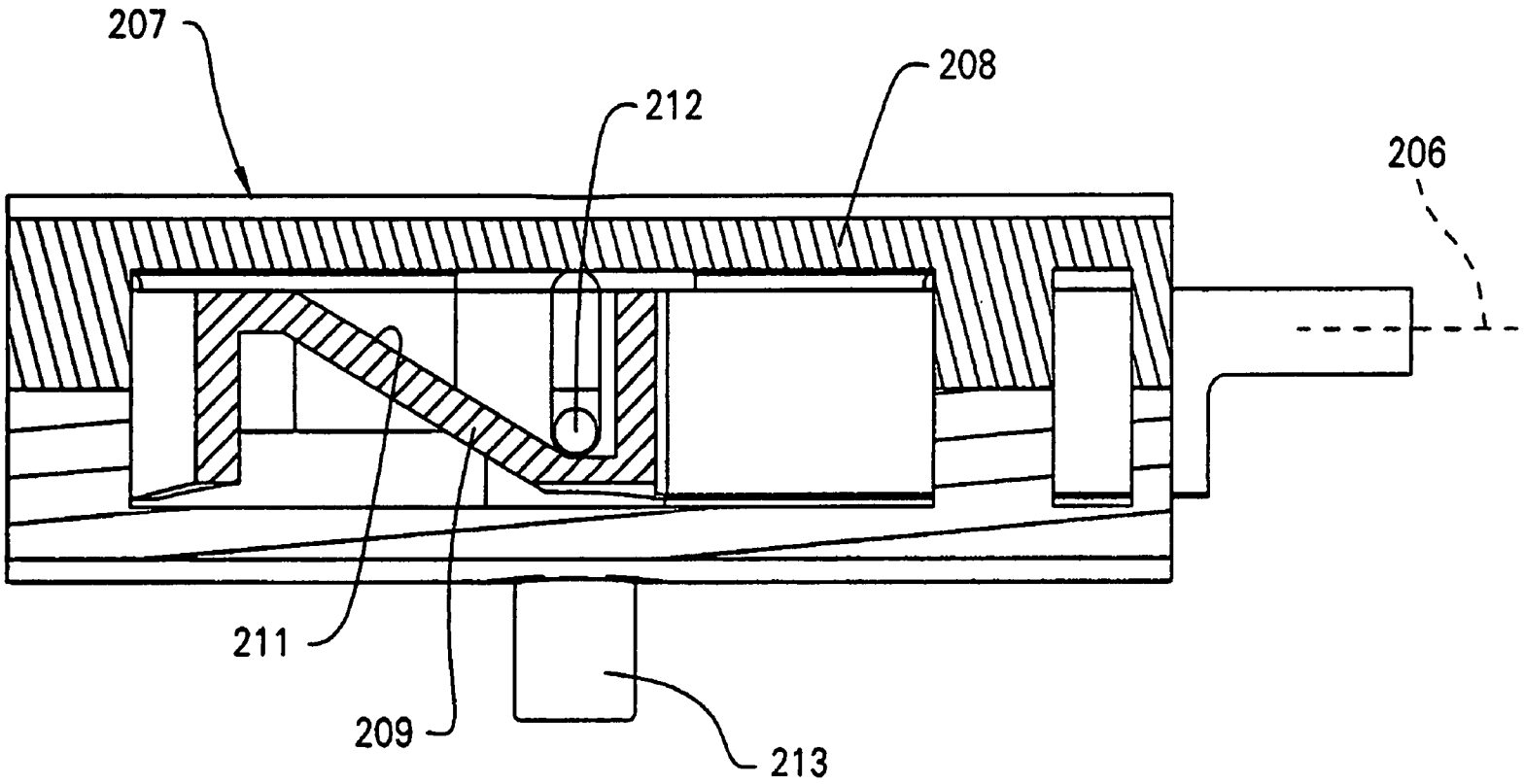
FIG. 42 is a sectional view of a latch mechanism on the head section.
Figure 43:
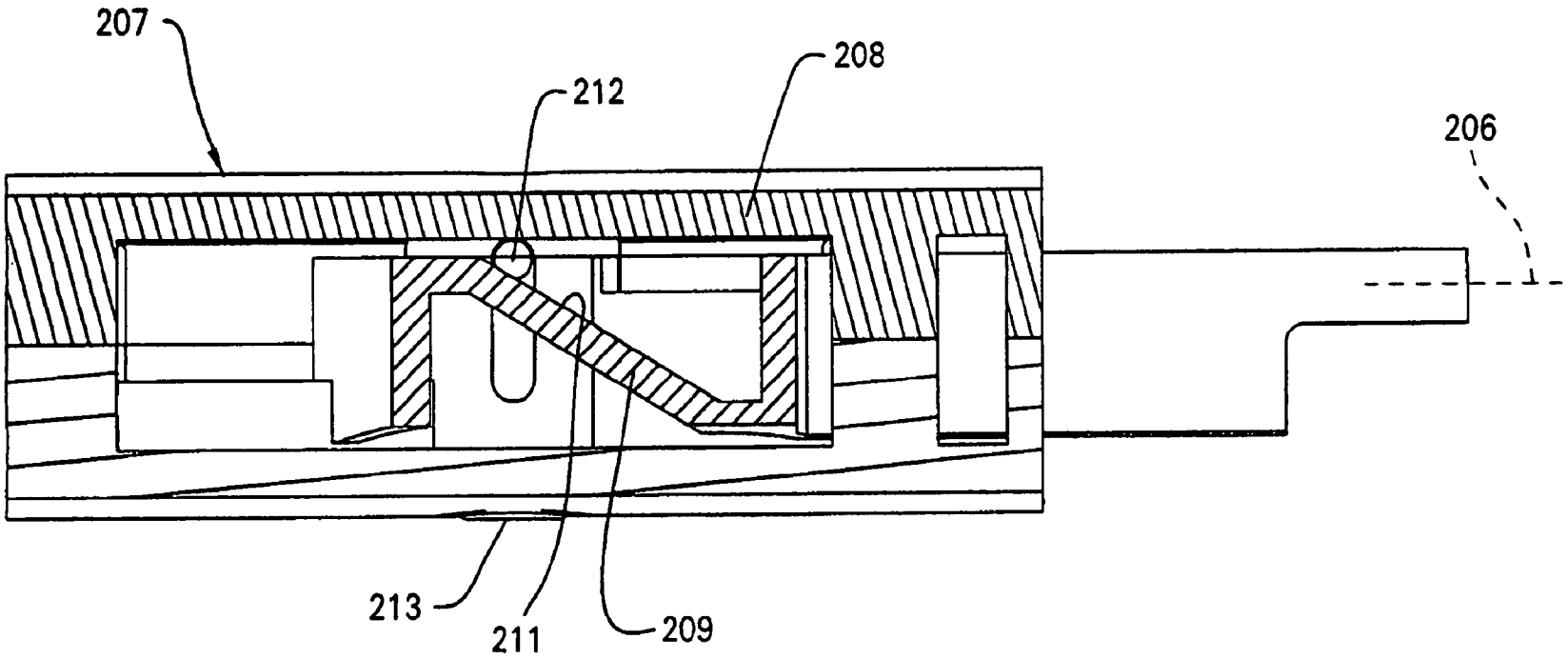
FIG. 43 is a view similar to FIG. 42, except that the latch mechanism has been shifted to its fully operated position.

By comparing FIGS. 35 and 36, it will be noted that the ambulance cot 10 includes a retractable head section 197. This feature can be provided on a manual lift cot or a power lift cot. In the power lift environment, and as is illustrated in FIG. 37, the retractable head section 197 is generally U shaped, namely, having a pair of parallel legs 198 and 199 connected by a pair of brackets 202 to a head rail 203. A cross brace 200 (FIG. 62) also connects the brackets 202. A tubular cross rail 201 is rotatably mounted to the cross brace 200. The legs 198 and 199 are configured to be slidably received by, into the interior of (shown), next to, or below the respective longitudinally extending side rails 66 on the cot 10. The handles 210 are fixed to the cross rail 201 for pivotal movement with the cross rail 201 about an axis corresponding to or parallel to the axis of the cross rail 201 in order to facilitate the movement of a pin 204 projecting from each handle 210 about an axis of rotation defined by or parallel to the axis of the cross rail 201. The pin 204 extends through an arcuate slot 215 in the bracket 202. The handles 210 are affixed such that actuation of one handle 210 effects a rotation of cross rail 201 and subsequent actuation of the other handle 210 so that the head section may be released by the actuation of a single handle 210. The pin 204 is connected by a linkage 206 to a latch mechanism 207 on each leg 198 and 199. The latch mechanism 207 is illustrated in more detail in FIGS. 42 and 43. More specifically, the latch mechanism 207 includes a housing 208 in which a ramp mechanism 209 is slidably disposed lengthwise of the housing 208. The ramp mechanism 209 includes a ramp surface 211 against which a pin 212 rests. The pin 212 includes a latch pin 213 that is configured to move laterally into and out of the housing 208. The position located outside the housing is illustrated in FIGS. 37 and 42. A spring (not illustrated) urges the pin 212 against the ramp surface 211. When the handle 210 is rotated about the axis of rotation corresponding to or parallel to the longitudinal axis of the cross rail 201, the pin 204 is moved from the position illustrated in FIG. 39 to the position illustrated in FIG. 40 to cause a leftward movement of the linkage 206 in each leg 198 and 199 to cause the pin 212 to shift in its position illustrated in FIG. 42 to the position illustrated in FIG. 43, namely, a position wherein the latch pin 212 has been retracted laterally into the housing 208 of the latch mechanism 207. A slot 205 in the link 206 is provided which allows independent, passive engagement of the latch pins 213 when the handles 210 are released. This is illustrated in FIG. 41. A plurality of holes 214 are provided along the length of the side rails 66 and are configured to receive therein the latch pin 213 when in the extended position thereof as shown in FIG. 37. These holes are located such that access to them is not possible, i.e., under a bumper provided on the exterior of the litter rail 66. This is done for protection against inadvertent release, foreign matter, or potential pinching point. When the latch pin is received in an associated hole 214 provided in the side rail 66, the retractable head section will be physically locked to the cot in either the retracted position (FIG. 35) or the extended position (FIG. 36).

Figure 57:
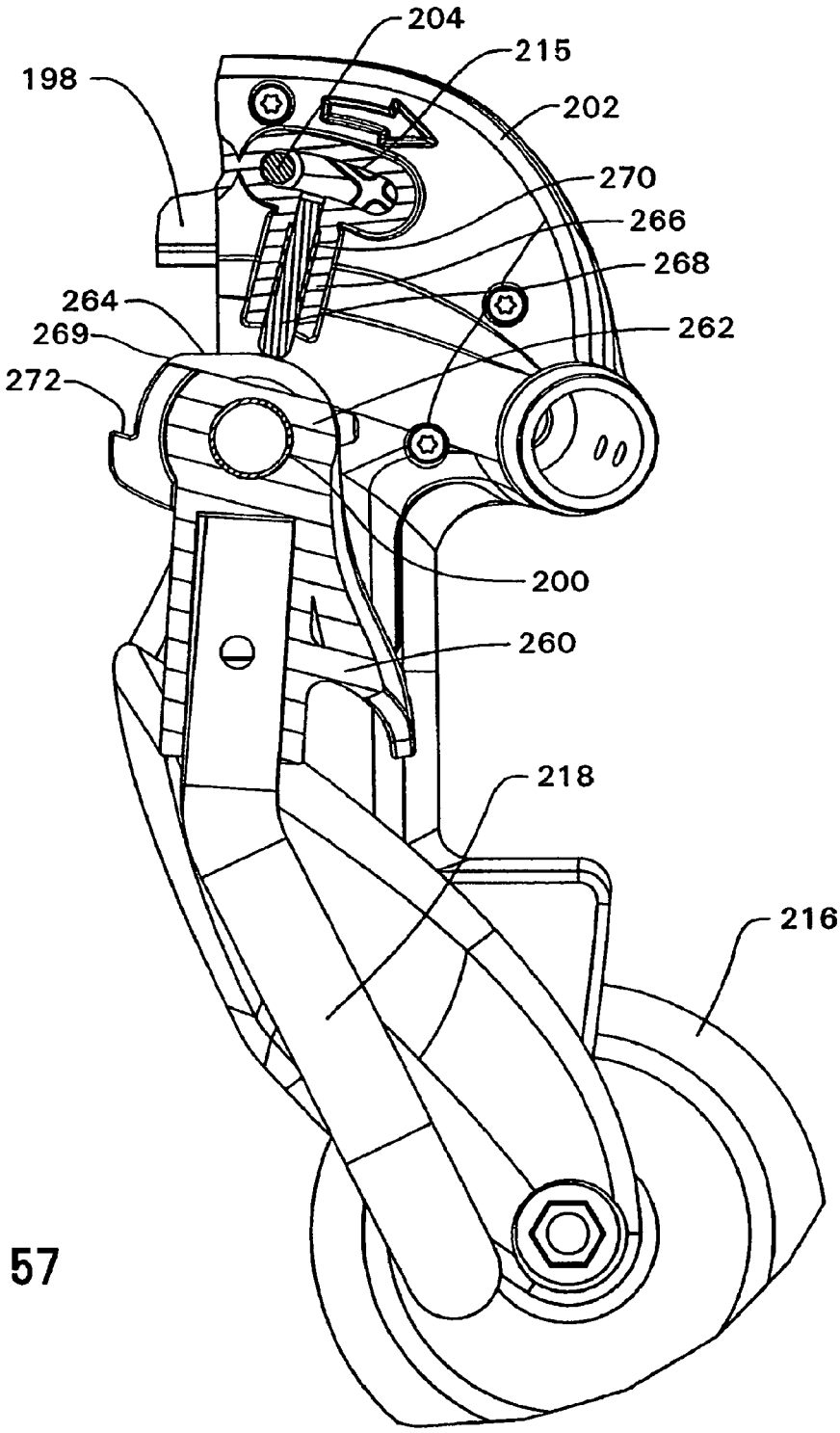
FIG. 57 is a partial cross-sectional view of a retractable head section latch disabler in a disengaged position.
Figure 58:
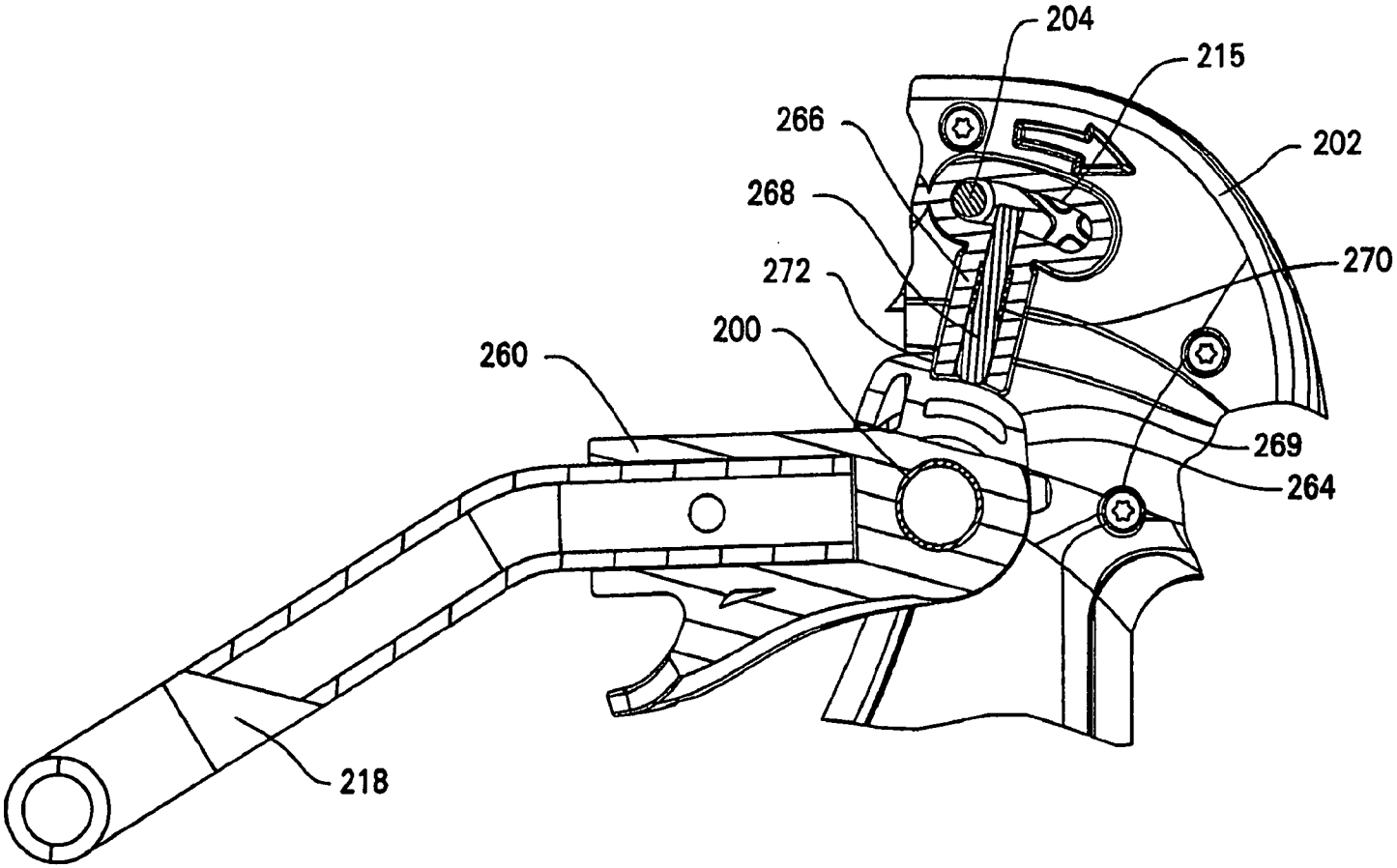
FIG. 58 is a partial cross-sectional view according to FIG. 57 of the latch disabler in an engaged position.
Figure 62:
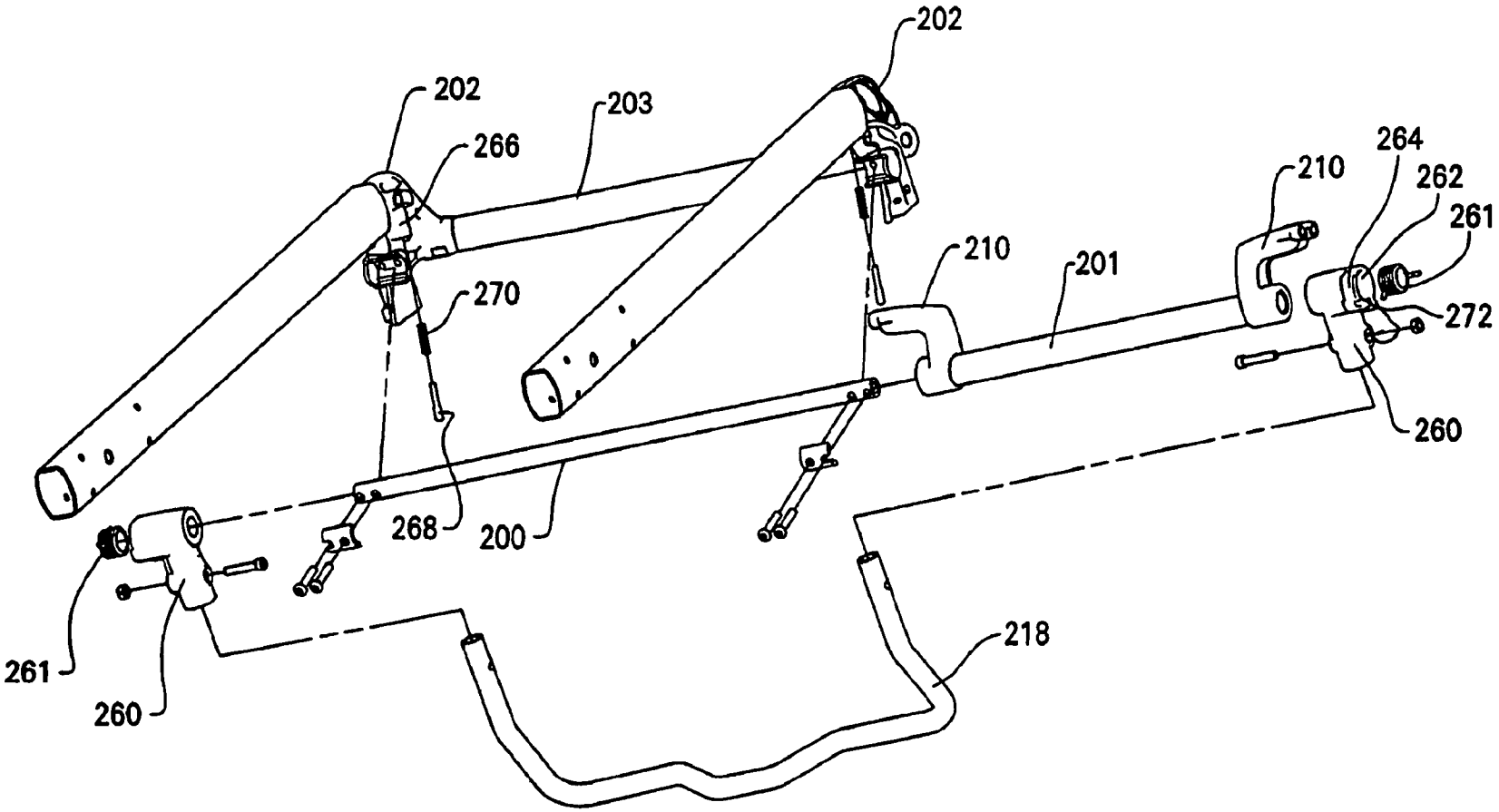
FIG. 62 is an exploded perspective view of the retractable head section and latch disabler of FIGS. 57-58.

In a further embodiment of the retractable head section 197, shown in FIGS. 57-58 and 62, the handles 210 are capable of being locked against rotation about the cross rail 201 to prevent release of the latch mechanism 207. Referring to FIG. 57, the safety bar 218 is fixed to a mounting bracket 260 that is pivotally mounted to the cross brace 200. The mounting bracket 260 is biased into an at rest position by a torsion spring 261 mounted on the cross brace 200 and engaging the mounting bracket 260 and the bracket 202. Reference is made to pending patent application Ser. No. 10/850,144, wherein the safety bar 218 can be rotated upwardly in a counterclockwise fashion, by an attendant, toward the head end of the ambulance cot to clear a hook mounted at the mouth of an ambulance cargo area. In the instant invention, the mounting bracket 260 is configured so that the safety bar 218 can also be rotated upwardly in a clockwise fashion toward the interior of the cot, and function as a "latch disabler" to prevent release of the latch mechanism 207.

A head portion 262 of the mounting bracket 260 is received on the cross brace 200. The head portion 262 is eccentrically configured about the cross brace 200 such that it includes a ramp portion 264 that extends toward the bracket 202 joining the leg 198 to the head rail 203. The mounting bracket 260 is arranged underneath a shaft 266 formed in the bracket 202. The shaft 266 is formed to extend into a central portion of the arcuate slot 215 that receives the pin 204 when the handle 210 is actuated. The shaft 266 is configured to received a pin 268 surrounded by a compression spring 270. The pin 268 and spring 270 are arranged in the shaft 266 so that the pin is biased out of the arcuate slot 215 by the spring 270. The pin 268 is held within the shaft 266 by the head portion 262 of the mounting bracket 260.

In FIGS. 57-58, the pin 204 is shown in the at rest position, that is wherein the handles 210 are not actuated. In order for the handles 210 to be actuated, the pin 204 must travel along the arcuate slot 215. During certain stages of transport, it is desirable to prevent the retractable head section 197 from changing its status from extended to retracted or vice versa. Therefore, it would be advantageous to prevent the inadvertent actuation of the handles 210. This can be accomplished by preventing the travel of the pin 204 through the arcuate slot 215, such as by pushing the pin 268 into the slot 215 to block the travel of the pin 204.

Referring to FIG. 58, the safety bar 218 has been rotated clockwise about the cross brace 200. As the safety bar 218 rotates from the position shown in FIG. 57, the pin 268 rides along the ramp portion 264 of the mounting bracket 260. The ramp portion 264 is eccentrically configured, so that as the mounting bracket 260 rotates about the cross brace 200, the radius of the head portion 262 increases, forcing the pin 268 through the shaft 266 and into a blocking position in the arcuate slot 215 as when the safety bar slides over an existing cot fastening mechanism in an ambulance. The safety bar 218 can rotate so that the pin 268 blocks the arcuate slot 215, preventing the handles 210 from being actuated. Full engagement of the pin 268 occurs when the pin 268 reaches an end 269 of the ramp 264. This occurs prior to a stop 272 of the mounting bracket 260 abutting the shaft 266, which prevents further rotation of the safety bar 218. The torsion springs 261 are mounted one on each side of the safety bar 218, and act in torsion in opposing directions about cross brace 200, urging the brackets 260 and the safety bar 218 to a downward, neutral position, whereby the latch disabler is disengaged.

Figure 63:
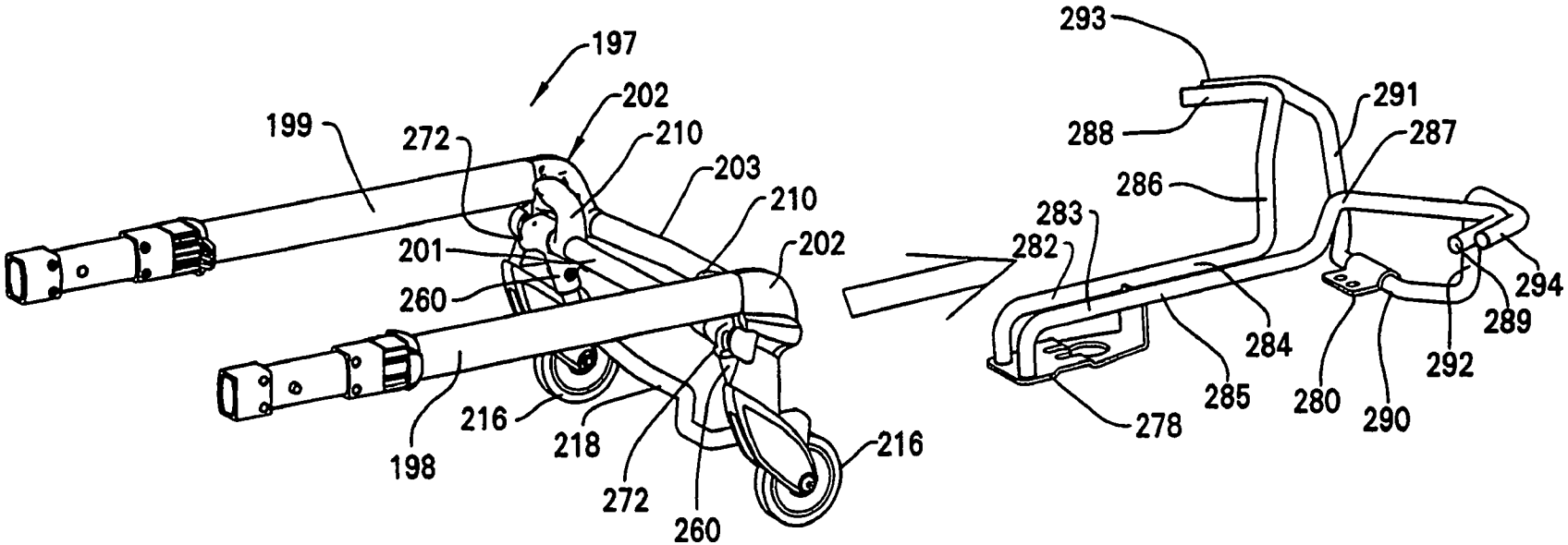
FIG. 63 is a perspective view of the head section of the ambulance cot aligned with an antler system for an ambulance cargo area.
Figure 64:
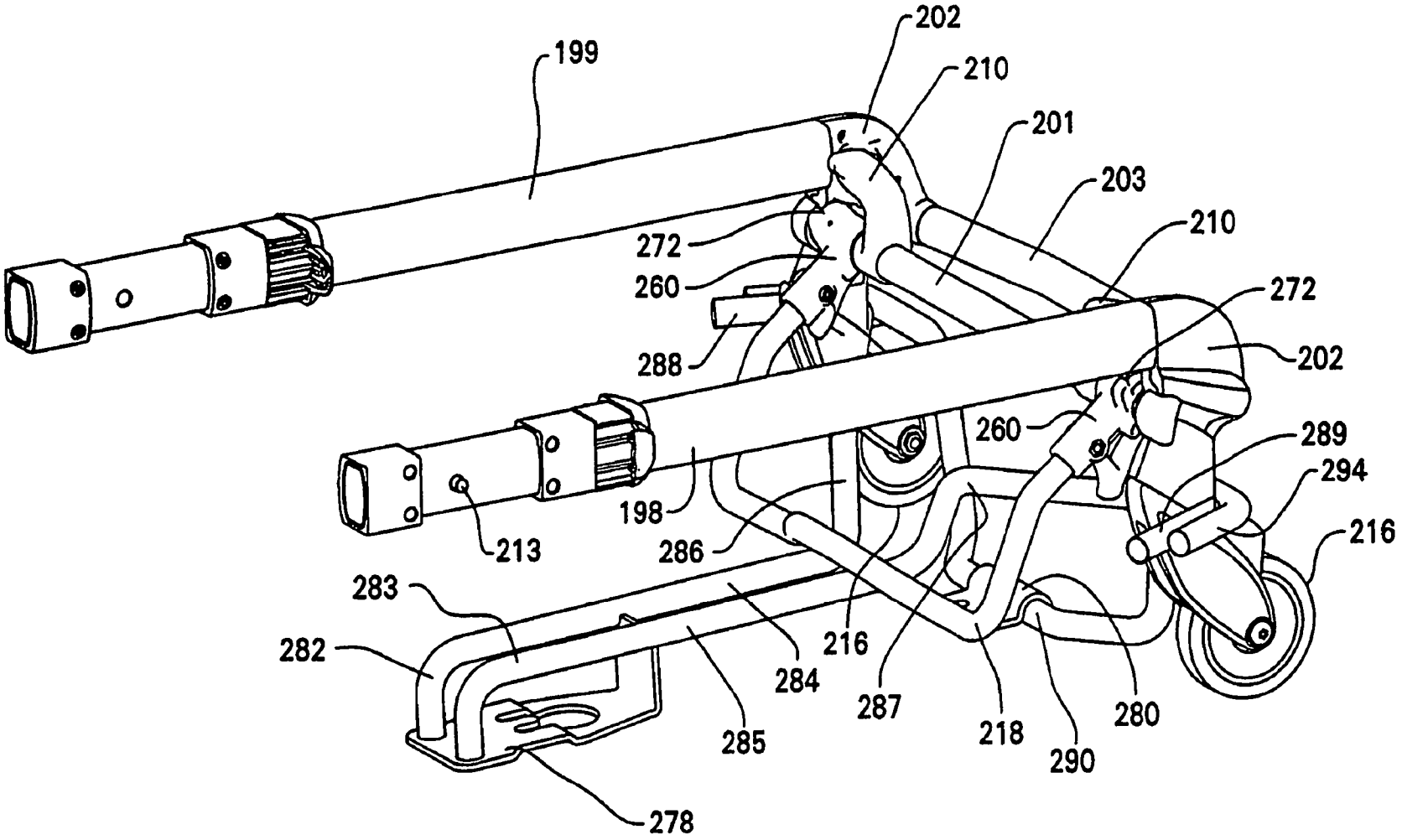
FIG. 64 is a perspective view of the head section engaged with the antler system of FIG. 63.

Referring now to FIGS. 63-64, the retractable head section 197 is configured to engage a portion of a cot fastening mechanism or "antler" system 276 configured for mounting to the floor of the cargo area of an ambulance. The antler system 276 includes a center yoke 278 and a forward yoke 280. Both yokes 278, 280 are mounted to the ambulance cargo area floor, with a centerline of the antler system 276 aligned in the fore-aft direction of the ambulance.

The center yoke 278 is formed of two rods 282, 283 arranged as mirror images about the centerline of the antler system 276. Each rod 282, 283 includes a longitudinal segment 284, 285 and an outwardly divergent segment 286, 287, each outwardly divergent segment rising to a rearwardly directed hook or "ear" 288, 289.

The forward yoke 280 includes a central segment 290 secured to the ambulance cargo floor and two outwardly divergent arms 291, 292. The arms each terminate in an "ear" 293, 294 that is joined with a respective ear 288, 289 of the center yoke 278.

As the ambulance cot 10 is rolled into the ambulance cargo area head end first, as shown by the arrow in FIG. 63, the safety bar 218 contacts the center yoke 278. As the cot 10 is rolled further, the center yoke 278 forces the safety bar 218 rearwardly until the safety bar 218 rides on top of the longitudinal segments 284, 285 of the rods 282, 283 of the center yoke 278. Again referring to FIG. 58, the latch disabler is activated prior to the stop 272 reaching the shaft 266. This enables use of the cot 10 with an antler system having a lower profile, while still activating the latch disabler. With the safety bar 218 in the rotated position of FIG. 64, the latch disabler is activated, thereby locking the retractable head section 197 in the extended position. The latch disabler will remain activated until the ambulance cot 10 is removed from the antler system 276. As the ambulance cot 10 is pushed further forward, the fixed wheels 216 roll between the ears 288, 289 and 293, 294 of the center and forward yokes 278, 280 and the into the antler system 276.

It is to be noted that the longitudinal axis of the side rails 66 are inclined to the horizontal at an angle $\alpha$ (see FIG. 35) that is in the range of 1 to 10°. In this embodiment, the preferred angle is in the range of 2 to 3°. Thus, when the retractable head section 197 is retracted, the load wheels 216 on the retractable frame of the head section 197 are lifted from the ground surface 217 thereby enabling the cot to roll in any direction on the four castered wheels 14. This is referred to as the "no steer" condition. When the retractable head section 197 is extended to the position illustrated in FIG. 36, the load wheels 216 will engage the support surface 217 to provide a steering effect for the cot as it is moved over the surface 217 (a "steer" condition). In this particular embodiment, the load wheels 216 are each rotatable about a fixed horizontal axis of rotation. That is, the wheels 216 are not supported in a castered manner. The head section 197 must be in the extended position of FIG. 36 in order to be steered into the ambulance for engagement with the antler system 276.

Folded Safety Bar

Figure 46:
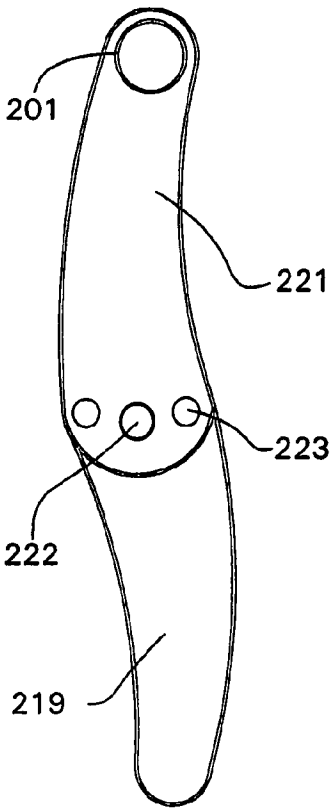
FIG. 46 is a view of the safety bar in the unfolded position.
Figure 45:
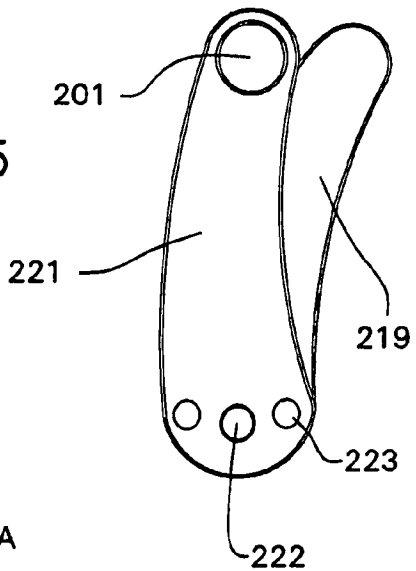
FIG. 45 is a side elevational view of the safety bar in the fully folded position as illustrated in FIG. 44.
Figure 44:
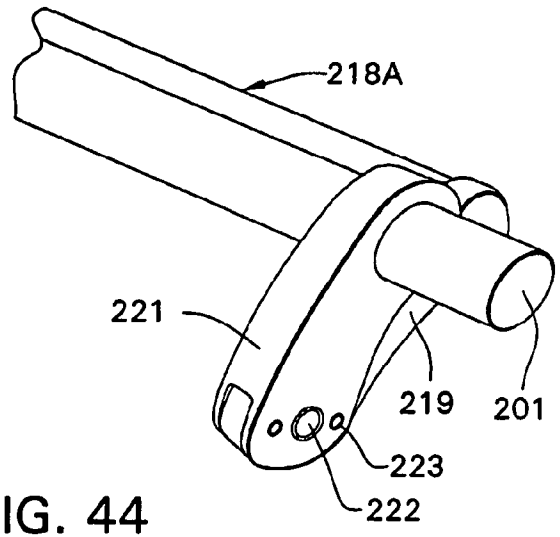
FIG. 44 is an isometric view of a fully folded foldable safety bar on the head section.

As is illustrated in FIG. 37, the retractable head section 197 includes a safety bar 218. The safety bar is configured to operatively engage a safety hook provided on the floor surface of a cargo area of an ambulance to prevent the cot from rolling completely out of the ambulance without an attendant being there to handle the head end of the cot. Reference is to be made to pending U.S. patent application Ser. No. 10/850,144, filed May 20, 2004, the subject matter of which is to be incorporated herein by reference. As is illustrated in FIGS. 44-46, a modified safety bar 218A can be provided which is foldable between the folded position illustrated in FIG. 45 and an unfolded position illustrated in FIG. 46. That is, the safety bar 218A includes two sections 219 and 221 interconnected by a pivot axle 222. The safety bar sections 219 and 221 are approximately of the same length so that the pivot axle 222 is oriented at the midlength portion of the extended handle as is illustrated in FIG. 46. Releasable locking pins 223 are provided to lock the handle sections 219 and 221 in the respective folded position (FIG. 45) and the unfolded position (FIG. 46). A push button release or removable pin or other means of release (not illustrated) is provided for facilitating an activation of the locking pins to unlock them and facilitate relative movement between the handle sections 219 and 221.

Accessories

Figure 51:
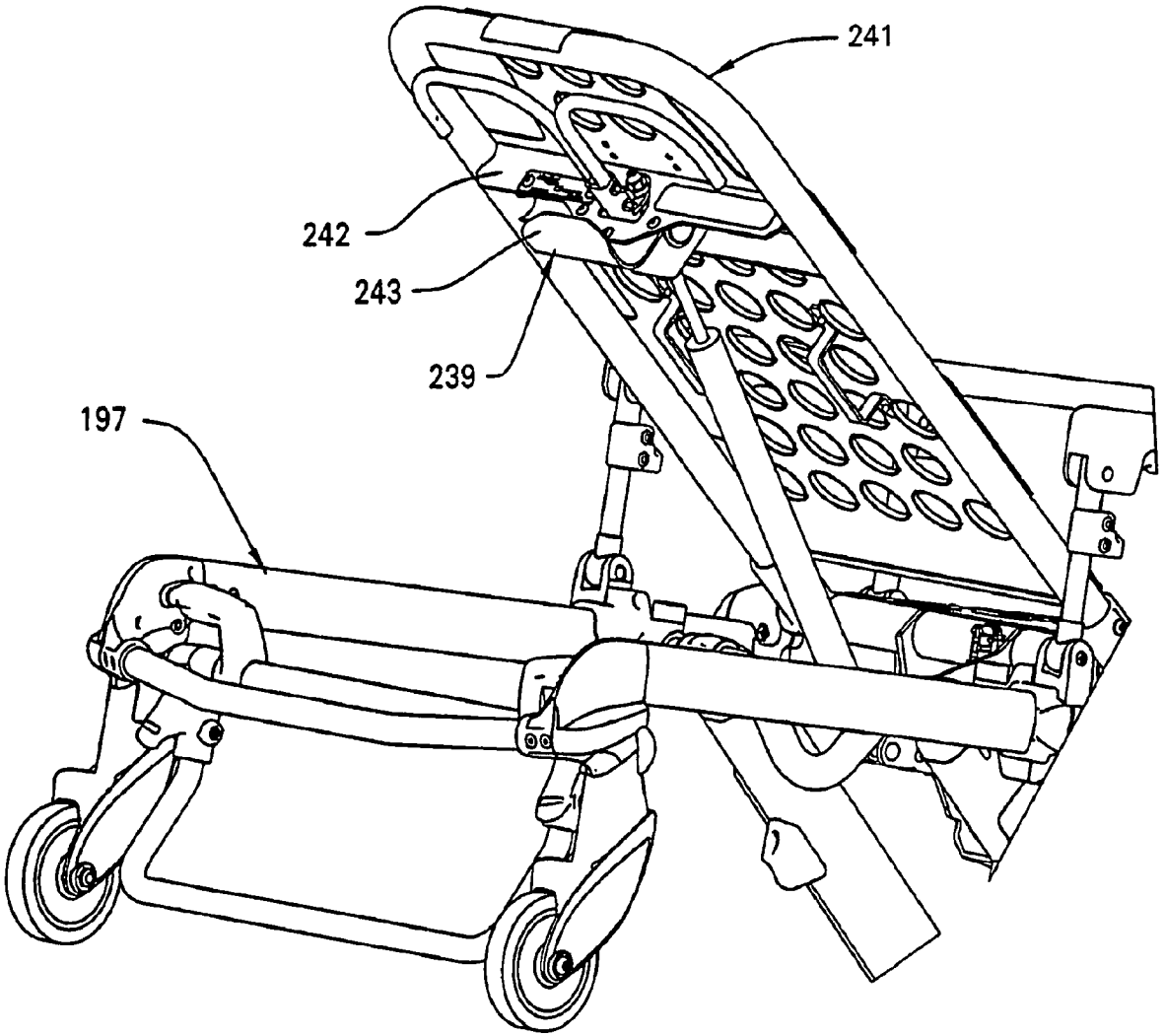
FIG. 51 is an enlarged view of a fragment of FIG. 50.
Figure 52:
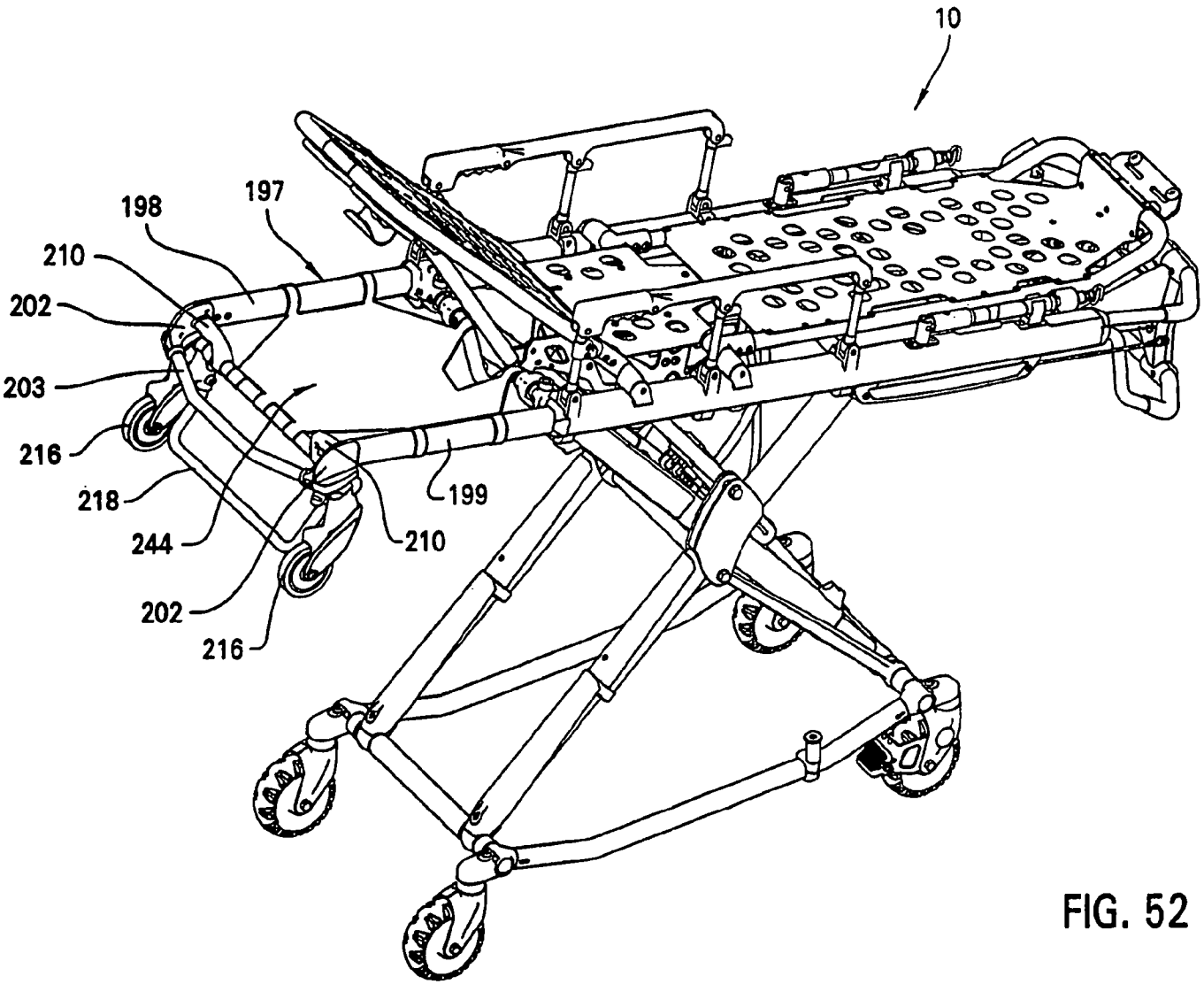
FIG. 52 is an isometric view of the cot having a collapsible pouch accessory thereon, which pouch is in the extended position of use in response to an extension of the head section.
Figure 53:
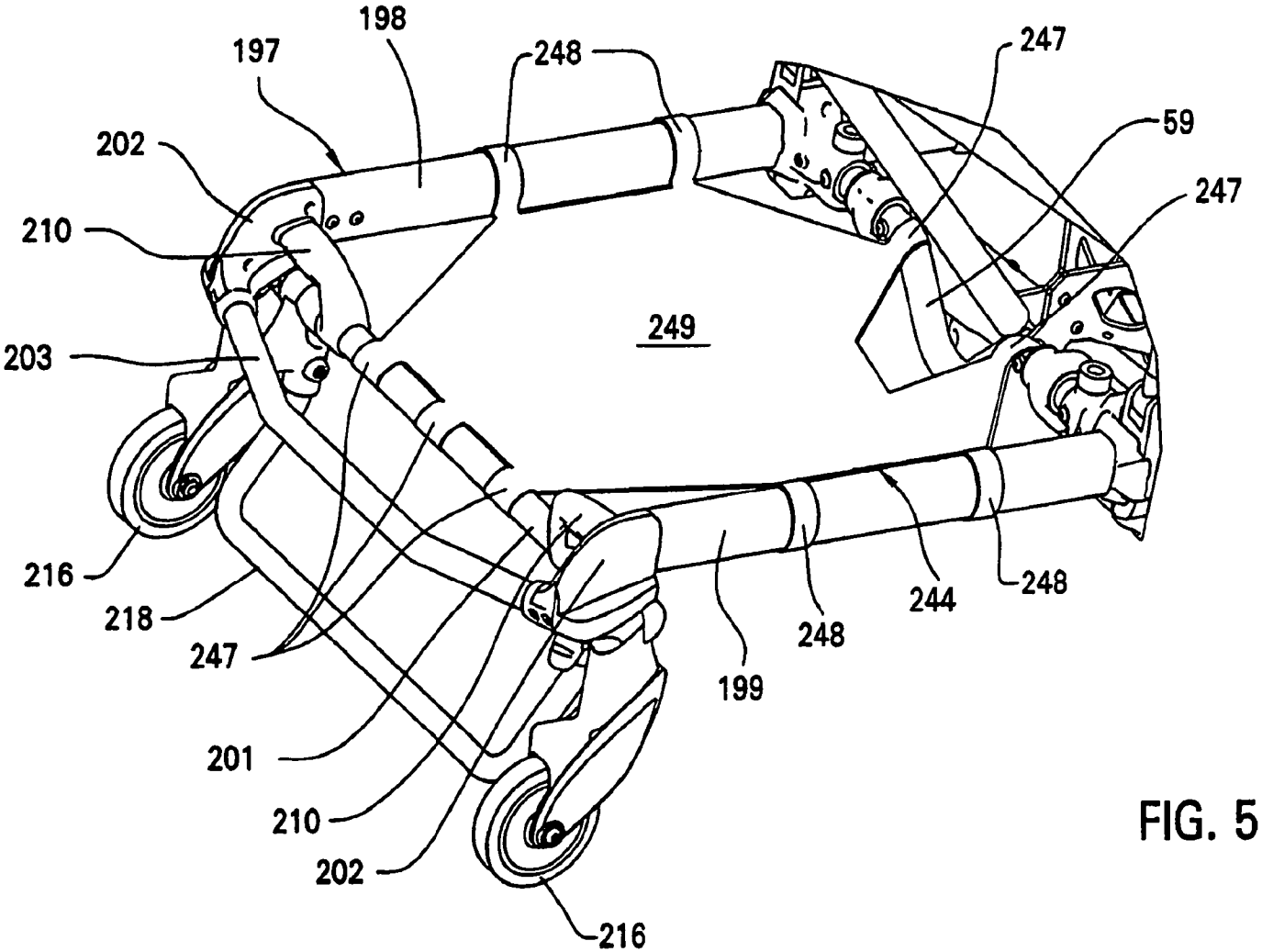
FIG. 53 is an enlarged view of a fragment of FIG. 52.

FIGS. 50-56 illustrate two accessories that can, if desired, be incorporated on the ambulance cot 10. The first accessory is depicted in FIGS. 50-51 and is a hook 239 oriented within the cot perimeter and which, specifically, is secured to the underside of the raisable and lowerable fowler 241 on the ambulance cot 10. The hook 239 consists of a sheet of material formed into a J with the stem of the J being secured to a cross rail 242 on the underside of the fowler 241 and the hook part 243 of the J facing toward the head end (left end) of the cot as depicted in FIGS. 50-51. The hook 239 facilitates the hanging of various articles therefrom while the cot is in use.

Figure 54:
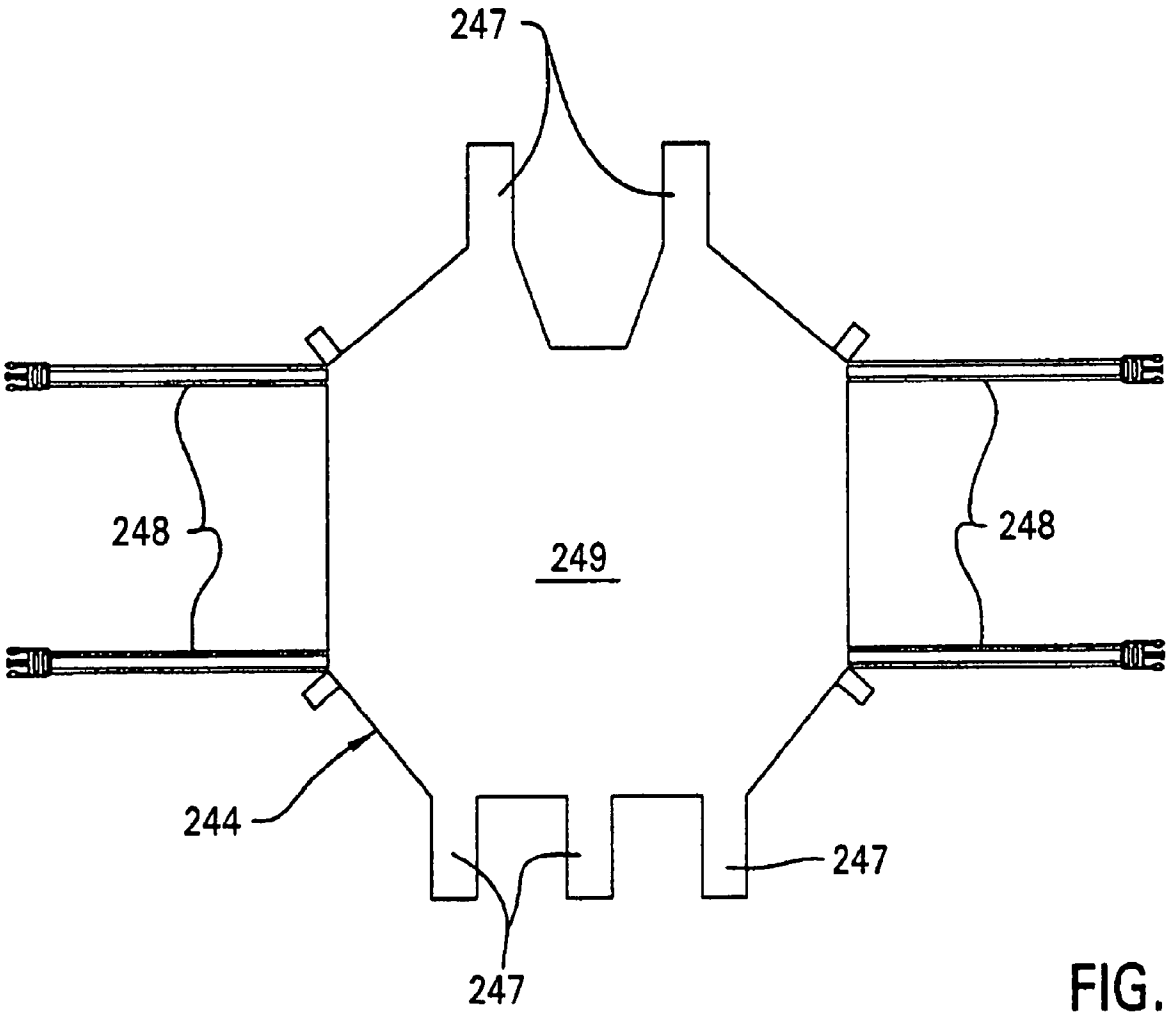
FIG. 54 is a plan view of the pouch accessory.
Figure 55:
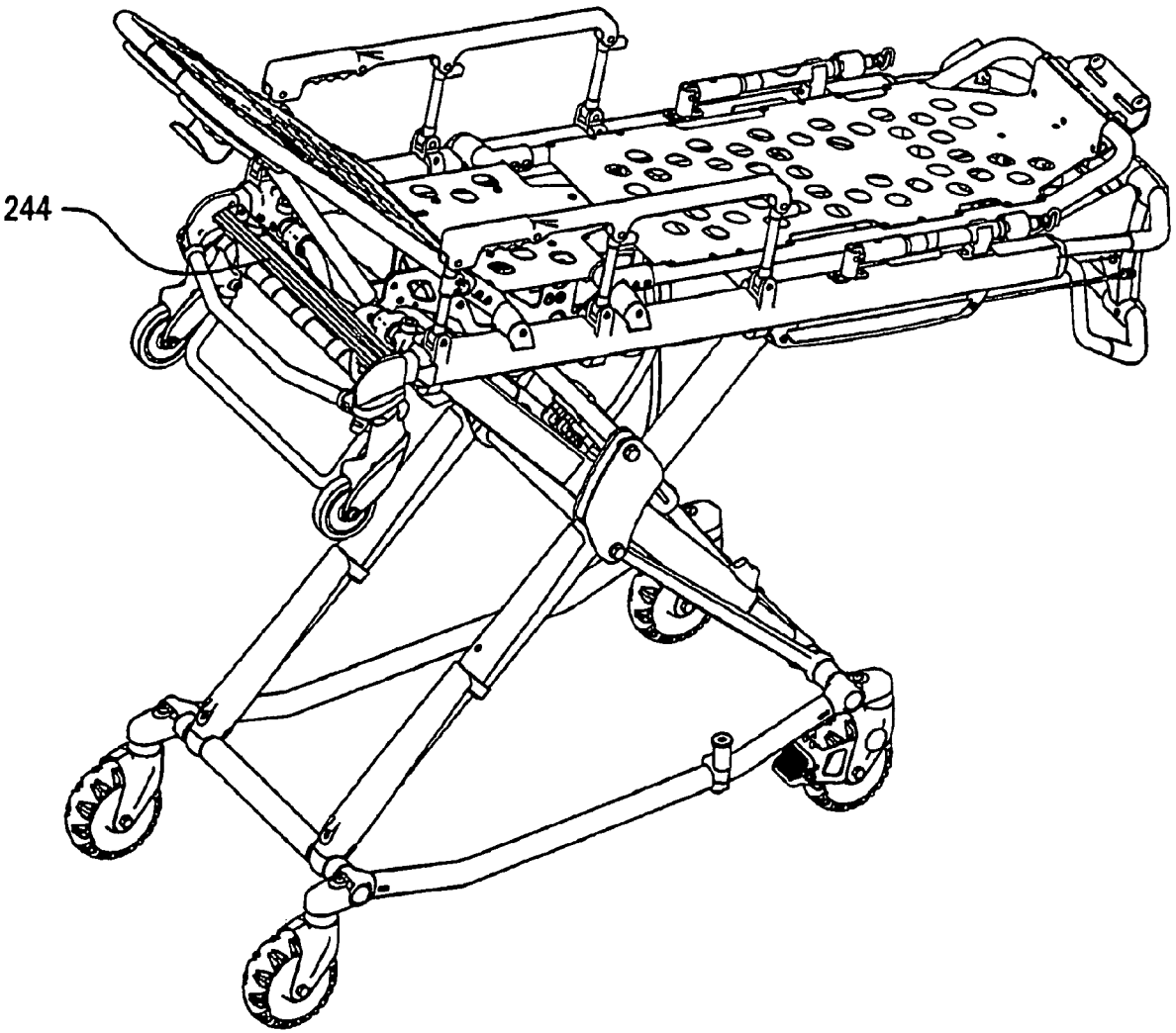
FIG. 55 is a view similar to FIG. 52 but with the pouch in the collapsed condition in response to a retraction of the head section.
Figure 56:
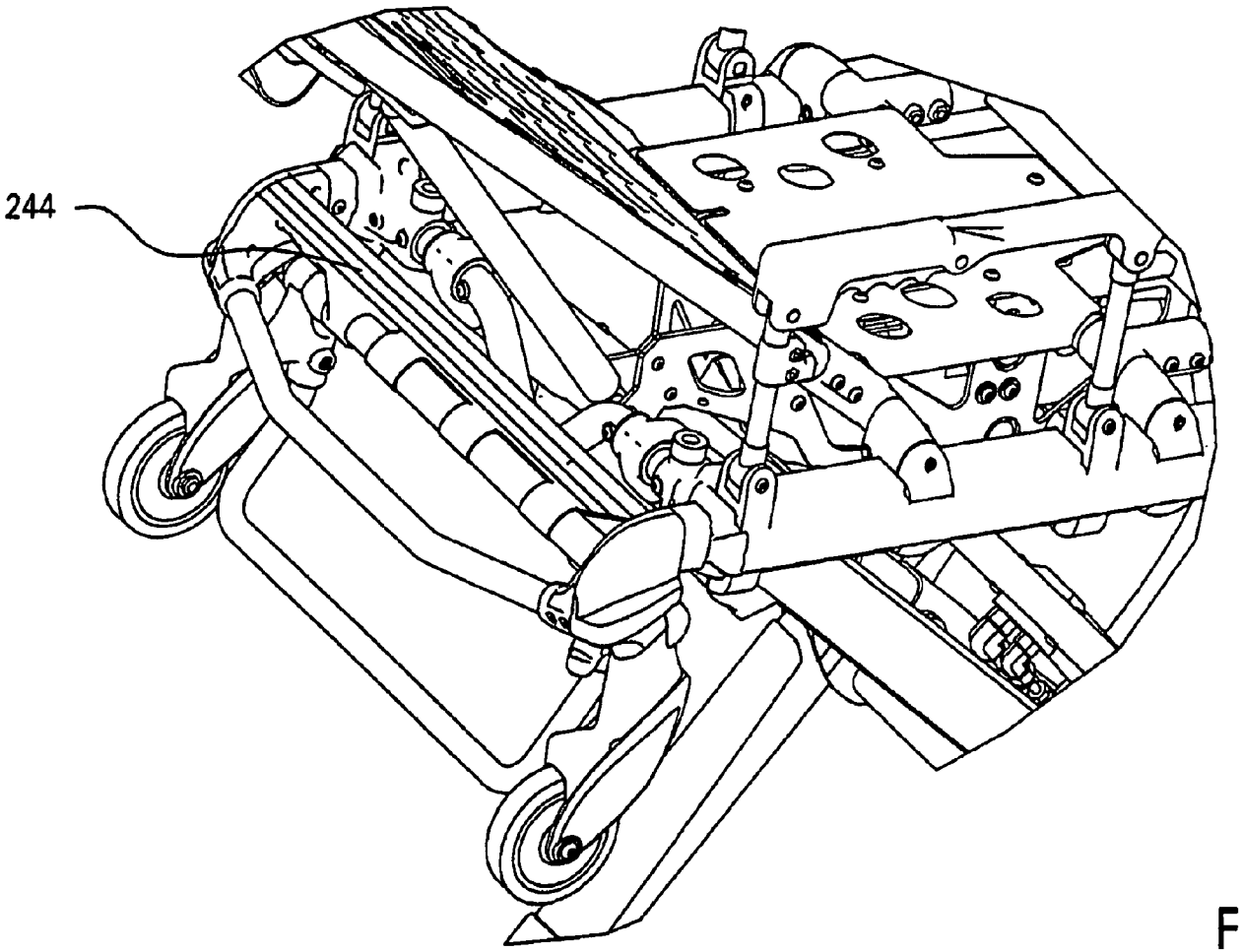
FIG. 56 is an enlarged view of a fragment of FIG. 55.

The second accessory is depicted in FIGS. 52-56 and is a collapsible pouch 244 secured to and extending between the legs 198, 199 of the head section 197 as well as to and extending between the cross rail 201 on the head section and the cross rail 59 (FIG. 5) on the litter frame 17. As is shown in FIG. 54, the pouch 244 consists of a planar sheet of fabric 237 to which are sewn plural fasteners 247 and 248 at spaced locations around the perimeter of the fabric sheet 246. The fasteners 247 are looped around the cross rails 59 and 201 while the fasteners 248 are looped around the laterally space legs 198 on the head section. When the head section 197 is in the extended position shown in FIGS. 52 and 53, the fabric sheet 246 is stretched between the longitudinally spaced cross rails 59 and 201 and laterally spaced legs 198 so as to provide a support surface 249. When the head section 197 is retracted to the position illustrated in FIGS. 55 and 56, the cross rails 59 and 201 become closely adjacent one another and the fabric sheet 246 is collapsed in an accordion style therebetween.

Operation

While the operative characteristics of the ambulance cot will be apparent to those skilled in the art upon reading the above set forth description and referring to the accompanying drawings, a discussion of the operational characteristics of the ambulance cot are set forth below for convenience.

Figure 2:
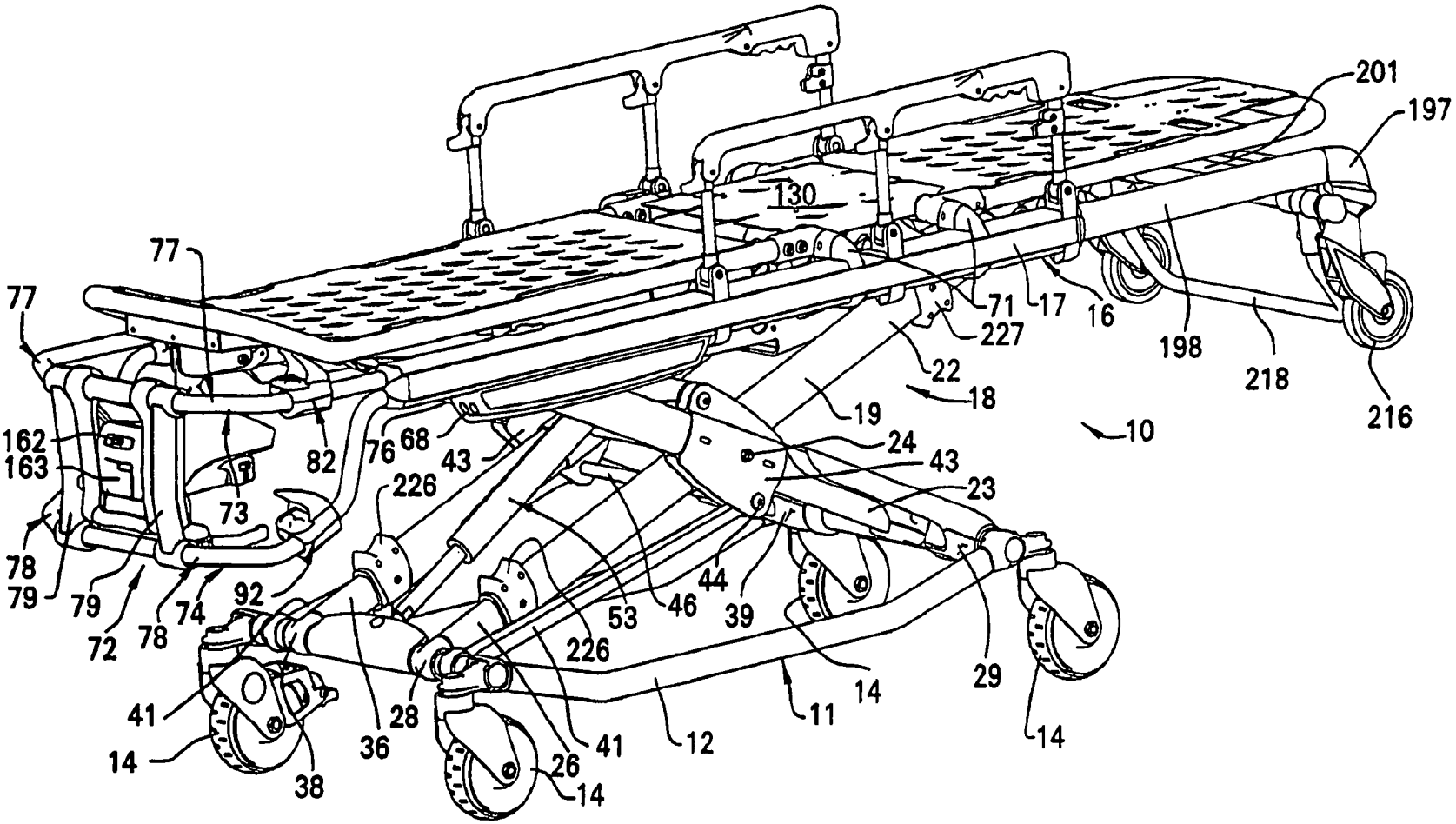
FIG. 2 is an isometric view of an ambulance cot similar to FIG. 1, except that the ambulance cot is in a mid-height position.
Figure 7:
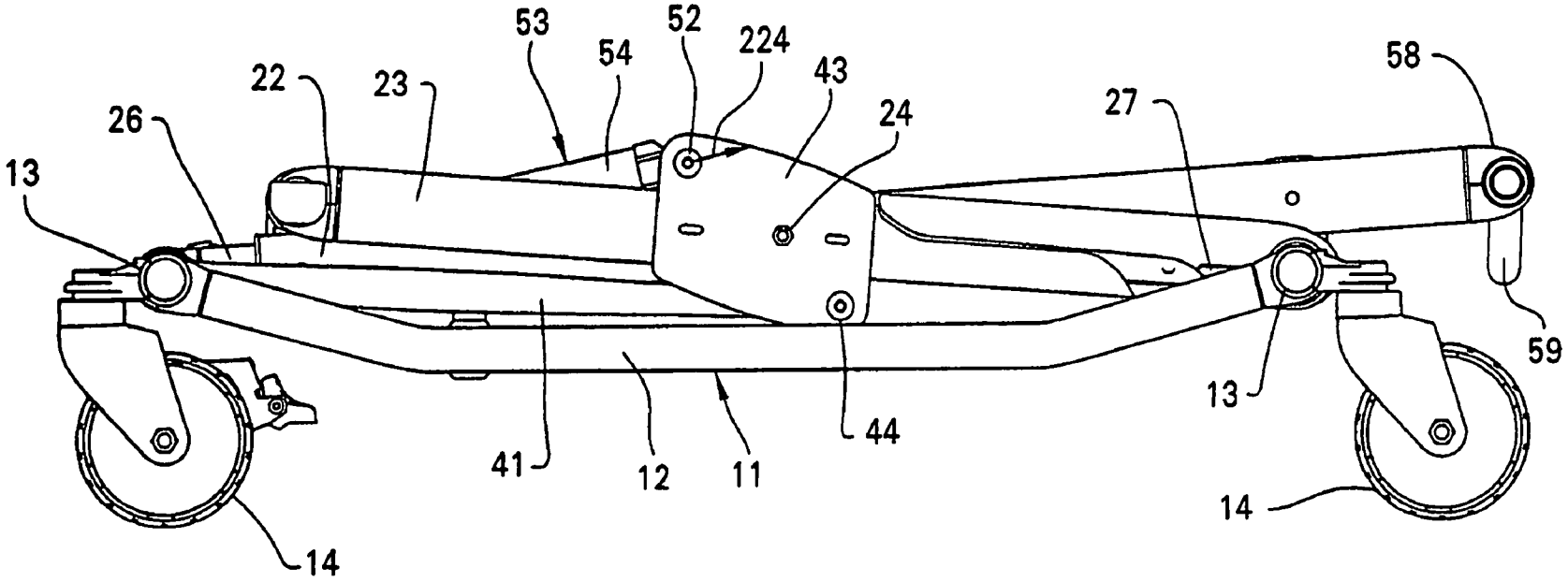
FIG. 7 is a side view of a collapsed base and elevating mechanism on the ambulance cot.

When the ambulance cot is in the fully collapsed position, and referring to FIGS. 4 and 7, an extension of the linear actuator 53 will cause a clockwise (FIG. 7) rotation of the bracket 43 about the axis of the fastener 44, the linear actuator being extended in the direction of the arrow 224. The position of the fastener 44 (FIG. 4) is determined by the fixed length linkage members 41. As a result of this geometry, the amount of force in the direction of the arrow 224 is optimal and effects a rapid lifting of the litter 16 from the positions illustrated in FIGS. 3 and 4 through the mid-height position illustrated in FIG. 2 to the full height position of the litter illustrated in FIG. 1. As the brackets 43 are lifted with continued extension of the linear actuator 53, the further X frame members 32, 33, 36 and 37 will telescope outwardly to accommodate the changing height of the frame members 22 and 23 from the base 11. In this particular embodiment, the pivot axle 24 for the two brackets 43 extend through the respective X frame members 22, 23 and 32, 33. As a result, it is necessary to provide an elongate slot in each of the further X frame members 26, 27 and 36, 37 in order to accommodate the presence of the pivot axle 24. It is to be recognized that a placement of the pivot axle 24 can be oriented at a location on the bracket 43 which will make it unnecessary to provide an axle receiving hole in each of the X frame members 23 and 33 as well as the elongate slots in the further X frame members 27 and 37. This provides an advantage of increased strength and stiffness of the base. When the litter 16 is lowered to the position illustrated in FIG. 3, mounts 226 (FIG. 1) will operatively engage a cross rail provided on the underside of the litter 16 and additional mounts 227 will rest on the cross rail 13 on the base. The mounts 226 and 227 are oriented so that they are not readily accessible by attendants in the region of the ambulance cot and, therefore, pinching issues are avoided.

Figure 11:
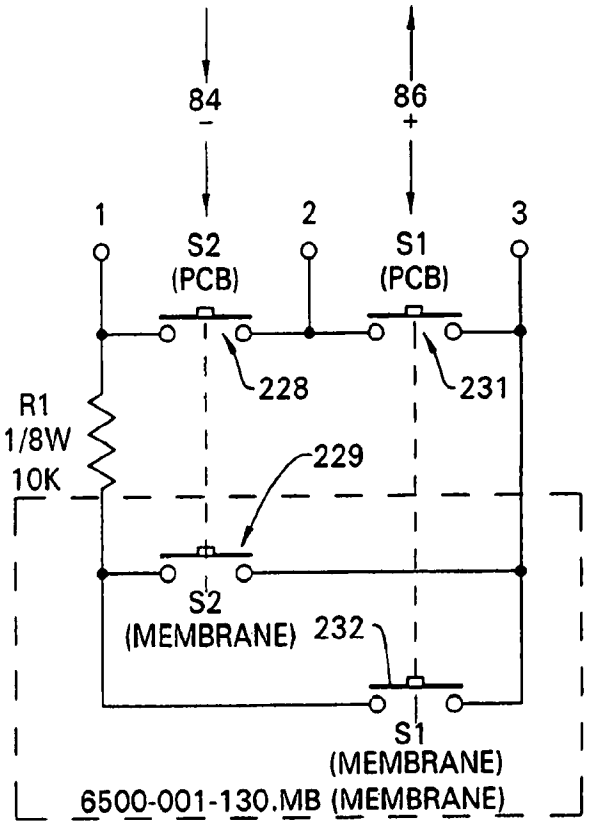
FIG. 11 is an electrical schematic of a switch mounted on the switch housing illustrated in FIG. 10.

Referring to FIG. 11, each push button switch 84, 86 on the foot end lift handle assembly 72 requires two sets of switch contacts to be engaged in order to effect the desired command. That is, the set of contacts 228, 229 must both be closed in order to effect, for example, a retraction of the reciprocal rod 56 into the cylinder housing 54. Similarly, the two sets of contacts 231 and 232 of the switch 86 will effect an extension of the reciprocal rod 56 from the cylinder housing 54.

Turning now to FIGS. 17-25, the hydraulic circuit operation will now be described. Assuming the ambulance cot is in an ambulance and is now in the process of being removed from the ambulance, it is necessary to deploy the base from the position illustrated in FIG. 3 to the position illustrated in FIG. 1 and as taught in WO 2004/064698. Normally, the control 158 is in what is referred to as the "sleep" mode. Once a command is presented, such as by depressing the switch 86 to close the contacts 231 and 232, such action is noted by the control 158 to effect a powering up of the circuit to effect an opening of the valve 137 (Valve A) to shift the valve from its FIG. 17 position to the FIG. 18 position. The control will also make inquiry concerning whether the high top sensors 166 and 167 have been detected (see FIG. 25) and, if not, the electric motor 122 is ramped in to effect a driving of the hydraulic pump 124. As soon as the motor reaches its maximum speed, the motor is continued to operate driving the pump at maximum speed until the sensor 167 is detected at which time the speed of the motor is ramped down or gradually slowed until the high top sensor 166 is detected, at which time the motor is brought to a stop. If the contacts 231 and 232 remain closed, the motor will remain stopped until the button 86 has been released by the attendant. Rapid uncontrolled deployment of the base from the FIG. 3 position to the FIG. 1 position is prevented by the orifice 136 in the valve 134 (Valve F). The attendant can thereafter "jog" the litter further upwardly by pressing the switch. In this case, the controller will activate the motor for a short interval of time, allowing incremental upward movement of the litter.

Figure 3:
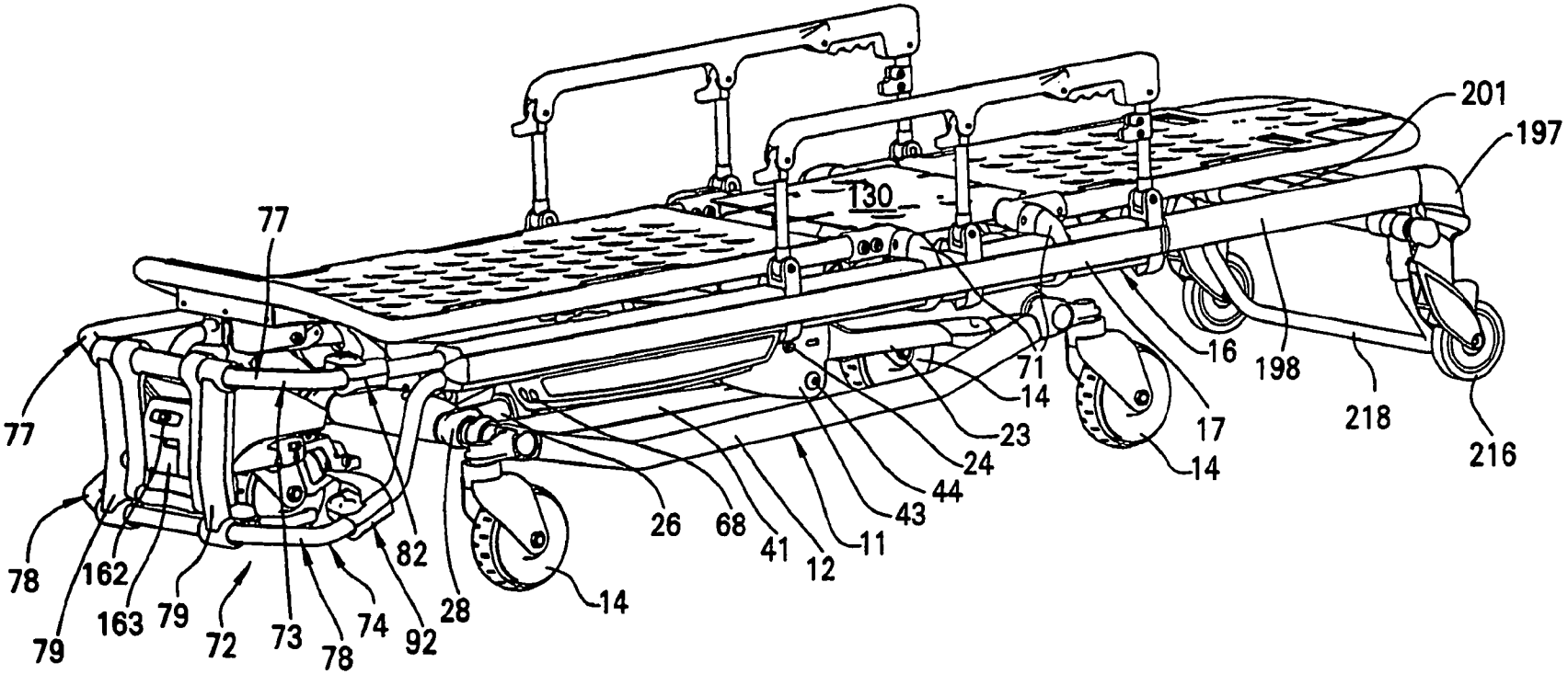
FIG. 3 is an isometric view of an ambulance cot similar to FIG. 1, except that the ambulance cot is in the fully collapsed and lowered position.
Figure 19:
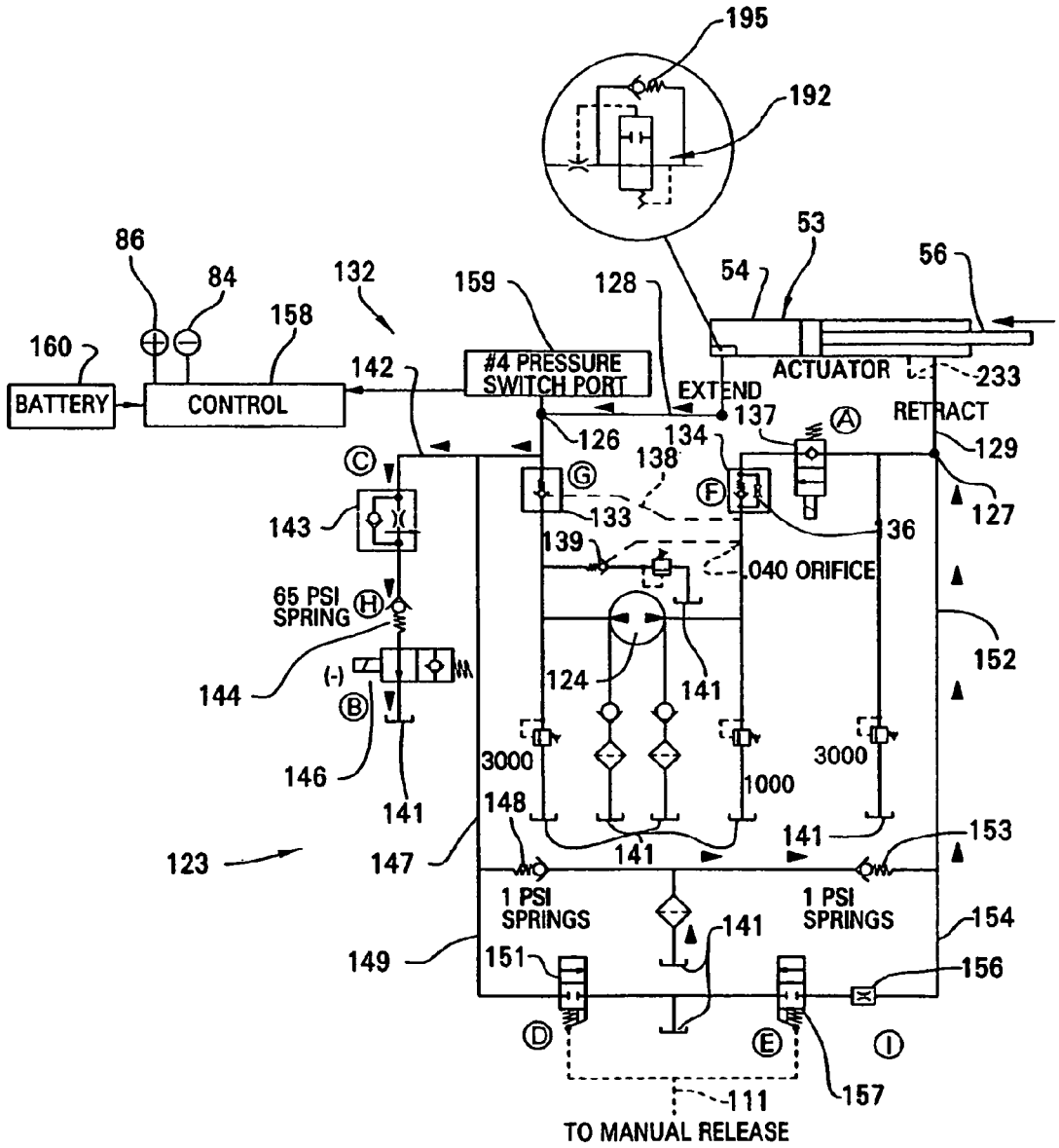
Figure 20:
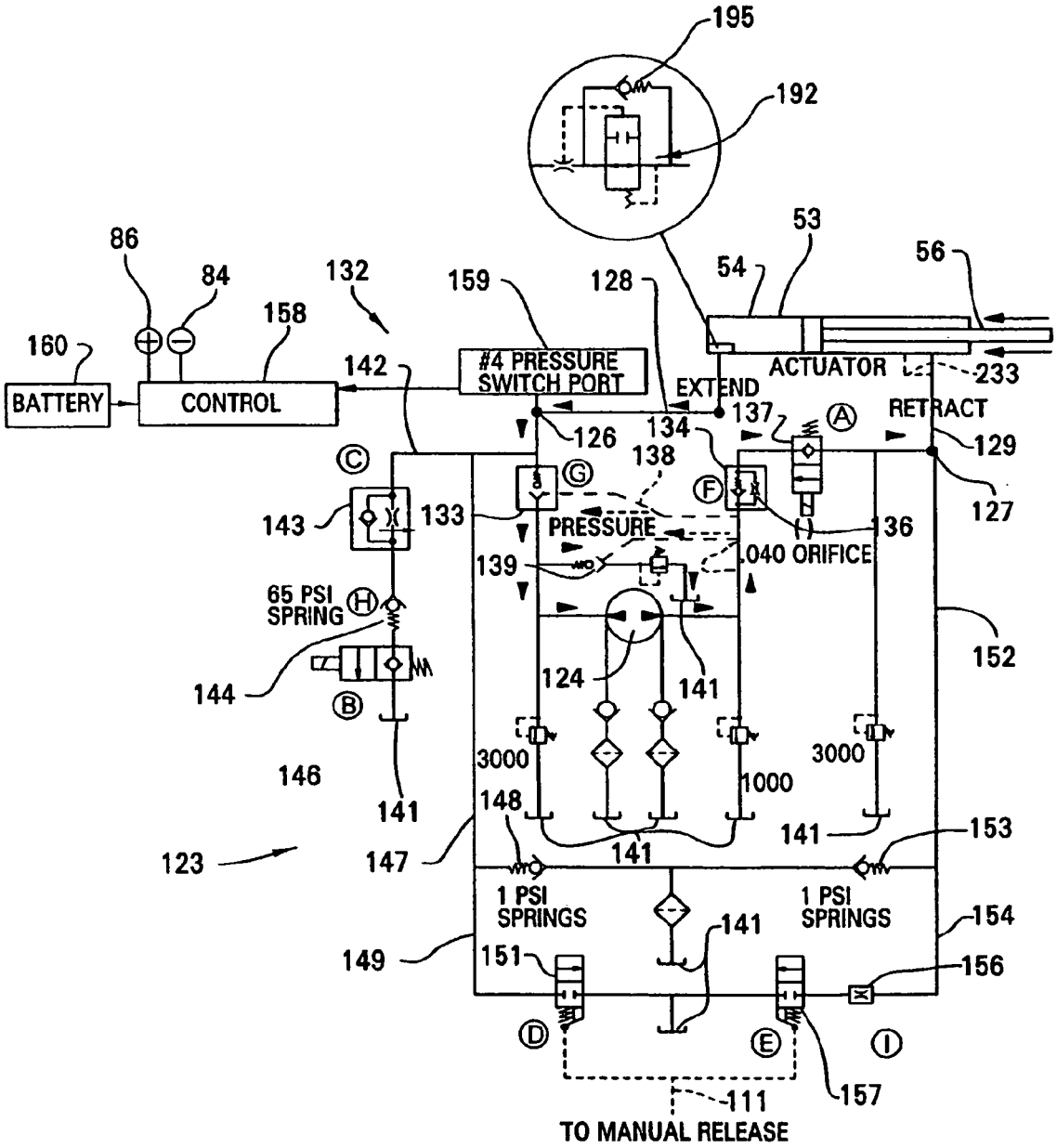

FIG. 19 illustrates a lowering of the litter from the FIG. 1 position toward the FIG. 3 position. In this instance, the switch 84 is actuated to close the contacts 228 and 229 to cause an opening of the valve 146 (Valve B). It will be noted that fluid flows out of the closed end of the linear actuator 53 through the pressure compensated flow control valve 143, through the check valve 144, through the opened Valve B to tank 141. The hydraulic fluid enters the rod end of the linear actuator 53 by sucking same out of the tank 141 through a check valve 153. In this particular situation, operation of the motor 122 is not required and hence is not activated. If the litter of the ambulance cot is lifted (no weight on the base of the ambulance cot), the pressure switch 159 will detect the lifting by reason of a reduced pressure and as long as the switch 84 and the contacts 228 and 229 thereof remain closed, the motor 122 will be activated and driven in the opposite direction of rotation to effect a rapid driving of fluid into the rod end of the linear actuator 53 to rapidly collapse the cot. Prior to this occurring, however, the Valve B will be returned to its initial position illustrated in FIG. 17 as will Valve A. Alternatively, a separate switch (not shown) can be provided for effecting the same rapid collapse of the cot. Since less hydraulic fluid is required in the rod end of the linear actuator 53 by reason of the presence of the reciprocal rod 56 than is required at the opposite end of the cylinder housing 54, excess fluid will need to be bled from the closed end of the cylinder housing and this is accomplished through the high pressure side of the pump feeding a pressurized signal to open the check valve 133 and the check valve 139 to facilitate a bleeding of some of the hydraulic fluid to tank during the time that the base frame 11 is rapidly raised by the hydraulic circuit. Once the low position sensor is detected, the speed of the motor is gradually reduced until the lowermost sensor 164 is detected at which time the motor is brought to a halt. If the push button switch 84 remains activated, the motor will remain stopped until the attendant releases the manual engagement of the button 84. The attendant can thereafter "jog" the litter further downwardly by pressing the switch. In this case, the controller will activate the motor for a short interval of time, allowing incremental downward movement of the litter.

Figure 18:
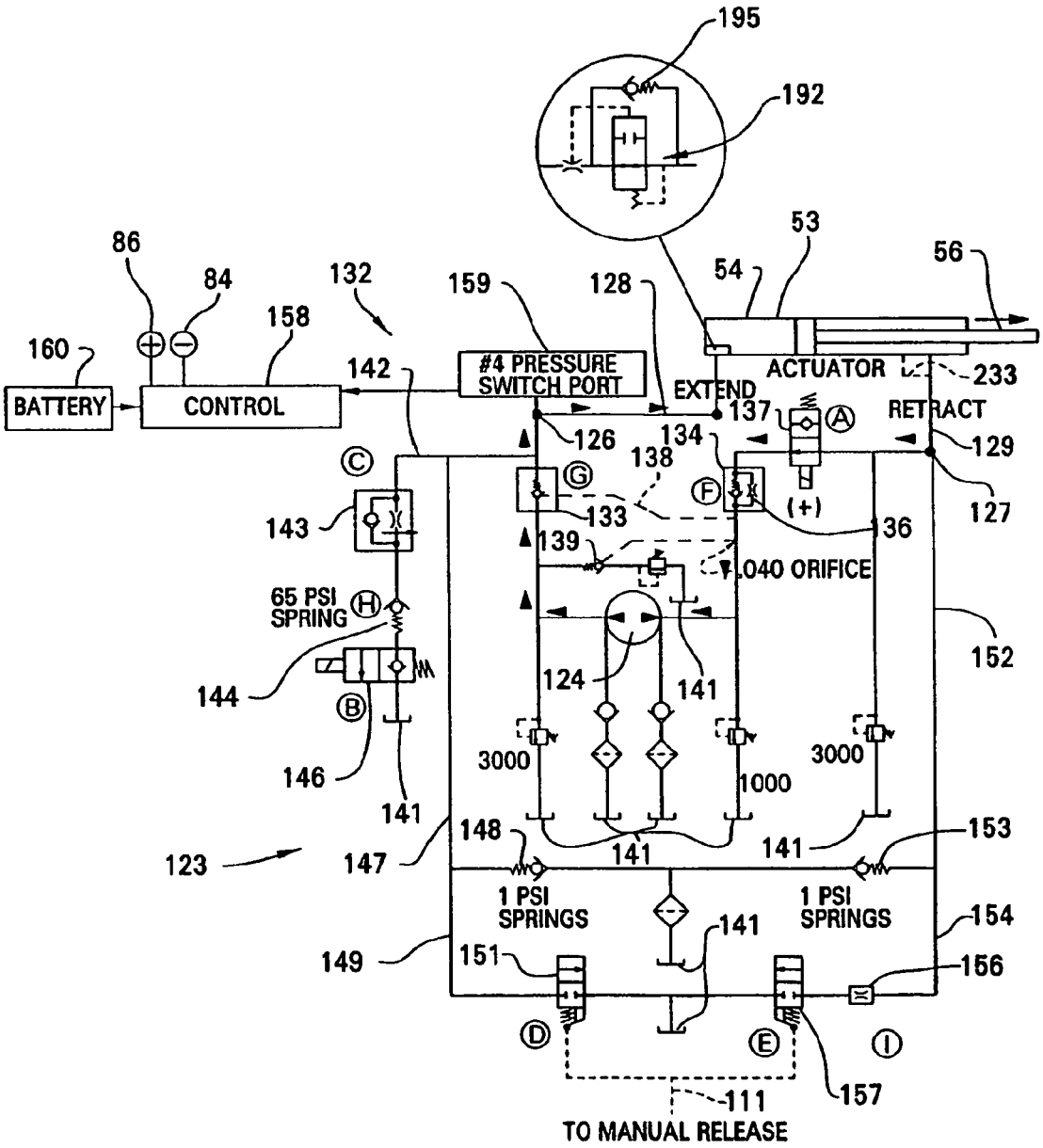
FIGS. 18-23 are additional illustrations of the hydraulic circuit diagram illustrated in FIG. 17, except that various valves have been shifted to demonstrate operation of the hydraulic circuit.
Figure 21:
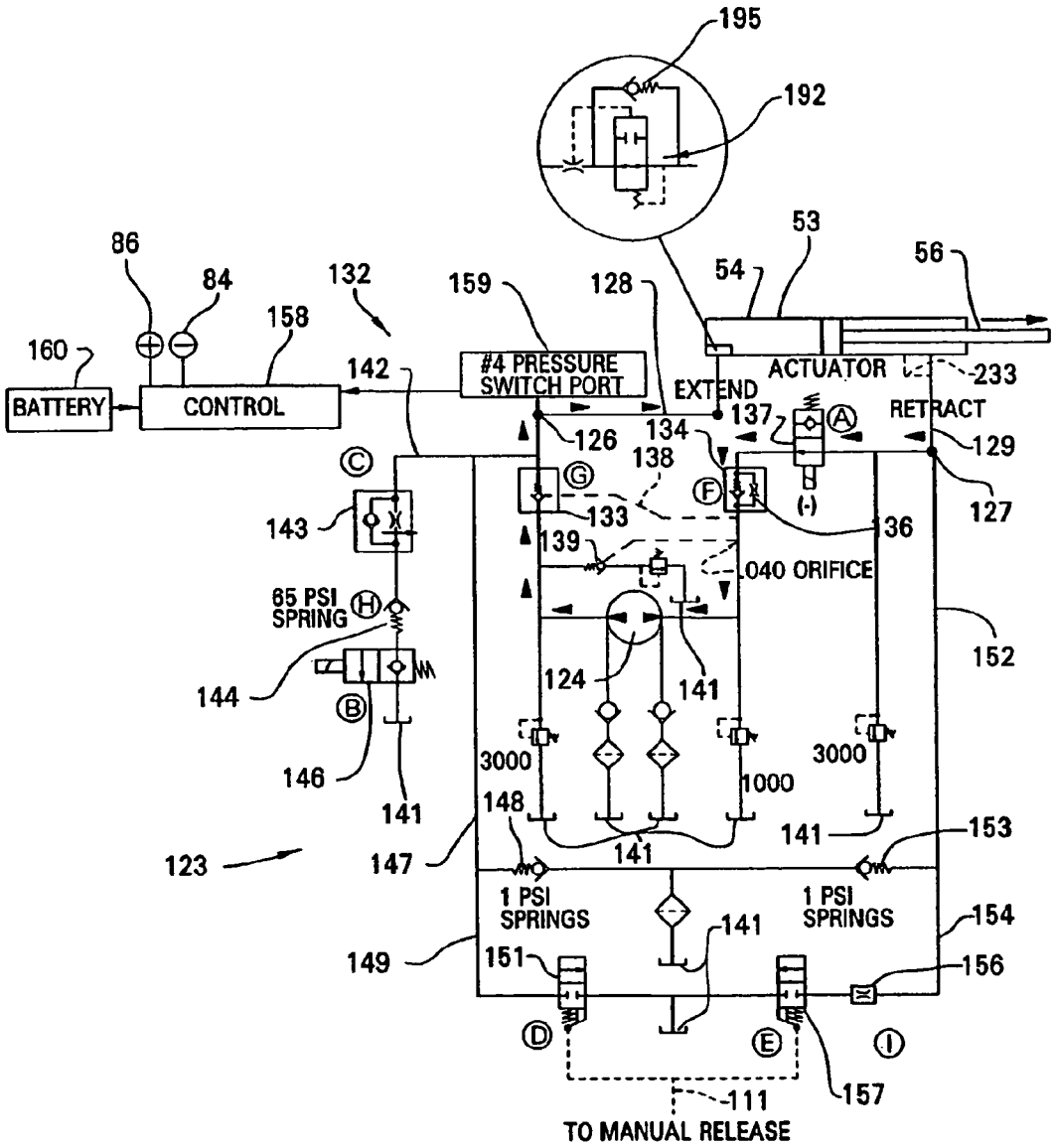
Figure 22:
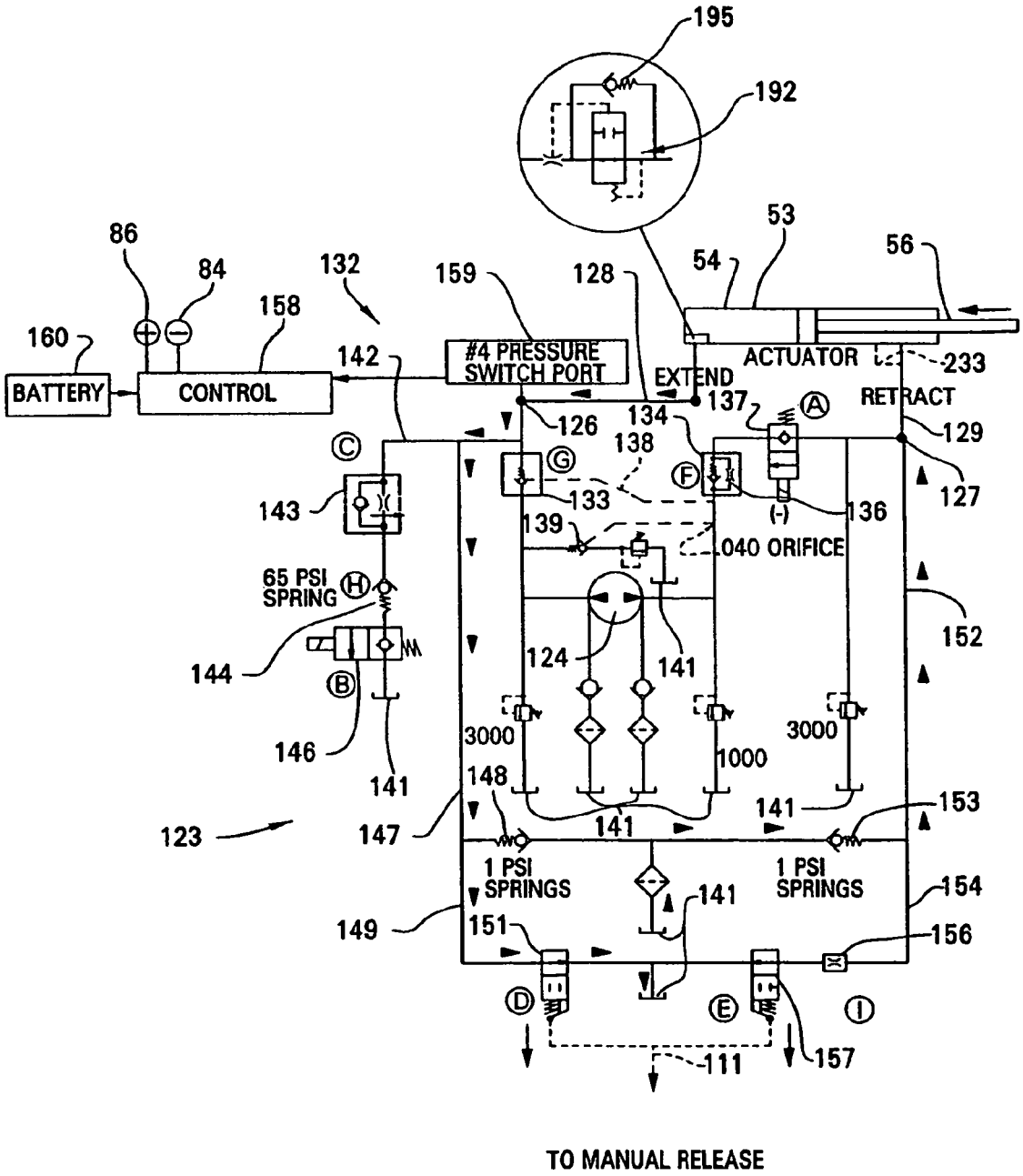
Figure 23:
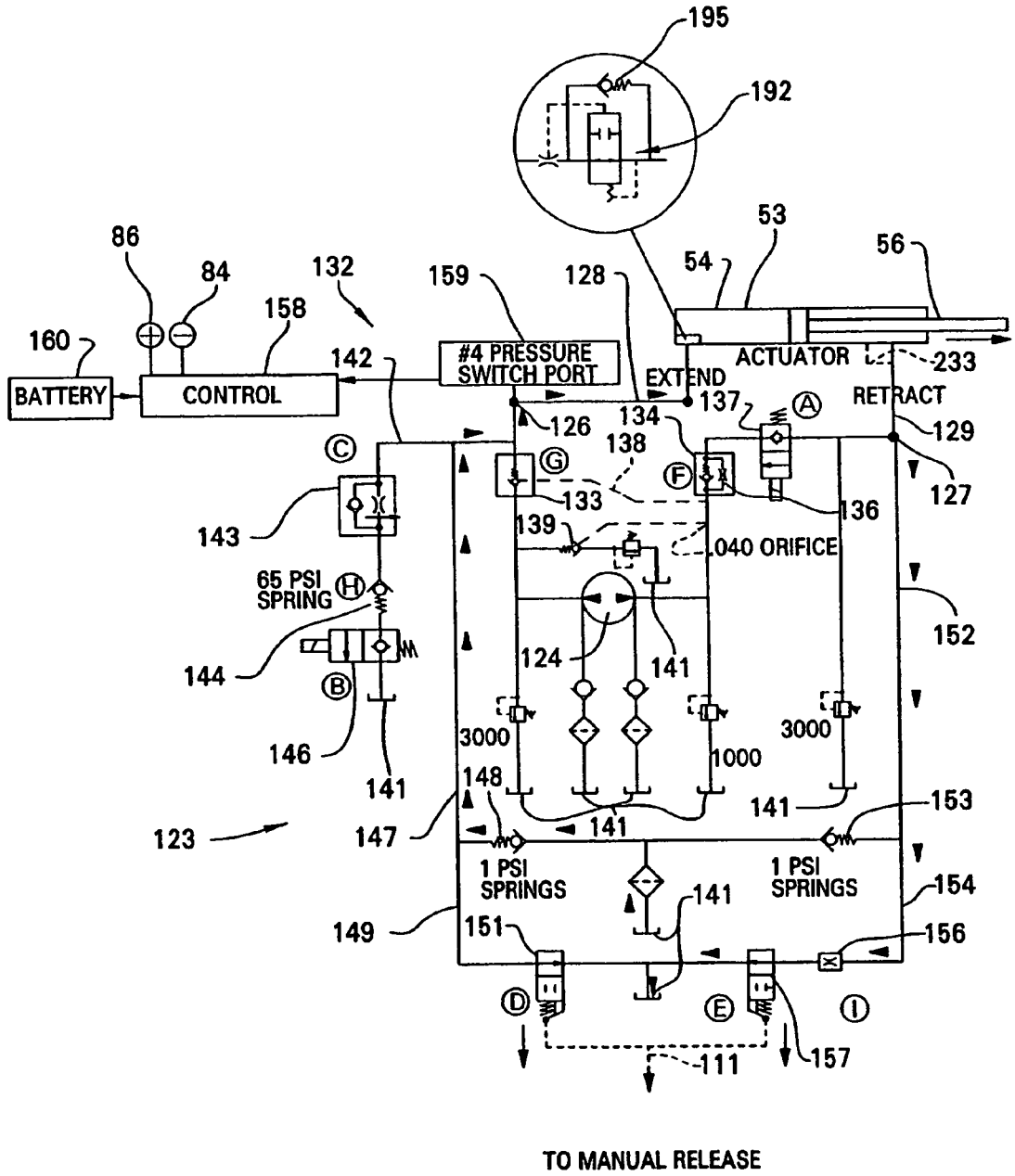

The operative characteristics illustrated in FIG. 21 are similar to those depicted in FIG. 18. Even when the motor 122 is activated to drive the pump 124, the orifice or throttle 136 limits the amount of fluid that can be driven so that the base unit does not uncontrollably fall away from the litter when it is being lifted by the ambulance attendants.

In the situation where there is a loss of electrical function, it must be possible to operate the ambulance cot manually. In addition, a weep valve 233 is provided at the rod end of the cylinder housing 54 to cause a pressure relief to occur when the rod is fully extended. That is, hydraulic fluid inside the cylinder housing 54 will communicate with the outlet 127 to limit the pressure buildup inside the cylinder housing 54. In view of the construction of the valves 151 and 157, with weight on the cot 10, the handle 103 and the valve 157 are allowed to operate, as FIGS. 12-14 and FIG. 29 indicate. Since the pressure is high in the chamber 181 of the valve 151, the valve 151 will not shift (as shown in FIG. 29) in response to an operative movement of the handle 103 and the litter 16 of the cot 10 will not lower. On the other hand, when weight on the litter 16 is removed by the attendant or plural attendants lifting the litter 16 away from the base frame 11, the hydraulic pressure in the chamber 181 of the valve 151 is reduced to facilitate an easy movement of the land 186 and the valve seat surface 187 thereon (FIG. 31) away from the valve seat surface 188 in order to facilitate the operation of the valve 151 simultaneously with the valve 157 (FIGS. 28-30, particularly FIG. 30). That is, fluid flows from the closed end of the linear actuator 53 to tank through the valve 151 whereas hydraulic fluid is siphoned from the tank 141 into the rod end of the linear actuator 53 to effect a lowering of the litter 16 relative to the base frame 11. Similarly, and assuming that electrical function has still been disrupted and it is desired to deploy the base from the FIG. 3 position to the FIG. 1 position, the attendants will need to lift the cot while simultaneously operating the handle 103 causing the weight of the base frame 11 to effect a drawing of fluid from the tank into the closed end of the linear actuator 53 while the hydraulic fluid in the rod end of the linear actuator 53 extends through the open valve 157 to tank.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. An ambulance cot, comprising:

a base frame;

a litter frame; and an X-frame support mechanism interconnecting said base frame and said litter frame and being configured to support said litter frame in one of a plurality of positions relative to said base frame, said support mechanism including at least one pair of frame members pivotally secured to each other proximate the mid-length thereof, said frame members each having opposite ends respectively secured to one of said base frame and said litter frame, said at least one of said pair of frame members having a first mount oriented between said mid-length thereof and said base, said at least one of said pair of frame members having a second mount oriented between said mid-length thereof and said litter frame, said first and second mounts being configured to respectively engage said [base] *litter* frame and said [litter] *base* frame in response to said litter frame becoming proximate said base frame; and wherein said [base] *litter* frame has longitudinally extending side rails and at least one first crosswise member interconnecting said side rails [and] *of said litter frame, said first mount* being oriented in a path of movement of said first [mount] *crosswise member* as said litter frame becomes proximate said base frame so that said first [mount] *crosswise member* engages and rests upon said [at least one] first [crosswise member] *mount*, and wherein said [litter] *base* frame has longitudinally extending side rails and at least one second crosswise member interconnecting said side rails of said [litter] *base* frame and being oriented in a path of movement of said second mount as said litter frame becomes proximate said base frame so that said second mount engages and rests upon said at least one second crosswise member.

2. The ambulance cot according to claim 1, wherein said first and second mounts each engage [and rest upon] respective ones of said at least one first and second crosswise members and between the respective said side rails of said litter frame and said base frame.

3. An ambulance cot, comprising:

a base frame;

a litter frame; and an X-frame support mechanism interconnecting said base frame and said litter frame and being configured to support said litter frame in one of a plurality of positions relative to said base frame, said support mechanism including at least one pair of frame members pivotally secured to each other proximate the mid-length thereof, said at least one pair of frame members each having opposite ends respectively secured to one of said base frame and said litter frame, at least one of said pair of frame members having a first mount oriented between said mid-length thereof and said [base] *litter* frame, said first mount being configured to [respectively] engage said base frame in response to said litter frame becoming proximate said base frame; and wherein said base frame has longitudinally extending side rails and at least one crosswise member interconnecting said side rails and being oriented in a path of movement of said first mount as said litter frame becomes proximate said base frame so that said first mount engages and rests upon said at least one crosswise member.

4. The ambulance cot according to claim 3, wherein said first mount engages and rests upon said at least one crosswise member [and] between the respective said side rails of said base frame.

5. An ambulance cot, comprising:

a base frame;

a litter frame; and an X-frame support mechanism interconnecting said base frame and said litter frame and being configured to support said litter frame in one of a plurality of positions relative to said base frame, said support mechanism including at least one pair of frame members pivotally secured to each other proximate the mid-length thereof, said at least one pair of frame members each having opposite ends respectively secured to one of said base frame and said litter frame, at least one of said pair of frame members having a first mount oriented between said mid-length thereof and said [litter] *base* frame, said first mount being configured to [respectively] engage said litter frame in response to said litter frame becoming proximate said base frame; and wherein said litter frame has longitudinally extending side rails and at least one crosswise member interconnecting said side rails [and], *said first mount* being oriented in a path of movement of said [first mount] *at least one crosswise member* as said litter frame becomes proximate said base frame so that said [first mount] *at least one crosswise member* engages and rests upon said [at least one crosswise member] *first mount*.

6. The ambulance cot according to claim 5, wherein said first mount engages and rests upon said at least one crosswise member [and] between the respective said side rails of said litter frame.

* * * * *